US011370918B2

(12) United States Patent
Williams et al.

(10) Patent No.: US 11,370,918 B2
(45) Date of Patent: *Jun. 28, 2022

(54) ASPHALT PRODUCTS AND METHODS OF PRODUCING THEM FOR REJUVENATION AND SOFTENING OF ASPHALT

(71) Applicant: Iowa State University Research Foundation, Inc., Ames, IA (US)

(72) Inventors: Ronald Christopher Williams, Ames, IA (US); Joseph H. Podolsky, Ames, IA (US); Nacu Hernandez, Ames, IA (US); Eric W. Cochran, Ames, IA (US); Austin Hohmann, Dubuque, IA (US); Mohamed Elkashef, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/751,520

(22) Filed: Jan. 24, 2020

(65) Prior Publication Data
US 2020/0165459 A1   May 28, 2020

Related U.S. Application Data

(62) Division of application No. 15/691,295, filed on Aug. 30, 2017, now Pat. No. 10,570,286.

(60) Provisional application No. 62/381,420, filed on Aug. 30, 2016.

(51) Int. Cl.
| | |
|---|---|
| *C08L 95/00* | (2006.01) |
| *C08J 3/22* | (2006.01) |
| *E01C 7/18* | (2006.01) |
| *E01C 7/26* | (2006.01) |
| *E01C 19/00* | (2006.01) |
| *E04D 1/20* | (2006.01) |
| *C08L 91/00* | (2006.01) |
| *E04D 1/00* | (2006.01) |

(52) U.S. Cl.
CPC .............. *C08L 95/00* (2013.01); *C08J 3/22* (2013.01); *C08J 3/226* (2013.01); *C08L 91/00* (2013.01); *E01C 7/18* (2013.01); *E01C 7/265* (2013.01); *E01C 19/002* (2013.01); *E04D 1/20* (2013.01); *C08J 2395/00* (2013.01); *C08J 2447/00* (2013.01); *C08J 2491/00* (2013.01); *C08J 2495/00* (2013.01); *C08L 2555/24* (2013.01); *C08L 2555/26* (2013.01); *C08L 2555/28* (2013.01); *C08L 2555/34* (2013.01); *C08L 2555/64* (2013.01); *C08L 2555/84* (2013.01); *E04D 2001/005* (2013.01); *Y02A 30/30* (2018.01)

(58) Field of Classification Search
CPC ... C08L 91/00; C08L 95/00; C08J 3/22; C08J 3/226; E01C 7/18; E01C 7/265; E01C 19/002; E04D 1/20
See application file for complete search history.

(56) References Cited

U.S. PATENT DOCUMENTS

| | | |
|---|---|---|
| 2,782,216 A | 2/1957 | Hayes et al. |
| 3,070,608 A | 12/1962 | Kuester et al. |
| 3,755,226 A | 8/1973 | Christiansen et al. |
| 4,597,799 A | 7/1986 | Schilling |
| 4,806,166 A | 2/1989 | Schilling et al. |
| 4,836,857 A | 6/1989 | Hopkins |
| 4,966,490 A | 10/1990 | Hodson |
| 5,023,282 A | 6/1991 | Neubert |
| 5,221,703 A | 6/1993 | Ostermeyer |
| 5,271,767 A | 12/1993 | Light, Sr. et al. |
| 5,437,717 A | 8/1995 | Doyle et al. |
| 5,473,000 A | 12/1995 | Pinomaa |
| 6,797,753 B2 | 9/2004 | Benecke et al. |
| 7,420,008 B2 | 9/2008 | Bloom |
| 7,842,746 B2 | 11/2010 | Bloom et al. |
| 7,951,766 B1 | 5/2011 | Frenkel et al. |
| 7,951,862 B2 | 5/2011 | Bloom et al. |

(Continued)

FOREIGN PATENT DOCUMENTS

| | | |
|---|---|---|
| CN | 101041574 A | 9/2007 |
| CN | 101694083 A | 4/2010 |

(Continued)

OTHER PUBLICATIONS

Office Action for U.S. Appl. No. 15/507,475 (dated Apr. 11, 2019).
Restriction Requirement in U.S. Appl. No. 15/507,475 (dated Nov. 5, 2018).
Office Action for U.S. Appl. No. 15/445,307 (dated Jan. 11, 2019).
Elkashef et al., "Improving Fatigue and Low Temperature Performance of 100% RAP Mixtures Using a Soybean-Derived Rejuvenator," Construction and Building Materials 151:345-352 (2017).

(Continued)

*Primary Examiner* — Edward J Cain
(74) *Attorney, Agent, or Firm* — Troutman Pepper Hamilton Sanders LLP

(57) ABSTRACT

The present invention relates to relates to a method of producing an improved asphalt. This method includes providing an asphalt binder and providing a compound of formula (I):

(I)

as described herein. The asphalt binder is mixed with the compound of formula (I) under conditions effective to produce an improved asphalt. Also disclosed are an asphalt product and a method of making asphalt material.

26 Claims, 48 Drawing Sheets

(56) References Cited

U.S. PATENT DOCUMENTS

| | | | |
|---|---|---|---|
| 7,994,107 | B2 | 8/2011 | Bloom |
| 8,034,172 | B2 | 10/2011 | Naidoo et al. |
| 8,137,451 | B2 | 3/2012 | Aerts et al. |
| 8,198,223 | B2 | 6/2012 | Bloom |
| 8,198,224 | B2 | 6/2012 | Bloom |
| 8,257,483 | B2 | 9/2012 | Aerts et al. |
| 8,703,849 | B2 | 4/2014 | Hagberg et al. |
| 8,808,445 | B2 | 8/2014 | Coe |
| 8,926,742 | B2 | 1/2015 | Coe |
| 9,000,196 | B2 | 4/2015 | Hagberg et al. |
| 10,570,286 | B2 | 2/2020 | Williams et al. |
| 10,604,655 | B2 * | 3/2020 | Williams ............... C08K 5/05 |
| 10,961,395 | B2 | 3/2021 | Williams et al. |
| 2002/0026884 | A1 | 3/2002 | Raad |
| 2004/0025745 | A1 | 2/2004 | Freisthler |
| 2005/0038147 | A1 | 2/2005 | Andersen |
| 2009/0137705 | A1 | 5/2009 | Faucon Dumont et al. |
| 2010/0034586 | A1 | 2/2010 | Bailey et al. |
| 2010/0040832 | A1 | 2/2010 | Herbert |
| 2010/0275817 | A1 | 11/2010 | Williams et al. |
| 2013/0022823 | A1 | 1/2013 | Franks, Sr. |
| 2013/0160674 | A1 | 6/2013 | Hong et al. |
| 2013/0171899 | A1 | 7/2013 | Kalkanoglu et al. |
| 2013/0186302 | A1 | 7/2013 | Naidoo et al. |
| 2013/0239850 | A1 | 9/2013 | Naidoo et al. |
| 2013/0295394 | A1 | 11/2013 | Hong et al. |
| 2014/0000479 | A1 | 1/2014 | Stevens et al. |
| 2014/0033951 | A1 | 2/2014 | Ech et al. |
| 2014/0261076 | A1 | 9/2014 | Quinn et al. |
| 2015/0225358 | A1 | 8/2015 | Howard et al. |
| 2015/0337078 | A1 | 11/2015 | Cochran et al. |
| 2016/0297969 | A1 | 10/2016 | Naidoo et al. |
| 2017/0247542 | A1 | 8/2017 | Williams et al. |
| 2017/0283615 | A1 | 10/2017 | Williams et al. |
| 2018/0057686 | A1 | 1/2018 | Williams et al. |
| 2018/0030193 | A1 | 2/2018 | Bloom et al. |
| 2018/0334603 | A1 | 11/2018 | Bahr et al. |
| 2021/0079224 | A1 | 3/2021 | Cochran et al. |
| 2021/0130616 | A1 | 5/2021 | Williams et al. |
| 2022/0033305 | A1 | 2/2022 | Cochran et al. |

FOREIGN PATENT DOCUMENTS

| | | | |
|---|---|---|---|
| CN | 101696097 | A | 4/2010 |
| CN | 102092988 | A | 6/2011 |
| CN | 102443271 | A | 5/2012 |
| CN | 102702760 | A | 10/2012 |
| CN | 102786806 | A | 11/2012 |
| CN | 102838317 | A | 12/2012 |
| CN | 102838874 | A | 12/2012 |
| CN | 102964858 | A | 3/2013 |
| CN | 102977620 | A | 3/2013 |
| CN | 103102703 | A | 5/2013 |
| CN | 103497521 | A | 1/2014 |
| CN | 103602087 | A | 2/2014 |
| CN | 103709415 | A | 4/2014 |
| CN | 103788665 | A | 5/2014 |
| CN | 103788667 | A | 5/2014 |
| CN | 103980147 | A | 8/2014 |
| CN | 104250520 | A | 12/2014 |
| DE | 19519539 | A1 | 12/1995 |
| DE | 195 01 212 | A1 | 6/1996 |
| DE | 196 01495 | A1 | 7/1997 |
| EP | 0568757 | A1 | 11/1993 |
| EP | 0999237 | A1 | 5/2000 |
| EP | 1524300 | A1 | 4/2005 |
| EP | 1696002 | A1 | 8/2006 |
| EP | 1717275 | A1 | 11/2006 |
| EP | 2083050 | A1 | 7/2009 |
| EP | 2245090 | A1 | 11/2010 |
| FR | 2963354 | A1 | 7/2010 |
| GB | 584344 | | 1/1947 |
| GB | 610629 | | 10/1948 |
| JP | 3158251 | B2 | 7/2000 |
| JP | 2012046641 | A | 3/2012 |
| JP | 5341892 | B2 | 11/2012 |
| KR | 101166155 | B1 | 7/2012 |
| KR | 101487180 | B1 | 1/2015 |
| RU | 2461594 | C1 | 9/2012 |
| WO | 93/00406 | A1 | 1/1993 |
| WO | 97/35940 | A1 | 10/1997 |
| WO | 00/20538 | A1 | 4/2000 |
| WO | 2016/033605 | A1 | 4/2000 |
| WO | 2003093404 | A1 | 11/2003 |
| WO | 2006/107179 | A2 | 10/2006 |
| WO | 2007/062158 | A2 | 5/2007 |
| WO | 2009/102877 | A1 | 8/2009 |
| WO | 2020/061030 | A1 | 3/2020 |
| WO | 2021/055815 | A1 | 3/2021 |

OTHER PUBLICATIONS

Elkashef et al., "Preliminary Examination of Soybean Oil Derived Material as a Potential Rejuvenator Through Superpave Criteria and Asphalt Bitumen Rheology," Construction and Building Materials 149:826-836 (2017).

Elkashef et al., "Instroducing a Soybean Oil-Derived Material as a Potential Rejuvenator of Asphalt Through Rheology, Mix Characterisation and Fourier Transform Infrared Analysis," Road Materials and Pavement Design 19(8):1750-1770 (2018).

Material Safety Data Sheet for Epoxidized Isoamyl Soyate, Revision Date: Feb. 5, 2010.

Material Safety Data Sheet for Glycerin Removal Column Bottoms, Revision Date: Feb. 29, 2012.

Material Safety Data Sheet for MONG, Revision Date: Oct. 11, 2012.

Material Safety Data Sheet for Mixed Short Chain Polyols, Revision Date: Mar. 25, 2011.

Material Safety Data Sheet for ADM CA118, Revision Date: Jun. 25, 2014.

Material Safety Data Sheet for Alinco Z-2 Z-3 Linseed Oil, Revision Date: Feb. 12, 2014.

Material Safety Data Sheet for OKO M-37 Linseed Oil, Issue Date: Jul. 10, 2002.

Material Safety Data Sheet for TOPLIN X-Z Linseed Oil, Issue Date: Aug. 18, 2005.

International Search Report and Written Opinion for Application No. PCT/US2015/047798 (dated Dec. 9, 2015).

Kim, Y.R., "Program Book of the 12th ISAP Conference on Asphalt Pavements," 12th ISAP Conference, Jul. 1, 2014, Raleigh, North Carolina.

Podolsky et al., "Investigation of Bio-Derived Materials Including Isosorbide-Based Materials as Bio-Based Warm Mix Asphalt Additives," Poster Presentation ISAP 2014 Conference, Jun. 5, 2014, p. 1, Raleigh, North Carolina.

Preliminary Agenda and Abstracts of the 51st Petersen Asphalt Research Conference, Wyoming Conference Center (Jul. 16, 2014).

International Search Report and Written Opinion for corresponding Application No. PCT/US2015/047810 (dated Dec. 3, 2015).

Podolsky et al., "Comparative Performance of Bio-Derived/Chemical Additives in Warm Mix Asphalt at Low Temperature," 51st Annual Petersen Asphalt Research Conference, Iowa State University (Jul. 16, 2014).

Office Action for U.S. Appl. No. 15/691,295 (dated Apr. 4, 2019).

Office Action for U.S. Appl. No. 15/445,307 (dated Mar. 6, 2020).

International Search Report and Written Opinion for corresponding Application No. PCT/US2019/051490 (dated Jan. 14, 2020).

International Preliminary Report on Patentability for Application No. PCT/US2019/051490 (dated Mar. 25, 2021).

"Oxirane Oxygen in Epoxidized Materials," American Oil Chemists' Society (2017).

International Search Report and Written Opinion for corresponding Application No. PCT/US2020/051588 (dated Dec. 23, 2020).

International Preliminary Report on Patentability for corresponding Application No. PCT/US2015/047810 (dated Feb. 28, 2017).

U.S. Appl. No. 17/140,465 to Williams et al. filed Jan. 4, 2021, first named inventor Ronald Christopher Williams.

(56) References Cited

OTHER PUBLICATIONS

U.S. Appl. No. 17/275,500 to Cochran et al. filed Mar. 11, 2021, first named inventor Eric W. Cochran.
Biresaw, G., et. al., "Elastohydrodynamic Properties of Biobased Heat-Bodied Oils," Ind. Eng. Chem. Res. 53:16183-16195 (2014).
Erhan, S. Z., et. al., "Vegetable Oil-Based Printing Inks," J. Am. Oil Chem. Soc. 69:251-256 (1992).
Erhan, S. Z., et. al., "Lithographic and Letterpress Ink Vehicles from Vegetable Oils," J. Am. Oil Chem. Soc. 68:635-638 (1991).
Mitchell, J., et. al., "Ultraviolet Absorption Spectra of Linseed Oil: Determination of Bodied-in-Vacuo and Blown Linseed Oil in Mixtures with Raw Linseed Oil," Ind. Eng. Chem. Anal. Ed. 13:765-768 (1941).
Black, M. M. et. al., "South African Fish Products. XXXI.—The Composition of Pilchard Oil and of Maasbanker Oil," J. Sci. Food Agric. 1:248-251 (1950).
Standard Test Method for Viscosity of Transparent Liquids by Bubble Time Method. (ASTM International) (2017).
Paschke, et. al., "Inter- and Intramolecular Polymerization in Heat-Bodied Linseed Oil," J. Am Oil Chem Soc. 31:208-211 (1954).
Test Method for Viscosity of Transparent Liquids by Bubble Time Method. (ASTM International), 1545-13R17 (see Iodine value. Wikipedia (2020) available at: https://en.wikipedia.org/w/index.php?title=Iodine_value&oldid=960069598. (Accessed: Sep. 8, 2020).
Office Action for U.S. Appl. No. 15/445,307 (dated Jul. 25, 2019).
Sharma et al., "Oxidation, Friction Reducing, and Low Temperature Properties of Epoxy Fatty Acid Methyl Esters," Green Chemistry 9:469-474 (2007).
Perkins E.G "Chapter 2. Composition of Soybeans and Soybean Products," Practical Handbook of Soybean Processing and Utilization, AOCS Press, p. 9-28 (1995).
Sahoo et al., "Toughened Bio-Based Epoxy Blend Network Modified With Transesterified Epoxidized Soybean Oil: Synthesis and Characterization," RSC Adv. 5:13674-13691 (2015).

\* cited by examiner

ASPHALT PRODUCTS AND METHODS OF PRODUCING THEM FOR REJUVENATION AND SOFTENING OF ASPHALT

This application is a divisional of U.S. patent application Ser. No. 15/691,295, filed Aug. 30, 2017, which claims the priority benefit of U.S. Provisional Patent Application Ser. No. 62/381,420, filed Aug. 30, 2016, which is hereby incorporated by reference in its entirety.

FIELD OF THE INVENTION

The present invention relates to improved asphalt products and materials as well as methods of producing them, particularly the rejuvenation and softening of asphalt through the addition of fatty acids.

BACKGROUND OF THE INVENTION

In the past years, interest in using recycled asphalt pavement (RAP) has been growing rapidly. This rise in interest is motivated by a number of reasons including a desire to reduce cost, preserve the environment, and conserve energy. With the increasing bitumen prices and dwindling supply of higher quality virgin aggregate, there is a compelling need to use larger amounts of less expensive RAP to replace the more expensive virgin bitumen and aggregates. Despite the need to use higher proportions of RAP, a recent survey, conducted on the use of recycled materials in asphalt pavements, revealed that the average percentage of RAP in the United States has only increased from 15% in 2009 to 20% in 2014 (Hansen, et al., "Asphalt Pavement Industry Survey on Recycled Materials and Warm-Mix Asphalt Usage: 2014," (2015)). This percentage is expected to increase in the near future as researchers gain more understanding of the mechanism of rejuvenators and its interaction with aged asphalt binder.

Such reluctance to use more RAP in asphalt pavements stems from the fact that the aged RAP bitumen has undesirable high stiffness and low creep rate, which makes it susceptible to low temperature thermal cracking (Yu et al., "Rheological, Microscopic, and Chemical Characterization of the Rejuvenating Effect on Asphalt Binders," *Fuel* 135:162-171 (2014)). Accordingly, using higher percentages of RAP produces very stiff mixes which are difficult to field compact, and can result in unexpected premature failure (Copeland, A., "Reclaimed Asphalt Pavement in Asphalt Mixtures: State of the Practice," (2011)).

Several techniques are being implemented to allow for the use of RAP in asphalt mixes, including mixing with a softer virgin bitumen, using higher asphalt content mixtures, and using warm-mix technology to minimize the short-term aging effect and to lower asphalt absorption (Im et al., "Development of New Mix Design Method for Asphalt Mixtures Containing RAP and Rejuvenators," *Construction and Building Materials* 115:727-734 (2016)). These techniques are suitable for lower RAP content mixtures; however, they fail to allow for the use of higher RAP content. For instance, the use of softer virgin bitumen would compensate the aging of the RAP bitumen for low RAP content mixes but its effect on high RAP content mixes would be insignificant (West et al., "Improved Mix Design, Evaluation, and Materials Management Practices for Hot Mix Asphalt with High Reclaimed Asphalt Pavement Content," *Transportation Research Board* (2013)). In this regard, rejuvenators have shown to be a very attractive alternative in that they can lead to higher RAP content. Rejuvenators have proven to be very efficient in restoring the aged bitumens to their original state. With the increase in popularity of hot-in-place pavement recycling (HIR), rejuvenators are becoming even more important. In HIR, old pavements are heated and milled in place before being mixed with virgin aggregates, virgin bitumen, and a rejuvenator.

Rejuvenators have been successfully implemented to offset the high stiffness and low creep rate of aged RAP asphalt binder. Use of rejuvenators has resulted in considerable improvement to low-temperature mix properties of mixtures with high RAP content (Hajj et al., "Influence of Hydrogreen Bioasphalt on Viscoelastic Properties of Reclaimed Asphalt Mixtures," *Transportation Research Record: Journal of the Transportation Research Board* 2371:13-22 (2013); Shen et al., "Effects of Rejuvenating Agents on Superpave Mixtures Containing Reclaimed Asphalt Pavement," *Journal of Materials in Civil Engineering* 19(5):376-384 (2007); and Zaumanis et al., "Influence of Six Rejuvenators on the Performance Properties of Reclaimed Asphalt Pavement (RAP) Binder and 100% Recycled Asphalt Mixtures," *Construction and Building Materials* 71:538-550 (2014)).

Asphalt is composed of four distinct chemical fractions, namely asphaltenes, resins, aromatics, and saturates. Resins, aromatics, and saturates are collectively referred to as maltenes. The high molecular weight asphaltenes form a colloidal suspension in low molecular weight maltenes. The asphaltene content has a great influence on asphalt viscosity. In a recent study, increasing the asphaltene content by addition of propane deasphaltene tar (PDA) resulted in a noticeable increase in the penetration index, and a similar effect was also noted with aging (Firoozifar et al., "The Effect of Asphaltene on Thermal Properties of Bitumen," *Chemical Engineering Research and Design* 89(10):2044-2048 (2011)). Apart from the asphaltene content, the resins also play an important role since they act as dispersing agents to the asphaltenes. The ratio of resins to asphaltenes is an important parameter that controls the degree of dispersion of asphaltenes and accordingly the asphalt viscosity (Telford, T., THE SHELL BITUMEN INDUSTRIAL HANDBOOK (1995)).

Rejuvenators are chemical or bio-derived additives which typically contain a high proportion of maltenes, which serves to replenish the maltene content in the aged bitumen that has been lost as a result of oxidation leading to increased stiffness (Copeland, A., "Reclaimed Asphalt Pavement in Asphalt Mixtures: State of the Practice," (2011)). Binder aging is characterized by a change of the maltenes fraction into asphaltene through oxidation. The amount of asphaltene is related to the viscosity of asphalt. Firoozifar et al., "The Effect of Asphaltene on Thermal Properties of Bitumen," *Chemical Engineering Research and Design* 89:2044-2048 (2011). The addition of maltenes helps rebalance the chemical composition of the aged bitumen, which contain a high percentage of asphaltenes (causing high stiffness and low creep rate). Rejuvenators recreate the balance between the asphaltene and maltene by providing more maltenes and/or by allowing better dispersion of the asphaltenes (Elseifi et al., "Laboratory Evaluation of Asphalt Mixtures Containing Sustainable Technologies," *Journal of the Association of Asphalt Paving Technologists* 80 (2011). Rejuvenators are added during mixing and are believed to diffuse within the aged bitumen imparting softening characteristics. The rejuvenator initially coats the outside of the RAP aggregates before they gradually seep into the aged bitumen layer until they diffuse through the film thickness (Carpenter et al., "Modifier Influence in the Characterization of Hot-Mix Recycled Material," *Transportation Research Record* 777 (1980)). Improvement in the low temperature properties and stiffness of rejuvenated aged binders have been verified by a number of studies (Elseifi et al., "Laboratory Evaluation of Asphalt Mixtures Containing Sustainable Technologies," *Journal of the Association of Asphalt Paving Technologists* 80 (2011) and Zaumanis et al., "Evaluation of Different Recycling Agents for Restoring Aged Asphalt Binder and Performance of 100% recycled asphalt," *Materials and Structures* 48:2475-2488 (2015)). Several rejuvenators derived from petroleum based aromatic extracts, distilled tall oil, and organic oils have been successfully implemented (Zaumanis et al., "Influence of Six Rejuvenators on the Performance Properties of Reclaimed Asphalt Pavement (RAP) Binder and 100% Recycled Asphalt Mixtures," *Construction and Building Materials* 71:538-550 (2014)).

A number of studies have investigated the performance of rejuvenated bitumens and resulting asphalt mixtures. The main focus of these studies was to investigate the effect of rejuvenators on the stiffness of the aged bitumen and the low temperature cracking resistance of the produced asphalt mixtures (Elseifi et al., "Laboratory Evaluation of Asphalt Mixtures Containing Sustainable Technologies," *Journal of the Association of Asphalt Paving Technologists* 80 (2011); Zaumanis et al., "Evaluation of Rejuvenator's Effectiveness with Conventional Mix Testing for 100% Reclaimed Asphalt Pavement Mixtures," *Transportation Research Record: Journal of the Transportation Research Board* 2370:17-25 (2013); Hajj et al., "Influence of Hydrogreen Bioasphalt on Viscoelastic Properties of Reclaimed Asphalt Mixtures," *Transportation Research Record: Journal of the Transportation Research Board* 2371:13-22 (2013)). It has been concluded that rejuvenators successfully reduce the aged bitumen stiffness and notably improve the low temperature cracking resistance of the resulting mixture (Mogawer et al., "Evaluating the Effect of Rejuvenators on the Degree of Blending and Performance of High RAP, RAS, and RAP/RAS Mixtures," *Road Materials and Pavement Design* 14(sup2):193-213 (2013); Tran et al., "Effect of Rejuvenator on Performance Properties of HMA Mixtures With High RAP and RAS Contents," *Auburn, Ala.: National Center for Asphalt Technology* (2012)). The selection of the rejuvenator dosage was found to have a great influence on the effectiveness of the treatment (Shen et al., "Effects of Rejuvenator on Performance-Based Properties of Rejuvenated Asphalt Binder and Mixtures," *Construction and Building Materials* 21(5):958-964 (2007)). It was suggested that blending charts could be used to obtain an optimum dosage that meets the requirements of the bitumen specifications. Determining the proper dose is crucial since a higher dosage may cause undesirable excessive softening of the bitumen, which my lead to performance problems such as rutting. The rejuvenated bitumen properties can be determined through extraction of the aged bitumen, blending with the rejuvenator, and subsequent testing. Such technique, however, assumes perfect blending between the rejuvenator and the aged bitumen, which does not necessarily reflect actual conditions. During actual mixing, the rejuvenator might not diffuse fully through the aged asphalt film thickness.

The performance of mixes which involve RAP is controlled to a large extent by the degree of blending between the RAP bitumen and the virgin bitumen in addition to the effective percentage of RAP bitumen which contribute towards the total asphalt content (Huang et al., "Laboratory Investigation of Mixing Hot-Mix Asphalt With Reclaimed Asphalt Pavement," *Transportation Research Record: Journal of the Transportation Research Board* 1929:37-45 (2005)). Through the use of rejuvenators, the RAP bitumen becomes less stiff and can thus blend more easily with the virgin bitumen.

Aged RAP bitumens are characterized as having a high relative viscosity. The high viscosity can lead to poor mixing and compaction, hence the study of the rejuvenator's effect in reducing the viscosity is very important. Achieving low viscosity ensures that the bitumen has sufficient flow to properly blend with the virgin bitumen and to uniformly coat both virgin and RAP aggregates. It is equally important for the rejuvenator to be able to lower the RAP bitumen viscosity to acceptable levels without the need for high dosages. High dosages of rejuvenators could lead to potential rutting, stripping and mix instability problems (Zaumanis et al., "Evaluation of Rejuvenator's Effectiveness with Conventional Mix Testing for 100% Reclaimed Asphalt Pavement Mixtures," *Transportation Research Record: Journal of the Transportation Research* Board 2370:17-25 (2013)). The study of the temperature-viscosity dependence of the rejuvenated aged bitumen is also important because high mixing temperatures could damage the bitumen so it is advantageous to have an effective rejuvenator which would promote low mixing temperatures at a low dosage. Through reducing the viscosity, the RAP binder becomes less stiff and can thus blend more easily with the virgin binder. The degree of blending between the RAP binder and the virgin binder determines to a large extent the performance of mixtures containing RAP, by increasing the effective percentage of RAP binder that contributes to the total asphalt content (Huang et al., "Laboratory Investigation of Mixing Hot-Mix Asphalt With Reclaimed Asphalt Pavement," *Transportation Research Record: Journal of the Transportation Research Board* 1929:37-45 (2005)). Being able to reduce viscosity, rejuvenators can help achieve sufficient flow at lower mixing temperatures. The relationship between viscosity and temperature should be well understood. A good rejuvenator should be capable of lowering the viscosity to acceptable levels without the need for high dosages.

Rejuvenators vary greatly according to their chemical composition and origin. Numerous research efforts have been directed to assessing the performance of commercially available rejuvenators, as well as proposing new materials to act as rejuvenators. Materials derived from distilled tall oil, petroleum based aromatic extract, and organic oil have been successfully applied as rejuvenators (Zaumanis et al., "Influence of Six Rejuvenators on The Performance Properties of Reclaimed Asphalt Pavement (RAP) Binder and 100% Recycled Asphalt Mixtures," *Construction and Building Materials* 71:538-550 (2014)). Organic oil bio-derived rejuvenators have been presented as a safe alternative to the carcinogenic aromatic oil rejuvenators (Hajj et al., "Influence of Hydrogreen Bioasphalt on Viscoelastic Properties of Reclaimed Asphalt Mixtures," *Transportation Research Record: Journal of the Transportation Research Board* 2371:13-2 (2013)). Organic oils have been successfully used by the Florida Department of Transportation (FDOT) for mixes that contain 40% RAP. Two trial sections were constructed on 1-95 using 0.75% of organic oil by weight of RAP in 2009. Other DOTs have reported using organic oil at varying RAP contents such as the Texas DOT with 35% RAP and 5% RAS, and the New York City DOT with 20% RAP (Hajj et al., "Influence of Hydrogreen Bioasphalt on Viscoelastic Properties of Reclaimed Asphalt Mixtures," *Transportation Research Record: Journal of the Transportation Research Board* 2371:13-2 (2013)). A study conducted in Zaumanis et al., "Influence of Six Rejuvenators on the Performance Properties of Reclaimed Asphalt Pavement (RAP) Binder and 100% Recycled Asphalt Mixtures," *Construction and Building Materials* 71:538-550 (2014) investigated the performance of six different rejuvenators including waste engine oil, distilled tall oil, waste vegetable oil, waste vegetable grease, organic oil, and aromatic extract. The study was performed on mixes using 100% RAP, with a 12% rejuvenator dosage by mass of RAP bitumen. It was shown that organic-based rejuvenators were more efficient in lowering the low temperature performance grade (PG) of the rejuvenated bitumen compared to petroleum-based rejuvenators. It was also shown that none of the rejuvenators significantly reduced the high temperature PG, which indicates that with the use of an appropriate rejuvenator dosage, rutting should not be a concern. All of the six rejuvenators seemed to work efficiently at this dosage except for waste engine oil which did not meet the low temperature grade and resulted in high mass loss, which indicates volatility and increased aging susceptibility.

The durability of rejuvenators is crucial to their proper usage. Softening agents containing volatile compounds can only provide a temporary reduction in stiffness to aid compaction. Upon volatilization of these compounds, the softening agents can no longer provide additional enhancement to the mixture. Rejuvenators need to have a prolonged effect on the asphalt mixture properties.

A number of studies have addressed the issue of durability of rejuvenated asphalt. In the work reported in Shen et al., "Effects of Rejuvenating Agents on Superpave Mixtures Containing Reclaimed Asphalt Pavement," *Journal of Materials in Civil Engineering* 19(5):376-384 (2007)), mixtures containing 48% RAP and 12.5% rejuvenator, by mass of RAP bitumen, were evaluated for rutting in an asphalt pavement analyzer (APA) and for moisture sensitivity using indirect tensile strength (ITS) tests. It was shown that the performance of the rejuvenated mixes was better than the control RAP mixes prepared with a softer virgin bitumen. A recent study investigated the long-term aging behavior of rejuvenated bitumen prepared using five different rejuvenators (Ali et. al., "Long-Term Aging of Recycled Binders" (2015)). It was revealed that the long-term aging effect differed greatly among rejuvenators. Two of the rejuvenators, namely aromatic extract and a water-based emulsion from naphthenic crude, caused slowing down of the aging rate compared to virgin bitumens while the other three, namely petroleum neutral distillate, oil-based bio-rejuvenator and a polyol ester pine, accelerated aging. Study of long-term cracking and fatigue resistance of rejuvenated mixes was performed on full-depth asphalt pavement specimens (Ali et. al., "Long-Term Aging of Recycled Binders" (2015)). The long-term aging was simulated using an Accelerated Pavement Weathering System (APWS). APWS simulates real weather conditions including rain, sunshine, and temperature fluctuations. The Texas Overlay Test, as described in TEX-248-F (Designation, T., "TEX-248-F," *Overlay Test, Construction Division, Texas Department of Transportation* (2009)), was performed to assess fatigue and cracking resistance for specimens subjected to 0, 1000, and 3000 hours of APWS aging. The results indicated that the rejuvenated mixes showed better fatigue and reflective cracking resistance compared to the virgin mixes. It was shown that rejuvenated asphalt mixtures had better performance in terms of fatigue and reflective cracking compared to virgin asphalt mixtures, even after 3000 hours of APWS aging (Ali et. al., "Long-Term Aging of Recycled Binders" (2015)). The chemistry of the interaction between the rejuvenator and the binder is also very important. A recent study showed that an aromatic extract rejuvenator worked effectively for a PG58-10 and not as effectively with a PG58-28 binder (Yu et al., "Rheological, Microscopic, and Chemical Characterization of the Rejuvenating Effect on Asphalt Binders," *Fuel* 135:162-171 (2014)).

Cracking induced by fatigue is considered a primary mode of distress in asphalt pavements. The viscoelastic properties of the asphalt binder determine to a great extent the fatigue performance of asphalt mixes (Bahia et al., "Characterization of Modified Asphalt Binders in SUPERPAVE MIX DESIGN (2001)). The fatigue resistance of binders is currently characterized using the fatigue parameter, $G^* \sin \delta$. This parameter is determined using a Dynamic Shear Rheometer (DSR) measurements at 1% strain rate, as per AASHTO T315, to ensure that the binder remains within the linear viscoelastic region. Such an approach has failed to capture the performance of binders under destructive loading which results in accumulated damage (Bahia et al., "Characterization of Modified Asphalt Binders in SUPERPAVE MIX DESIGN (2001)). The Time sweep (TS) test was introduced based on the work done on NCHRP Project 9-10 (Bahia et al., "Characterization of Modified Asphalt Binders in SUPERPAVE MIX DESIGN (2001) and Bonnetti et al., "Measuring and Defining Fatigue Behavior of Asphalt Binders," *Transportation Research Record: Journal of the Transportation Research Board* 1810:33-43 (2002)). The TS test is conducted using a DSR on an RTFO+PAV (long term+short term) aged binder with an 8-mm-diameter geometry. In this test a repeated cyclic load is applied under constant strain rate until failure. Failure is typically marked by a 50% drop in $G^*$ (Kim et al., "Fatigue Characterization of Asphalt Concrete Using Viscoelasticity and Continuum Damage Theory (With Discussion)," *Journal of the Association of Asphalt Paving Technologists* 66 (1997)). The choice of the constant strain rate at which to run the test is determined to reflect the pavement structure and traffic conditions. A major drawback of the TS test is the uncertainty in testing time and the fact that it can take several hours to perform. Additionally, such elongated testing time may cause steric hardening of the binder, which could skew the results (Planche et al., "Evaluation of Fatigue Properties of Bituminous Binders," *Materials and Structures* 37(5):356-359 (2004)). Recently, the Linear amplitude sweep test (LAS) was introduced as an efficient test to characterize fatigue in binders (Johnson et al., "Practical Application of Viscoelastic Continuum Damage Theory to Asphalt Binder Fatigue Characterization," *Asphalt Paving Technology-Proceedings* 28:597 (2009)). Similar to the TS test, the LAS test uses an 8-mm-diameter and a 2-mm gap geometry, to apply a repeated cyclic load to the binder sample. In the LAS test, however, an increasing strain rate is applied to induce accumulated damage. In a recent study that investigated the use of six different recycling agents on the fatigue life of 100% RAP mixtures, LAS testing was used to evaluate the number of cycles to failure for all rejuvenated blends (Zaumanis et al., "Evaluation of Different Recycling Agents for Restoring Aged Asphalt Binder and Performance of 100% Recycled Asphalt," *Materials and Structures* 48(8):2475-2488 (2015)). It was concluded that the bioderived recycling agents were superior to the petroleum based recycling agents. The bioderived recycling agents increased the number of cycles to failure in the RAP binder to a level comparable to that of the virgin binder. In another study, LAS testing was used to assess the fatigue performance of a RAP binder blended with both a soft and a stiff virgin binder at both 20% and 50% RAP binder content. It was shown that the fatigue life increased with higher amounts of RAP binder. It was also concluded that using a softer binder in lieu of a stiff binder led to better performance compared to increasing the stiff virgin binder content (Willis et al., "Effects of Changing Virgin Binder Grade and Content on RAP Mixture Properties," *NCAT Report* (12-03) (2012)).

Using RAP can have a great impact on the low temperature cracking potential of asphalt mixtures. Hence, it is important to assess the low temperature properties of mixtures prepared with RAP. The disk-shaped compact tension (DCT) is one of the commonly used tests to assess low temperature cracking resistance (Wagoner et al., "Investigation of the Fracture Resistance of Hot-Mix Asphalt Concrete Using a Disk-Shaped Compact Tension Test," *Transportation Research Record: Journal of the Transportation Research Board* 1929:183-192 (2005)). The DCT test gives the fracture energy, in $J/m^2$, for a crack to propagate through a notched specimen under a displacement-controlled tensile loading. A comprehensive study that correlated fracture energy to field performance showed that a fracture energy between 350-400 $J/m^2$ marks a sufficient resistance against thermal and reflective cracking (Buttlar et al., "Comprehensive Database of Asphalt Concrete Fracture Energy and Links to Field Performance," 89th Annual Meeting of the Transportation Research Board, 502 Washington, D.C. (2010)). Minimal occurrence of transverse cracking was found in mixtures with fracture energies above 400 J/m2 (Buttlar et al., "Comprehensive Database of Asphalt Concrete Fracture Energy and Links to Field Performance," 89th Annual Meeting of the Transportation Research Board, 502 Washington, D.C. (2010)). A recent investigation that looked into the effect of different percentages of recycled materials into asphalt mixtures was conducted at Iowa State University and the University of Illinois Urbana-Champaign (Williams et al., "Characterization of Hot Mix Asphalt Containing Post-Consumer Recycled Asphalt Shingles and Fractionated Reclaimed Asphalt Pavement,"Report to the Illinois State Toll Highway Authority (2011)). This study looked at low temperature performance of eight different mixtures, containing various percentages of RAP and recycled asphalt shingles (RAS), used in the construction of Illinois Tollway (I-90). DCT testing done at −12° C. revealed that the fracture energy decreased with the addition of recycled materials, with the specimens containing 50% recycled materials failing to meet the minimum threshold of 350 $J/m^2$ (Williams et al., "Characterization of Hot Mix Asphalt Containing Post-Consumer Recycled Asphalt Shingles and Fractionated Reclaimed Asphalt Pavement," *Report to the Illinois State Toll Highway Authority* (2011)). DCT testing was also used to assess the effect of aging on the low temperature fracture behavior of asphalt mixtures (Braham et al., "The Effect of Long-Term Laboratory Aging on Asphalt Concrete Fracture Energy," *Journal of the Association of Asphalt Paving Technologists* 78 (2009)). It was concluded that fracture energy decreased consistently with longer hours of aging. With aging, an increase in the peak load was noted followed by a steep drop in the load resulting in an overall less area under the load-displacement curve hence less fracture energy.

The effectiveness of a rejuvenator is also related to the bitumen's chemical composition. A specific rejuvenator could work effectively for one bitumen but not another. Two bitumens from different crude sources, namely AAD (PG 58-28) and ABD (PG 58-10), were rejuvenated using aromatic extract rejuvenators (Yu et al., "Rheological, Microscopic, and Chemical Characterization of the Rejuvenating Effect on Asphalt Binders," *Fuel* 135:162-171 (2014)). The effect of rejuvenation on the low temperature grade was more pronounced on the ABD bitumen compared to the AAD bitumen, which was attributed to a better chemical interaction between the rejuvenator and the bitumen.

The changes in the chemical composition of the bitumen as a result of aging and rejuvenation can be examined using SARA fractionation. SARA fractionation can be used to detect changes in the different chemical fractions of asphalt due to aging and rejuvenation. PAV aging of virgin bitumen, followed by SARA fractionation, revealed conversion of aromatics to asphaltenes with no significant change in resins or saturates (Yu et al., "Rheological, Microscopic, and Chemical Characterization of the Rejuvenating Effect on Asphalt Binders," *Fuel* 135:162-171 (2014)). Addition of an aromatic extract rejuvenator caused an increase in the content of saturates and aromatics accompanied by a reduction in the asphaltenes proportion. The chemical composition of the rejuvenated bitumen did not exactly mirror that of the virgin bitumen but the overall effect of the rejuvenation process was to introduce chemical changes that helped restore the virgin bitumen properties.

The United States produces about one third of the world soybean output (Iowa Soybean Association, "An Allocation of Iowa-Grown Soybean and The Resulting Soybean Meal and Oil" (2016)). The State of Iowa is considered one of the big producers of soybean in the U.S., according to a recent report published by the Iowa Soybean Association (Iowa Soybean Association (2016)). This substantial production mainly is used in making soybean meal or soybean oil. Soybean meals are largely consumed by the livestock industry while most of the soybean oil is used in the production of biodiesel fuel. An estimated 20% of the soybean output is used to make biodiesel oil (Iowa Soybean Association (2016)). The process of biodiesel oil production involves transesterification of the soybean oil in the presence of a catalyst (Ma et al., "Biodiesel Production: A Review," *Bioresource Technology* 70(1):1-15 (1999)). The abundancy of the soybean oil production in the United States inspires the need to look for alternative applications other than biodiesel production.

A number of previous studies have used soybean oil derived materials in asphalt. Soybean acidulated soapstock (SAS), which is considered a rich source of soybean fatty acids, was used as a fluxing agent at dosages from 1-3%. Seidel et al., "Rheological Characterization of Asphalt Binders Modified With Soybean Fatty Acids," *Construction and Building Materials* 53:324-332 (2014). There was a consistent decrease in the critical high temperature with the SAS modification. An enhancement in the low temperature was also observed. Another recent study used soybean oil as a warm-mix asphalt (WMA) additive, with dosages from 1-3%. It was concluded that an average reduction in the mixing and compaction temperature of 2.7° C. to 3.4° C. was attained. Portugal et al., "Rheological Performance of Soybean in Asphalt Binder Modification," *Road Materials and Pavement Design* pp. 1-15 (2017).

Other than soybean oil, vegetable oils have been previously suggested as recycling agents or rejuvenators. Two-point bending tests performed on RAP mixtures modified with a vegetable oil based recycled agent showed improved fatigue performance and lower complex modulus (Mangiafico et al., "Complex Modulus and Fatigue Performances of Bituminous Mixtures With Reclaimed Asphalt Pavement and a Recycling Agent of Vegetable Origin," *Road Materials and Pavement Design* 1-16 (2016)). Waste vegetable oil has been used to modify 100% RAP mixtures resulting in a reduced temperature performance grade (Zaumanis et al., "Influence of Six Rejuvenators on the Performance Properties of Reclaimed Asphalt Pavement (RAP) Binder and 100% Recycled Asphalt Mixtures," *Construction and Building Materials*, 71, 538-550 (2014). Other bio-derived rejuvenators including distilled tall oil and cotton seed oil were also used to rejuvenate asphalt binders (Chen et al., "High Temperature Properties of Rejuvenating Recovered Binder With Rejuvenator, Waste Cooking and Cotton Seed Oils," *Construction and Building Materials* 59:10-16 (2014) and Zaumanis et al., "Evaluation of Different Recycling Agents for Restoring Aged Asphalt Binder and Performance of 100% Recycled Asphalt," *Materials and Structures* 48(8): 2475-2488 (2015)).

Thermogravimetric analysis (TGA) is used to determine mass loss as a function of temperature. TGA can either be done in an inert environment using nitrogen or in an oxidative environment using air. An inert environment does not allow for combustion to occur. TGA under nitrogen has been previously used to characterize asphalt binders with different asphaltene contents. Firoozifar et al., "The Effect of Asphaltene on Thermal Properties of Bitumen," *Chemical Engineering Research and Design* 89:2044-2048 (2011). A relation between the asphaltene content and the decomposition temperatures of asphalt was noted. The thermal stability decreased with more asphaltene content resulting in a lower char yield. Firoozifar et al., "The Effect of Asphaltene on Thermal Properties of Bitumen," *Chemical Engineering Research and Design* 89:2044-2048 (2011). In a recent study, TGA of binder blends containing re-refined vacuum tower bottoms (RVTB) was performed under nitrogen and air to assess changes in the thermal stability. Wielinski et al., "Analysis of Vacuum Tower Asphalt Extender and Effect on Bitumen and Asphalt Properties," *Road Materials and Pavement Design* 16:90-110 (2015). The binders were heated under nitrogen until the mass loss reached a plateau at around 600° C. Air was then introduced and the temperature raised to 800° C. to burn off the remaining constituents. The remaining mass referred to as ash was less than 2%. No significant changes in the thermal stability were noted between the neat binder and the binder blended with 9% RVTB. TGA was also used to characterize binders modified with styrene-butadiene-styrene polymer and tall oil pitch. Ahmedzade et al., "Laboratory Investigation of the Properties of Asphalt Concrete Mixtures Modified with TOP-SBS," *Construction and Building Materials* 21:626-633 (2007). It was concluded that the modified binders were thermally stable at the mixing and compaction temperatures of asphalt concrete pavements. Recently, TGA was coupled with mass spectrometry to study chemical changes in aged binders. de Sá et al., "Weathering Degradation Effect on Chemical Structure of Asphalt Binder," *International Journal of Pavement Research and Technology* 8:23-28 (2015). The TGA analysis was performed under a flow of argon up to a temperature of 900° C. It was noted that char yield decreased from 17% to 6% with aging.

The present invention is directed to overcoming these and other deficiencies in the art.

SUMMARY OF THE INVENTION

One aspect of the present invention relates to a method of producing an improved asphalt. This method includes providing an asphalt binder; providing a compound of formula (I):

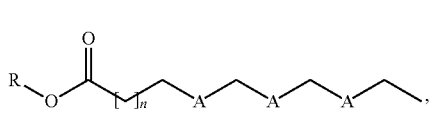
(I)

wherein:

each A is selected independently at each occurrence thereof from the group consisting of

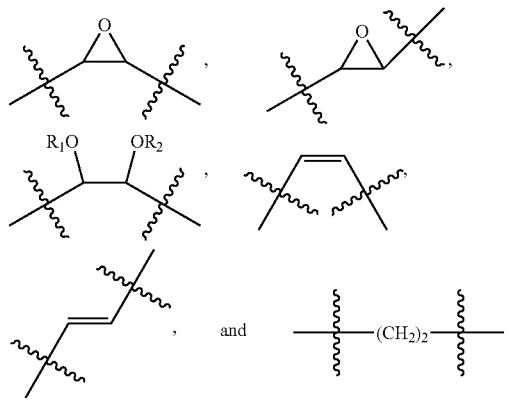

and wherein at least one A is

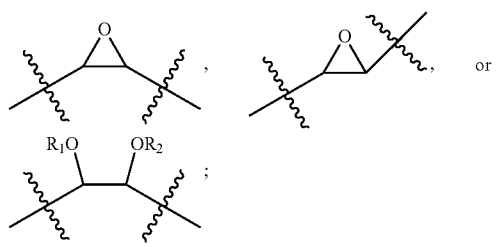

n=1-12;

each

represents the point of attachment to a —CH$_2$— group;

R is selected from the group consisting of C$_3$-C$_{23}$ alkyl and benzyl, wherein the C$_3$-C$_{23}$ alkyl can be optionally substituted with an aryl, heteroaryl, or heterocyclyl;

R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl. The asphalt binder is mixed with the compound of formula (I) under conditions effective to produce an improved asphalt.

A second aspect of the present invention relates to an asphalt product. The asphalt product includes an asphalt binder and a compound of formula (I):

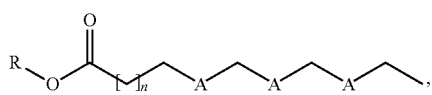
(I)

wherein:
  each A is selected independently at each occurrence thereof from the group consisting of

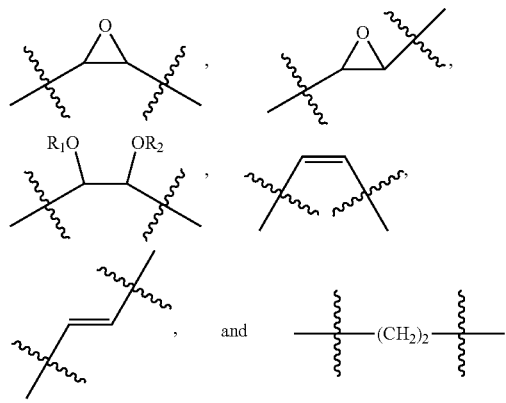

and
  wherein at least one A is

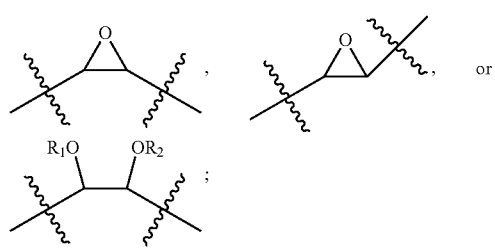

n=1-12;
each

represents the point of attachment to a —CH$_2$— group;

R is selected from the group consisting of C$_3$-C$_{23}$ alkyl and benzyl, wherein the C$_3$-C$_{23}$ alkyl can be optionally substituted with an aryl, heteroaryl, or heterocyclyl;

R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl.

A third aspect of the present invention relates to a method of making an asphalt material. The method includes (a) providing an improved asphalt product comprising: an asphalt binder and a compound of formula (I):

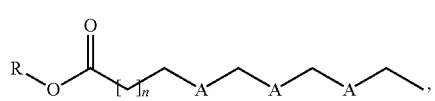 (I)

wherein:
  each A is selected independently at each occurrence thereof from the group consisting of

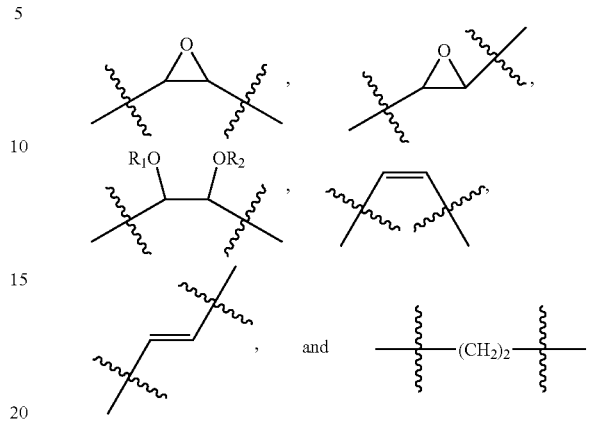

and
  wherein at least one A is

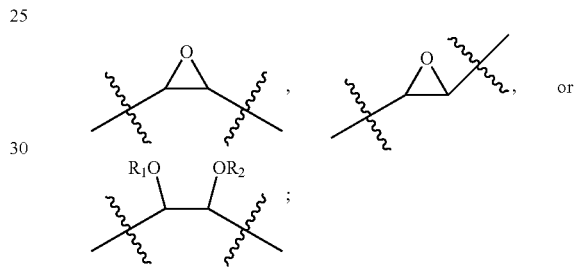

n=1-12;
each

represents the point of attachment to a —CH$_2$— group;

R is selected from the group consisting of C$_3$-C$_{23}$ alkyl and benzyl, wherein the C$_3$-C$_{23}$ alkyl can be optionally substituted with an aryl, heteroaryl, or heterocyclyl;

R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl, mixed with the asphalt binder, wherein the improved asphalt product has a complex shear modulus reduction of between 67% to 96% compared to that produced when the improved asphalt material is prepared in the absence of the compound of formula (I). The method further includes mixing the improved asphalt product with a mineral aggregate to coat the mineral aggregate and produce a heated paving material which has a dynamic modulus reduction compared to that produced when the improved asphalt material is prepared in the absence of the compound of formula (I); applying the heated paving material to a surface to be paved to form an applied paving material; and (d) compacting the applied paving material, to a void fraction of less than 8% to form a paved surface.

This invention presents a soybean-derived rejuvenator that is capable of achieving significant changes in the binder rheology at low dosages. These rheological changes are sustained with aging. This addresses a major drawback of currently available rejuvenators that require high dosages. Having a rejuvenator that is effective at low dosages provides a very economically viable alternative. This is in addition to the fact that using higher percentages of rejuvenators poses concerns regarding durability and the extent of chemical and physical changes of the original binder.

The present invention, for the first time, uses the compound of formula (I) to rejuvenate and/or soften asphalt both physically and chemically.

DETAILED DESCRIPTION OF THE INVENTION

Figure 1:
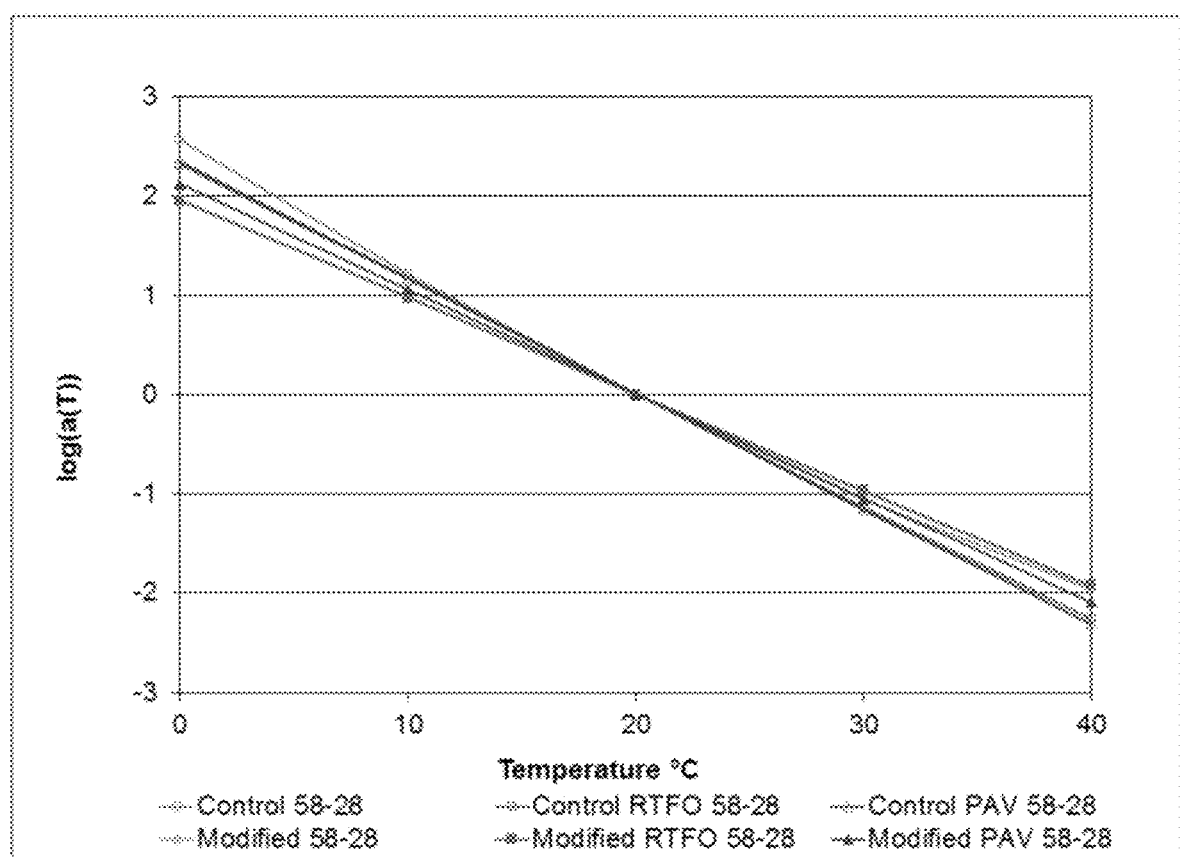
FIG. 1 shows log (aT) versus temperature for control and modified PG58-28 binders.

One aspect of the present invention relates to a method of producing an improved asphalt. This method includes providing an asphalt binder; providing a compound of formula (I):

$$R\diagdown_O\diagdown\overset{O}{\underset{\|}{C}}\diagdown[\phantom{x}]_n\diagdown A\diagdown A\diagdown A\diagdown \quad (I)$$

wherein:

each A is selected independently at each occurrence thereof from the group consisting of

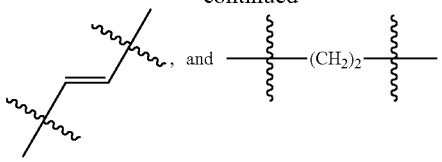

and
wherein at least one A is

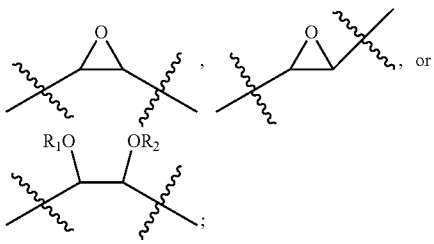

n=1-12;
each

represents the point of attachment to a —CH$_2$— group;
R is selected from the group consisting of C$_3$-C$_{23}$ alkyl and benzyl, wherein the C$_3$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl. The asphalt binder is mixed with the compound of formula (I) under conditions effective to produce an improved asphalt.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term "alkyl" means an aliphatic hydrocarbon group which may be straight or branched having about 1 to about 23 carbon atoms in the chain. For example, straight or branched carbon chain could have 1 to 10 carbon atoms. Branched means that one or more lower alkyl groups such as methyl, ethyl or propyl are attached to a linear alkyl chain. Exemplary alkyl groups include methyl, ethyl, n-propyl, i-propyl, n-butyl, t-butyl, n-pentyl, and 3-pentyl.

The term "benzyl" relates to a benzyl group as shown below

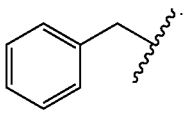 [SMILES: *Cc1ccccc1]

The term "aryl" means an aromatic monocyclic or multicyclic ring system of 6 to about 14 carbon atoms, preferably of 6 to about 10 carbon atoms. Representative aryl groups include phenyl and naphthyl.

The term "heteroaryl" means an aromatic monocyclic or multicyclic ring system of about 5 to about 14 ring atoms, preferably about 5 to about 10 ring atoms, in which one or more of the atoms in the ring system is/are element(s) other than carbon, for example, nitrogen, oxygen, or sulfur. In the case of multicyclic ring system, only one of the rings needs to be aromatic for the ring system to be defined as "heteroaryl," Preferred heteroaryls contain about 5 to 6 ring atoms. The prefix aza, oxa, thia, or thio before heteroaryl means that at least a nitrogen, oxygen, or sulfur atom, respectively, is present as a ring atom. A nitrogen atom of a heteroaryl is optionally oxidized to the corresponding N-oxide. Representative heteroaryls include pyridyl, 2-oxopyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3]dioxolyl, quinolinyl, isoquinolinyl, quinazolinyl, cinnolinyl, pthalazinyl, quinoxalinyl, 2,3-dihydrobenzo[1,4]dioxinyl, benzo[1,2,3]triazinyl, benzo[1,2,4]triazinyl, 4H-chromenyl, indolizinyl, quinolizinyl, 6aH-thieno[2,3-d]imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b)]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5]oxadiazolyl, benzo[c][1,2,5]thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2(3H)-yl, and the like.

As used herein, "heterocyclyl" or "heterocycle" refers to a stable 3- to 18-membered ring (radical) which consists of carbon atoms and from one to five heteroatoms selected from the group consisting of nitrogen, oxygen and sulfur. For purposes of this application, the heterocycle may be a monocyclic, or a polycyclic ring system, which may include fused, bridged, or spiro ring systems; and the nitrogen, carbon, or sulfur atoms in the heterocycle may be optionally oxidized; the nitrogen atom may be optionally quaternized; and the ring may be partially or fully saturated. Examples of such heterocycles include, without limitation, oxiranyl, azepinyl, azocanyl, pyranyl dioxanyl, dithianyl, 1,3-dioxolanyl, tetrahydrofuryl, dihydropyrrolidinyl, decahydroisoquinolyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, 2-oxoazepinyl, oxazolidinyl, oxiranyl, piperidinyl, piperazinyl, 4-piperidonyl, pyrrolidinyl, pyrazolidinyl, thiazolidinyl, tetrahydropyranyl, thiamorpholinyl, thiamorpholinyl sulfoxide, and thiamorpholinyl sulfone. Further heterocycles and heteroaryls are described in Katritzky et al., eds., *Comprehensive Heterocyclic Chemistry: The Structure, Reactions,*

*Synthesis and Use of Heterocyclic Compounds*, Vol. 1-8, Pergamon Press, N.Y. (1984), which is hereby incorporated by reference in its entirety.

The term "monocyclic" used herein indicates a molecular structure having one ring.

The term "polycyclic" or "multi-cyclic" used herein indicates a molecular structure having two or more rings, including, but not limited to, fused, bridged, or spiro rings.

The term "epoxide" or "oxirane" includes an epoxide ring (i.e., group) as shown below:

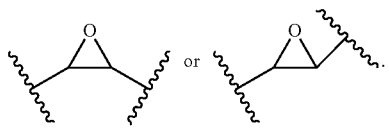 [SMILES: *C1OC1* ; *C1OC1*]

The term "substituted" or "substitution" of an atom means that one or more hydrogen on the designated atom is replaced with a selection from the indicated group, provided that the designated atom's normal valency is not exceeded.

"Unsubstituted" atoms bear all of the hydrogen atoms dictated by their valency. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture.

The term "optionally substituted" is used to indicate that a group may have a substituent at each substitutable atom of the group (including more than one substituent on a single atom), provided that the designated atom's normal valency is not exceeded and the identity of each substituent is independent of the others. Up to three H atoms in each residue are replaced with alkyl, halogen, haloalkyl, hydroxy, lower alkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. "Unsubstituted" atoms bear all of the hydrogen atoms dictated by their valency. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture.

Compounds described herein may contain one or more epoxide (oxirane) rings, and unless specified otherwise, it is intended that the compounds include both cis- or trans-isomers and mixtures thereof. When the compounds described herein contain olefinic double bonds or other centers of geometric asymmetry, and unless specified otherwise, it is intended that the compounds include both E and Z geometric isomers.

Asphalt includes material in which the predominating constituents are bitumens, which occur in nature or are obtained in petroleum processing. Bitumens include solid, semisolid, or viscous substances, natural or manufactured, composed principally of high molecular weight hydrocarbons. The asphalt used in the present invention is not particularly limited, and various kinds of asphalts may be used in the present invention. Examples of the asphalt include straight asphalts such as petroleum asphalts for pavements, as well as polymer-modified asphalts produced by modifying asphalt with a polymer material including a thermoplastic elastomer such as styrene/butadiene block copolymers (SBS), styrene/isoprene block copolymers (SIS), and ethylene/vinyl acetate copolymers (EVA).

Suitable grades of asphalt include, but are not limited to, the following: PG52-22, PG58-22, PG64-22, PG67-22, PG70-22, PG76-22, PG82-22, PG52-28, PG58-28, PG64-28, PG67-28, PG70-28, PG76-28, PG52-34, PG58-34, PG64-34, PG64-16, PG67-16, PG70-16, PG76-16, PG64-10, PG67-10, PG70-10, PG76-10, pen grade 40-50, pen grade 60-70, pen grade 85-100, pen grade 120-150, AR4000, AR8000, AC10 grade, AC20 grade, and AC30 grade. Roberts et al., "Hot Mix Asphalt Materials, Mixture Design, and Construction," *NAPA Research and Education Foundation* (2nd ed.) (1996), which is hereby incorporated by reference in its entirety.

Renewable source-derived fats and oils comprise glycerol triesters of fatty acids. These are commonly referred to as "triglycerides" or "triacylglycerols ("TAG")." Fats and oils are usually denoted by their biological source and contain several different fatty acids typical for each source. For example, the predominant fatty acids of soybean oil are the unsaturated fatty acids oleic acid, linoleic acid, and linolenic acid, and the saturated fatty acids palmitic acid and stearic acid. Other fatty acids are present at low levels. Triglycerides are the main component of natural oils and are composed of three fatty acids groups connected by a glycerol centre. Epoxidized triglycerides can be found as such in nature, for instance in *Vernonia* plants, or can be conveniently synthesized from more common unsaturated oils by using a standard epoxidation process. See U.S. Patent Publ. No. 20120156484 to Vendamme et al., which is hereby incorporated by reference in its entirety.

Unsaturated fatty acids are susceptible to epoxidation to form fatty acids bearing epoxide rings. Thus, triglycerides containing unsaturated fatty acids can be subjected to epoxidation to form epoxidized triglycerides in which one, two, or all three fatty acids bear at least one epoxide ring. Diglycerides (diacylglycerols, "DAG") are obtained when one fatty acid is removed from a triglyceride, typically by hydrolysis; monoglycerides (monoacylglycerols, "MAG") are obtained when two fatty acids are removed from a triglyceride.

An epoxidized compound of formula (I) according to the present invention means that at least one of the double bonds of the unsaturated fatty acid ester is oxidized to an epoxy group. Such oxidations are well known in the art and can be readily accomplished in an industrial scale, e.g., by using hydrogen peroxide and a carboxylic acid (e.g., formate or acetate), or by the halohydrin method. It is understood by those skilled in the art that in practice, epoxidized compounds of formula (I) may contain various quantities of by-products arising from hydrolysis or rearrangement of epoxides and from cross-linking of the fatty acid chains. Use of epoxidized compounds of formula (I) containing small quantities of epoxidation by-products and epoxide decomposition by-products is included within the scope of the present disclosure. See WO 2007062158 to Selifonov, which is hereby incorporated by reference in its entirety.

Epoxidized compounds of formula (I) can be subjected to esterification reactions with polyhydric alcohols (such as sugars, sugar acids, glycerol and glycols) to form epoxidized esters of polyols, or with monohydric alcohols (such as benzyl alcohol, methanol, ethanol, propanols, butanols and longer alcohols, furan-containing alcohols (such as tetrahydro-2-furanmethanol and 2-furanmethanol), glycidol, and fusel oil) to form epoxidized monoesters. Alternatively, epoxidized esters of polyols or of monohydric alcohols can be obtained by subjecting the esters to epoxidation.

In addition, triglyceride oils have long been subjected to a process called "blowing" to make blown oils. In this process, the triglycerides are heated in the presence of air or oxygen (often blown through the oil). The double bonds of the fatty acids in the oils react to form both epoxides and dimers of the oils. The epoxidized crosslinked oil can be subjected to hydrogenation (a common vegetable oil process for removing double bonds from oils) to yield asphalt modifiers. Useful processes are described in U.S. Pat. Nos. 7,994,107, 8,198,223, and 8,198,224 to Bloom, all of which are hereby incorporated by reference in their entirety.

Renewable source derived fats and oils include algal oil, animal fat, beef tallow, borneo tallow, butterfat, camelina oil, candlefish oil, canola oil, castor oil, cocoa butter, cocoa butter substitutes, coconut oil, cod-liver oil, colza oil, coriander oil, corn oil, cottonseed oil, false flax oil, flax oil, float grease from wastewater treatment facilities, hazelnut oil, hempseed oil, herring oil, illipe fat, jatropha oil, kokum butter, lanolin, lard, linseed oil, mango kernel oil, marine oil, meadowfoam oil, menhaden oil, microbial oil, milk fat, mowrah fat, mustard oil, mutton tallow, neat's foot oil, olive oil, orange roughy oil, palm oil, palm kernel oil, palm kernel olein, palm kernel stearin, palm olein, palm stearin, peanut oil, phulwara butter, pile herd oil, pork lard, radish oil, ramtil oil, rapeseed oil, rice bran oil, safflower oil, sal fat, salicornia oil, sardine oil, sasanqua oil, sesame oil, shea fat, shea butter, soybean oil, sunflower seed oil, tall oil, tallow, tigernut oil, tsubaki oil, tung oil, triacylglycerols, triolein, used cooking oil, vegetable oil, walnut oil, whale oil, white grease, yellow grease, and derivatives, conjugated derivatives, genetically-modified derivatives, and mixtures of any thereof. In one embodiment, the compound of formula (I) is derived from sources selected from the group consisting of fish oil, animal oil, vegetable oil, synthetic and genetically-modified plant oils, and mixtures thereof. Examples of vegetable oil include high erucic acid rapeseed oil, safflower oil, canola oil, castor oil, sunflower oil, and linseed oil. In another embodiment, the compound of formula (I) is derived from a source other than soybean oil or corn oil.

The compound of formula (I) of the present invention may be modified or unmodified, partially or fully epoxidized, non-epoxidized, or partially or fully hydrogenated. In one embodiment, the compound of formula (I) is methylated, hydrogenated, and/or hydrolyzed. The fatty acid esters of the present invention may be derived from a plant oil, animal fat, or a synthetic triglyceride. In one embodiment, the compound of formula (I) is the compound of formulae (Ia)-(Ik):

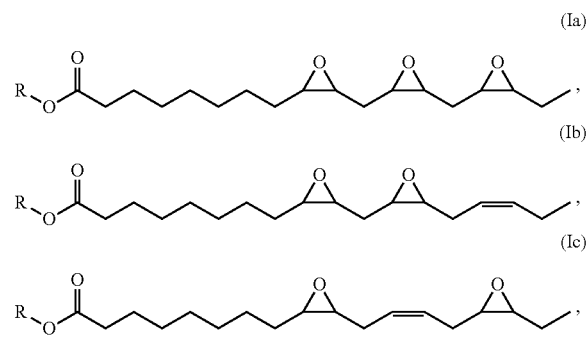

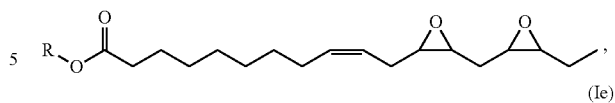

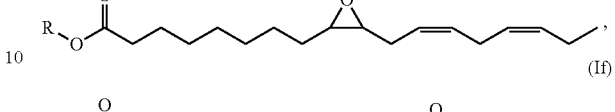

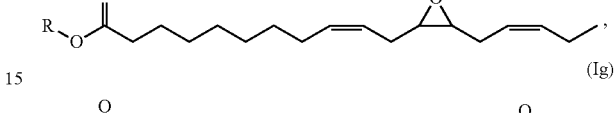

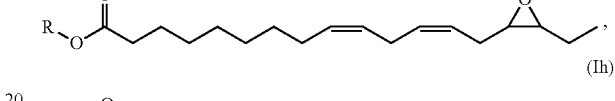

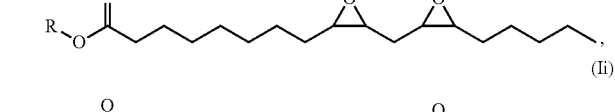

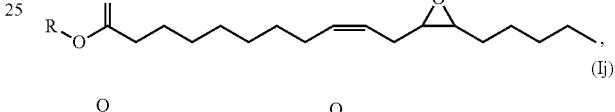

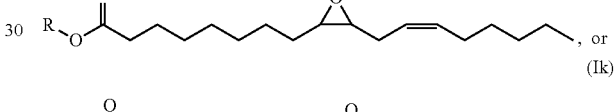

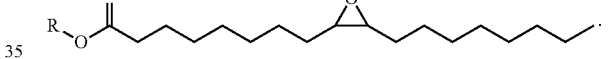

The fatty acid esters derived from plant or animal oil of the present invention may be polymerized. The polymerized plant oil or animal oil can be subsequently partially or fully saturated via a catalytic hydrogenation post-polymerization. The monomeric oils used in the compounds of formula (I) can be any triglycerides or triglyceride mixtures that are radically polymerizable. These triglycerides or triglyceride mixtures are typically plant oils. Suitable plant oils include, but are not limited to, a variety of vegetable oils such as soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and mixtures thereof. Typical vegetable oil used herein includes soybean oil, linseed oil, corn oil, flax seed oil, or rapeseed oil, and the resulting compounds of formula (I) is polymerized triglyceride or triglyceride derivatives.

Suitable epoxidized compounds of formula (I) according to the present invention include, but are not limited to, epoxidized benzyl soyate and epoxidized isoamyl soyate. Others include epoxidized methyl soyate, epoxidized soybean oil, and epoxidized corn oil. In one embodiment, the compound of formula (I) is epoxidized benzyl soyate. In another embodiment, the compound of formula (I) is epoxidized isoamyl soyate. The fatty acid esters may also include, for example, epoxidized methyl linoleate; benzyl, ethyl, fusel oil, furanoic alcohols (tetrahydro-2-furanmethanol and 2-furanmethanol), glycidol, SBO TAG, DAG, MAG, glycols, and blown oils such as the above-mentioned linseed oil, rapeseed oil, castor oil and soybean oil. The improved asphalt may include one or more specific compounds from those encompassed by the compound of formula (I).

Epoxidized triglycerides are commercially available. See U.S. Patent Publ. No. 20120156484 to Vendamme et al., which is hereby incorporated by reference in its entirety. For example, epoxidized linseed oil (ELO) is available from Cognis (Düsseldorf, Germany) under the trade name DEHYSOL B316 SPEZIAL, or Arkema (King of Prussia, Pa.) under the trade name VIKOFLEX 7190. An exemplary structure of an epoxidized triglyceride of linseed oil is as follows:

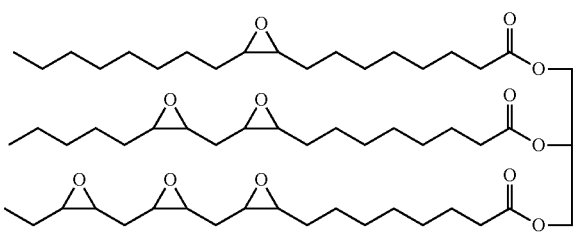 [SMILES: CCCCCCCCC1OC1CCCCCCCC(=O)OCC(COC(=O)CCCCCCCC1OC1CC1OC1CC1OC1CC)OC(=O)CCCCCCCC1OC1CC1OC1CCCCC]

Epoxidized soybean oil (ESBO) is commercially available from Cognis (Düsseldorf, Germany) under the trade name DEHYSOL D82, or from Arkema (King of Prussia, Pa.) under the trade name VIKOFLEX 7170. See U.S. Patent Publ. No. 20120156484 to Vendamme et al., which is hereby incorporated by reference in its entirety.

Methods of making epoxidized benzyl soyate and epoxidized isoamyl soyate are known the art and would be readily available to one skilled in the art. Likewise, methods of making benzyl soyate and other benzoate compounds are also known in the art. See e.g., U.S. Pat. No. 9,000,196 to Hagberg et al., and U.S. Pat. No. 6,797,753 to Benecke et al, both of which are hereby incorporated by reference in their entirety. Soyate relates to a mixture of fatty acids derived from soybean oil. For example, "benzyl soyate" describes the product of the reaction of making benzyl esters of soybean oil, and "isoamyl soyate" describes the product of the reaction of making isoamyl esters of soybean oil. Further examples of materials that may, in some embodiments, work as rejuvenators in accordance with the present invention include:

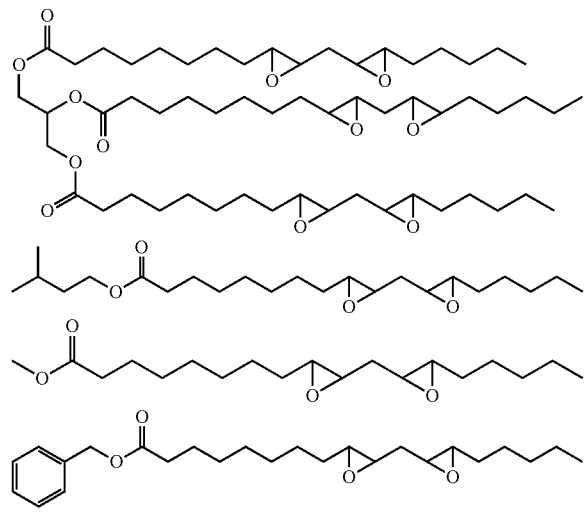

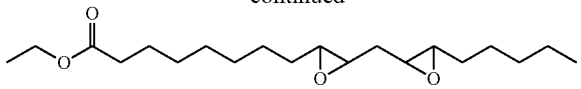

Primary plasticizers have been reported where the plasticizers contain fatty acids derived from vegetable oils and the fatty acids are substantially fully esterified with an alcohol (monool or polyol), the fatty acids have unsaturated bonds that are substantially fully epoxidized, and the fatty acids are added substantially randomly to one or more hydroxyl sites on the alcohol. See U.S. Pat. No. 6,797,753 to Benecke et al, which is hereby incorporated by reference in its entirety. Primary plasticizers include, but are not limited to, epoxidized pentaerythritol tetrasoyate, epoxidized propylene glycol disoyate, epoxidized ethylene glycol disoyate, epoxidized methyl soyate, epoxidized sucrose octasoyate, and the epoxidized product of soybean oil interesterified with linseed oil.

There are several known methods by which these plasticizers may be made. See U.S. Pat. No. 6,797,753 to Benecke et al, which is hereby incorporated by reference in its entirety. In one embodiment, the vegetable oil fatty acids are linked by direct esterification to monoalcohols or polyalcohols, and the esterified products are then epoxidized. In an additional embodiment, the direct esterification step is replaced with transesterification, whereby the monool or polyol reacts with a lower alkyl ester of a vegetable oil fatty acid to produce the desired ester plus a lower alcohol. The ester is then epoxidized. In yet another embodiment, a first ester is interesterified with a second ester, and the desired ester is again epoxidized.

Compounds of formula (I) that are useful as primary plasticizers in a phthalate-free system and which are suitably nonvolatile, not petroleum-based, and capable of imparting thermal stability to formulations presently using phthalate plasticizers, including those based on PVC, other halogenated polymers, acid-functionalized polymers, anhydride-functionalized polymers, and nitrile rubbers are known in the art and described in WO 2009/102877 to Eaton, which is hereby incorporated by reference in its entirety.

Suitable epoxidized compounds of formula (I) plasticizers may include epoxidized biodiesel (conventionally, fatty acid benzyl esters of soy and isoamyl esters of soy, rapeseed or palm oils, though $C_1$-$C_{14}$ esters are more generally contemplated) and epoxidized derivatives of fatty acid esters of biodiesel. Methods for making the epoxidized fatty acid esters involve formation of the fatty acid ester first, followed by epoxidation of the ester.

Epoxidized benzyl soyate esters and isoamyl esters are known to those skilled in the art to be made starting from epoxidized soybean oil by alcoholysis, see U.S. Pat. No. 3,070,608 to Kuester et al., which is hereby incorporated by reference in its entirety.

Reduced color epoxidized fatty acid esters (such as epoxidized benzyl soyate and epoxidized isoamyl soyate) according to the present invention can be made from an epoxidized natural fat or oil (such as epoxidized soybean oil) through the inclusion of borohydride in either a transesterification process or in an interesterification process. See U.S. Patent Publ. No. 2014/0113999 to Howard et al., which is hereby incorporated by reference in its entirety.

In accordance with the present invention, the addition of the borohydride and starting from an epoxidized natural fat or oil does not to detract in a material way from the other commercially-relevant performance attributes of a plasticized polymer composition incorporating such a reduced color epoxidized fatty acid ester, as compared to an equivalent composition prepared using an epoxidized fatty acid ester made according to the methods known in the art. Given the indication in the WO 2009/102877 to Eaton, which is hereby incorporated by reference in its entirety, that epoxides made from esters of fatty acids such as the epoxidized benzyl or isoamyl ester of soy oil are often too volatile to serve as useful plasticizers of PVC, this was a finding of considerable significance for the specific reduced color epoxidized fatty acid ester, epoxidized benzyl soyate (EBS) and epoxidized isoamyl soyate (EIS). Rather than being dependent on the production economics or availability of biodiesel, which are in turn to some extent dependent on fuels demand, pricing, and usage patterns, EBS and EIS could be made with an available supply of epoxidized soybean oil—the supply and demand for which is at least to some extent related to demand for the same plasticized PVC compositions in which ESO can be used as a secondary plasticizer and thermal stabilizer, and not to conditions in the fuel markets.

Alternatively, epoxidized compounds of formula (I) (especially of benzyl alcohol) of the present invention can be made from fats or oils by the process of transesterifying a low moisture epoxidized natural fat or oil by combination with a first alcohol in the presence of a transesterification catalyst and under conditions which are effective for carrying out the transesterification reaction. After the resultant product mixture from the reaction of the first alcohol and low moisture epoxidized natural fat or oil phase separates into an epoxidized fatty acid ester phase and a second phase comprising byproduct glycerol, the second phase is substantially removed. The epoxidized fatty acid esters in the epoxidized fatty acid ester phase from the first transesterification step are combined with more of the first alcohol and with a second alcohol which includes 5 to 7 members in a ring structure in the presence of a transesterification catalyst and under conditions effective for forming epoxidized fatty acid esters of the second alcohol in a second transesterification step. The first alcohol is continuously removed during the second transesterification step. See U.S. Patent Publ. No. 2015/0225358 to Howard et al., which is hereby incorporated by reference in its entirety. Sodium borohydride may also be incorporated into the process to make lighter materials, if necessary.

Epoxidized compounds of formula (I) of the present invention, particularly benzyl esters, may be in the form of a composition comprising one or more unsaturated fatty acid esters of alcohols which include a five to seven member ring structure. That composition contains not more than about 5.0 percent by weight of the total weight of material of monoglycerides and diglycerides combined and can be made by the process disclosed in U.S. Pat. No. 8,703,849 to Hagberg et al., which is hereby incorporated by reference in its entirety.

The asphalt of the present invention may contain anywhere from 0.1% to 100% by weight compounds of formula (I). More preferably, the asphalt contains from about 0.5% to about 40% by weight compounds of formula (I). For example, the asphalt may contain about 0.1, 1%, 2%, 3%, 4%, 5%, 6%, 7%, 8%, 9%, 25%, 40%, 50%, 60%, 70%, 80%, 90, or 100% by weight compounds of formula (I). In one embodiment, the compound of formula (I) is mixed in an amount of 0.1 to 15.0 wt % with the asphalt binder. In an alternative embodiment, the compound of formula (I) may be mixed with asphalt to form a composition containing an amount of 0.1 to 5.0 wt % of the compound of formula (I) with the asphalt binder. In yet another embodiment, the compound of formula (I) is mixed in an amount of 5.0 to 99.0 wt % with the asphalt binder to form a master batch. The master batch is a highly concentrated sample of the improved asphalt, which can be shipped for further dilution with asphalt and be applied. In such an embodiment, the method further comprises mixing the master batch with asphalt to form a composition containing an amount of 0.1 to 15.0 wt % of the compound of formula (I) for direct application of the improved asphalt. In some embodiments, the amount of the compound of formula (I) (e.g., EBS) may be 5%, 25%, 50%, 75% or 99% by weight of the improved asphalt.

In various embodiments, the present invention includes a product produced by the methods described herein.

In the present invention, the term asphalt product includes a warm-melt flowable mixture of warm-mix binder of bituminous type optionally together with mineral filler. An asphalt product does not need to be roller compacted when implemented. It should thus be easily cast and spread. Examples of asphalt products include, in particular, asphalts, sealants, pavement seals and heat sealing materials. The asphalt binder of the present invention may be selected from the group consisting of unaged asphalt binder, aged asphalt binder from recycled asphalt pavement, vacuum tower distillation bottom binder, aged asphalt binder from recycled asphalt shingles, de-asphalting bottoms, residuum oil supercritical extraction unit bottoms, and mixtures thereof.

The improved asphalt may further include a carboxyl additive and/or a polymer additive, such as a styrene-butadiene type polymer, polyethylenes, oxidized polyethylenes, polyolefins, PE homopolymers, and the like. The polymer additive can include low molecular weight polymers, such as low, medium, or high density polyethylenes having a maximum viscosity of 1000 cps at 140° C. Other suitable polymers would include ethylenes and polypropylenes with melting points below 140° C. The polymer additive is preferably added at a concentration of up to about 1%, 5%, 10%, 15%, 20%, 25%, and 50% by weight of the improved asphalt.

The styrene-butadiene type polymer can include at least one of SB rubber, SBS linear type, SBS radial type, and SB sulphur linked type polymers, and the like. The asphalt binder optionally includes up to about 5% by weight styrene-butadiene type polymer. Any suitable polymer or mixture of different polymers can be used in producing polymer-modified asphalt. Non-limiting examples of suitable polymers include polyethylene, polypropylene, styrene/butadiene/styrene triblock copolymer, styrene/ethylene-butylene/styrene triblock copolymer, epoxy modified acrylate copolymer, ethylene/vinyl acetate copolymer, or mixture thereof.

In an embodiment of the present invention, asphalt and the compound of formula (I) may be combined with bio-oil to form a substantially homogeneous mixture. The homogenous material can be graded according to AASHTO MP3 and used as an asphalt binder in paving projects.

In another embodiment, the improved asphalt may have a high temperature performance grade measured at a temperature between about −28° C. to 116° C., wherein the high temperature performance grade of the improved asphalt is achieved at a temperature, which is reduced by 3° C. to 90° C. compared to that produced by an improved asphalt product prepared in the absence of the compound of formula (I). In another embodiment, the improved asphalt may have a low temperature performance grade measured at a temperature between about −16° C. to −40° C., wherein the low temperature performance grade of the improved asphalt is achieved at a temperature, which is reduced by 3° C. to 60° C. compared to that produced by an improved asphalt product prepared in the absence of the compound of formula (I).

High temperature performance relates to the critical high temperature of the improved asphalt. Low temperature performance relates to the critical low temperature of the improved asphalt. At high temperatures, pavements generally become soft; and at low temperatures, pavements generally become brittle. The technology described herein is novel in producing an improved composition in that it "lowers" the high temperature performance grade to the desired level whilst at the same time improving the low temperature performance grade value to the desired grade i.e., the unique ability to "shift" the useful performance temperature range of the asphalt composition.

The benefits of this technology include a low cost, efficient, and environmentally-friendly asphalt composition that acts as a rejuvenator and/or a softener and performs better than currently known asphalt compositions. Further, the compound of formula (I) reduces plant emissions and represents the development of green materials/technology that are renewable, and lessens the reliance on foreign crude oil.

Another aspect of the present invention relates to an asphalt product. The asphalt product includes an asphalt binder and a compound of formula (I):

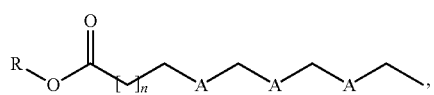
(I)

wherein:
each A is selected independently at each occurrence thereof from the group consisting of

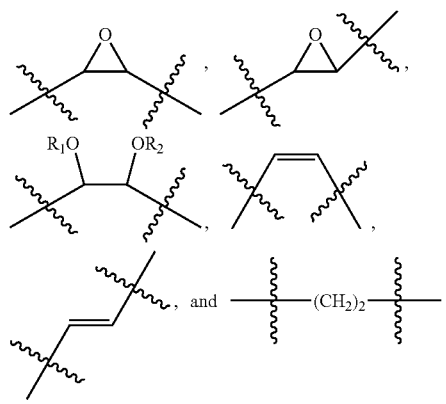

and
wherein at least one A is

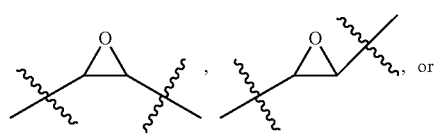
or

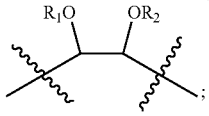

n=1-12;
each

represents the point of attachment to a —CH$_2$— group;
R is selected from the group consisting of C$_3$-C$_{23}$ alkyl and benzyl, wherein the C$_3$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl.

The asphalt and compound of formula (I) used in this aspect of the present invention are described above.

In one embodiment of the present invention, the asphalt product further includes a mineral aggregate. A mineral aggregate may be added to the asphalt product to modify its rheology and temperature susceptibility. In an alternative embodiment, the asphalt product includes asphalt concrete used in pavement. The asphalt binder is mixed with mineral aggregate typically composed of sand, gravel, limestone, quartzite, granite, crushed stone, recycled asphalt pavement (RAP), recycled asphalt shingles (RAS), de-asphalting bottoms, residuum oil supercritical extraction unit bottoms (ROSE unit bottoms), and combinations thereof. The mineral aggregate particles of the present invention include calcium based aggregates, for example, limestone, siliceous based aggregates and mixtures thereof. Aggregates can be selected for asphalt paving applications based on a number of criteria, including physical properties, compatibility with the bitumen to be used in the construction process, availability, and ability to provide a finished pavement that meets the performance specifications of the pavement layer for the traffic projected over the design life of the project.

In one embodiment, the asphalt product is in the form of asphalt concrete or an asphalt mixture. The asphalt mixture may further include fiberglass and a mineral aggregate. The mineral aggregate may include lime dust and/or granular ceramic material. Mineral aggregates of the present invention may include elements of less than 0.063 mm and optionally aggregates originating from recycled materials, sand with grain sizes between 0.063 mm and 2 mm and optionally grit, containing grains of a size greater than 2 mm, and optionally alumino-silicates. Aluminosilicates are inorganic compounds based on aluminium and sodium silicates or other metal such as potassium or calcium silicates. Aluminosilicates reduce the viscosity of the warm-mix and are in the form of a powder and/or granulates. The term granulates refers to mineral and/or synthetic granulates, especially coated material aggregates, which are conventionally added to bituminous binders for making mixtures of materials for road construction.

In another embodiment, the asphalt product is used in roofing shingles. For a roofing-grade asphalt material, roofing granules can be applied to a surface of a coated base material. The roofing granules can be used for ultraviolet radiation protection, coloration, impact resistance, fire resistance, another suitable purpose, or any combination thereof. The roofing granules can include inert base particles that are durable, inert inorganic mineral particles, such as andesite, boehmite, coal slag, diabase, metabasalt, nephaline syenite, quartzite, rhyodacite, rhyolite, river gravel, mullite-containing granules, another suitable inert material, or any combination thereof. See U.S. Patent Publ. No. 2013/0160674 to Hong et al., which is hereby incorporated by reference in its entirety. In another embodiment, the asphalt product is used in a recycled asphalt pavement aggregate.

Roofing granules may also include one or more surface coatings over the shingle. The surface coating can cover at least approximately 75% of the surface of the shingle, and may cover at least approximately 90% of the surface of the shingle and may or may not have a uniform thickness. If more than one surface coating is used, a surface coating closer to the shingle can include a binder that can be inorganic or organic. An inorganic binder can include a silicate binder, a titanate binder, a zirconate binder, an aluminate binder, a phosphate binder, a silica binder, another suitable inorganic binder, or any combination thereof. An organic binder can include a polymeric compound. In a particular embodiment, an organic binder can include an acrylic latex, polyurethane, polyester, silicone, polyamide, or any combination thereof. One or more additional organic binders of the same or different composition can be used.

A surface coating may also or alternatively include a solar reflective material that helps to reflect at least some of the solar energy. For example, UV radiation can further polymerize or harden the asphalt within roofing product being fabricated. A solar reflective material can include titanium dioxide, zinc oxide, or the like. Alternatively, the solar reflective material can include a polymeric material. In one embodiment, a polymer can include a benzene-modified polymer (e.g., copolymer including a styrene and an acrylate), a fluoropolymer, or any combination thereof. Other solar reflective materials are described in U.S. Pat. No. 7,241,500 to Shiao et al. and U.S. Publ. Nos. 2005/0072109 to Shiao et at and 2008/0220167 to Wisniewski et al., all of which are incorporated by reference for their teachings of materials that are used to reflect radiation (e.g., UV, infrared, etc.) from the sun.

A surface coating can also or alternatively include an algaecide or another biocide to help reduce or delay the formation of algae or another organic growth. The algaecide or other biocide can include an organic or inorganic material. The algaecide or other biocide can include a triazine, a carbamate, an amide, an alcohol, a glycol, a thiazolin, a sulfate, a chloride, copper, a copper compound, zinc, a zinc compound, another suitable biocide, or any combination thereof. In a particular embodiment, the algaecide or other biocide can be included within a polymeric binder. The polymeric binder can include polyethylene, another polyolefin, an acid-containing polyolefin, ethylene vinyl acetate, an ethylene-alkyl acrylate copolymer, a polyvinylbutyral, polyamide, a fluoropolymer, an acrylic, a methacrylate, an acrylate, polyurethane, another suitable binder material, or any combination thereof. The algaecide or other biocide can be an inorganic material that is included within an inorganic binder, for example, within an alkali metal silicate binder. An exemplary inorganic algaecide or other biocide can include a metal (by itself), a metal oxide, a metal salt, or any combination thereof. The metallic element used within the metal, metal oxide, or salt may include copper, zinc, silver, or the like. The metal salt can include a metal sulfate, a metal phosphate, or the like.

A surface coating can include a colorant or another material to provide a desired optical effect. The colorant or other material can include a metal oxide compound, such as titanium dioxide (white), zinc ferrite (yellow), red iron oxides, chrome oxide (green), and ultramarine (blue), silver oxide (black), zinc oxide (dark green), or the like. In another embodiment, the colorant or other material may not be a metal-oxide compound. For example, the colorant may include carbon black, zinc or aluminum flake, or a metal nitride.

The asphalt containing the product may be mixed with fiberglass and mineral aggregate typically composed of lime dust and/or granular ceramic material, such as manufactured ceramic material to form roofing shingles. The shingles can also include manufactured sand, e.g., crushed and washed mined aggregate, and also a blend of ceramic material and manufactured sand. The roofing shingles can also include modified asphalt containing a Fischer-Tropsch wax, polyethylene wax, and/or oxidized polyethylene wax. Wax modifiers that can be usefully employed in the context of the present invention include, but are not limited to, waxes of vegetable (e.g. carnuba wax), animal (e.g beeswax) mineral (e.g. Montan™ wax from coal, Fischer Tropsch wax from coal) or petroleum (e.g. paraffin wax, polyethylene wax, Fischer-Tropsch wax from gas) origin including oxidized waxes; amide waxes (e.g. ethylene bis stearamide, stearyl amide, stearyl stearamide); fatty acids and soaps of waxy nature (e.g., aluminum stearate, calcium stearate, fatty acids); other fatty materials of waxy nature (fatty alcohols, hydrogenated fats, fatty esters etc) with the ability to stiffen asphalt, and the like. The above products are basically soluble in the asphalt at warm mix temperatures, to make a homogeneous binder, and/or will melt at the temperature of the mix and the ingredients will disperse/dissolve into the mixture. The wax and resin ingredients will generally act to improve cohesion properties of the asphalt, while the adhesion promoter will improve the adhesion of the asphalt to the aggregate. Together the ingredients provide improved resistance to water damage. The present invention may employ a Fischer Tropsch Wax derived from coal or natural gas or any petroleum feedstock. The process entails the gasification of the above feedstock by partial oxidation to produce carbon monoxide under high temperature and pressure and reaction of the resultant carbon monoxide with hydrogen under high temperature and pressure in the presence of a suitable catalyst (such as iron compound or cobalt compound) for example as in the case of processes employed by Shell and Sasol. The congealing point of the wax is between 68° C. and 120° C. with a Brookfield viscosity at 135° C. in the range of 8 to 20 cPs. For example, the congealing point of the wax may be between 80° C. and 120° C. Alternatively, the congealing point of the wax may be between 68° C. and 105° C. See U.S. Patent Publ. No. 2013/0186302 to Naidoo et al., which is hereby incorporated by reference in its entirety.

Another aspect relates to a method of making an asphalt material. The method includes (a) providing an improved asphalt product comprising: an asphalt binder and a compound of formula (I):

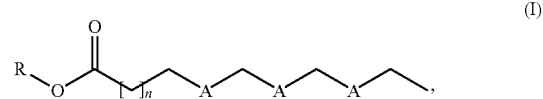

wherein:
each A is selected independently at each occurrence thereof from the group consisting of

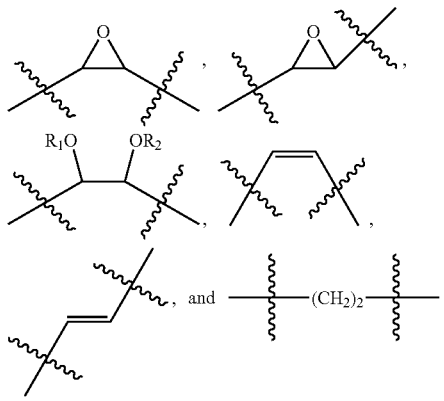

and
wherein at least one A is

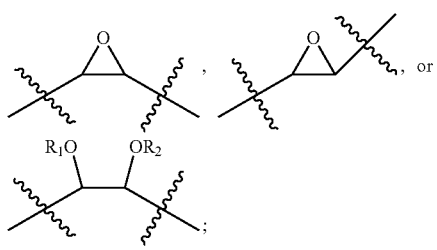

n=1-12;
each

represents the point of attachment to a —CH$_2$— group;
R is selected from the group consisting of C$_3$-C$_{23}$ alkyl and benzyl, wherein the C$_3$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl, mixed with the asphalt binder, wherein the improved asphalt product has a complex shear modulus reduction of between 67% to 96% compared to that produced when the improved asphalt material is prepared in the absence of the compound of formula (I) The method further includes mixing the improved asphalt product with a mineral aggregate to coat the mineral aggregate and produce a heated paving material which has a dynamic modulus reduction compared to that produced when the improved asphalt material is prepared in the absence of the compound of formula (I); applying the heated paving material to a surface to be paved to form an applied paving material; and (d) compacting the applied paving material, to a void fraction of less than 8% to form a paved surface.

The asphalt binder and compound of formula (I) of this aspect of the present invention are in accordance with the previously described aspects. In one embodiment, the asphalt used in carrying out this aspect of the present invention may be the above described polymer modified asphalt.

The present invention further relates to the asphalt material product of this method. In one embodiment, the asphalt material can be mixed with water and a surfactant and mechanically agitated, in for example, a shear mill, to form an emulsion. Suitable emulsion-forming surfactants are known to those of skill in the art. The emulsified asphalt material can be used as weather-proofing sealant or as an adhesive bonding layer between two surfaces.

In one embodiment, the mixing is carried out in a high speed shear mill at 100° C. to 150° C. and shear speeds at 250 RPM to 3000 RPM or at 0 to 5000 RPM. The mixing step may be carried out at a temperature of, for example, 150° C., 140° C., 130° C., 120° C., 110° C., 100° C., 90° C., 80° C., 70° C., 60° C., 50° C., 40° C., 30° C., 20° C., 10° C., 5° C., 4° C., 3° C., 2° C., 1° C., or any temperature in between. In one embodiment, mixing is carried out at 100-150° C.

The compound of formula (I) may, in one embodiment, be mixed in an amount of about 0.25% to 15.0% by weight of the binder and is blended with asphalt (PG 58-28 and PG 64-28). In another embodiment, the compound of formula (I) may be mixed in an amount of about 0.25% to 5.0% by weight of the binder and is blended with asphalt (PG 58-28 and PG 64-28). In yet another embodiment, upon blending, the compound of formula (I) may be in an amount of 0.75% weight of the binder with the asphalt, and the performance grade may change to PG 40-34 and PG 46-34. Amounts of 0.25%, 0.30%, 0.35%, 0.40%, 0.45%, 0.50%, 0.55%, 0.60%, 0.65%, 0.70%, and 0.75% are all examples of percent by weight of the binder that may be blended with the asphalt.

In one embodiment, at a frequency range of 0.01 Hz to 100 Hz and at a temperature of 21° C., the dynamic modulus of the improved asphalt material with PG 58-28 ranges from 100 MPa to 7,000 MPa and the dynamic modulus for the improved asphalt material prepared in the absence of the compound of formula (I) with PG 58-28 ranges from 700 MPa to 13,000 MPa. In an alternative embodiment, at a frequency range of 0.01 Hz to 100 Hz and at a temperature of 21° C., the dynamic modulus of the improved asphalt material with PG 64-28 ranges from 135 MPa to 7,000 MPa and the dynamic modulus for the improved asphalt material prepared in the absence of the compound of formula (I) with PG 64-28 ranges from 950 MPa to 12,000 MPa.

In an alternative embodiment, at a frequency range of 0.01 Hz to 100 Hz and at a temperature of 20° C., the complex shear modulus of the improved asphalt material with PG 58-28 ranges from 0.78 kPa to 10,700 kPa and the complex shear modulus for the improved asphalt prepared in the absence of the compound of formula (I) with PG 58-28 ranges from 19.3 kPa to 49,800 kPa. Likewise, at a frequency range of 0.01 Hz to 100 Hz and at a temperature of 20° C., the complex shear modulus of the improved asphalt material with PG 64-28 can range from 1.94 kPa to 11,000 kPa and the complex shear modulus for the improved asphalt prepared in the absence of the compound of formula (I) with PG 64-28 can range from 19.3 kPa to 33,000 kPa.

In one embodiment, at a test temperature of −6° C., the fracture energy of the improved asphalt material with PG 58-28 and RAP is above 400 J/m$^2$ and the fracture energy for the improved asphalt material prepared in the absence of the compound of formula (I) with PG 58-28 and RAP is below 400 J/m$^2$. For example, the fracture energy of the improved asphalt material (as measured, for example, by disk-shaped compact tension) with PG 58-28 and RAP ranges from 424 J/m² to 528 J/m² (i.e., is above 400 J/m²) and the fracture energy for the improved asphalt material prepared in the absence of the compound of formula (I) with PG 58-28 and RAP is about 377 J/m² (i.e., is below 400 J/m², which is typically specified as the minimum).

In one embodiment, the ΔTc (which quantifies the difference in continuous grade temperature for stiffness and relaxation properties) of the improved asphalt product produced in step (a), wherein the asphalt binder is an aged asphalt binder from RAP and PG 58-28, ranges from −8° C. to 4° C., where the ΔTc for the improved asphalt is increased by 0.1° C. to 10° C. compared to that produced by an improved asphalt product with aged asphalt binder from RAP and PG58-28 prepared in the absence of the compound of formula (I).

In another embodiment, at a temperature range of 25° C. to 31° C. and a strain rate of 5%, the fatigue life of the improved asphalt product produced in step (a) with aged asphalt binder from RAP and PG 58-28 is increased by between 100 cycles to 9000 cycles compared to that produced by an improved asphalt product with aged asphalt binder from RAP and PG58-28 prepared in the absence of the compound of formula (I). In one embodiment, the fatigue life is measured by the linear amplitude sweep (LAS) test. In one embodiment, the fatigue life of the improved asphalt product produced in step (a) with aged asphalt binder from RAP and PG 58-28 ranges from 100 cycles to 10000 cycles.

In one embodiment, the dynamic modulus reduction is between 42% to 86% compared to that produced when the improved asphalt material is prepared in the absence of the compound of formula (I).

The above disclosure generally describes the present invention. A more specific description is provided below in the following examples. The examples are described solely for the purpose of illustration and are not intended to limit the scope of the present invention. Changes in form and substitution of equivalents are contemplated as circumstances suggest or render expedient. Although specific terms have been employed herein, such terms are intended in a descriptive sense and not for purposes of limitation.

EXAMPLES

The following examples are intended to illustrate, but by no means are intended to limit, the scope of the present invention as set forth in the claims.

Example 1—Materials and Methods

Two asphalt binder grades were used in this study, namely PG 64-28 and PG 58-28 binders. The PG 64-28 binder is a polymer modified binder whereas the PG 58-28 is a neat binder. The additive used will be referred to in a generic term as a soybean-derived additive and included epoxidized benzyl soyate. The control bitumens are modified by blending 0.75% of the additive by mass of the total bitumen blend using a shear mill at 140° C.±2° C. and 3000 rpm for one hour. The blends as well as the control bitumen were then subjected to different aging conditions, namely Rolling Thin Film Oven (RTFO), and Pressure Aging Vessel (PAV).

To assess the high and low temperature performance of both the control and modified bitumens, Dynamic Shear Rheometer (DSR) and Bending Beam Rheometer (BBR) tests were conducted according to AASHTO T315 and AATHTO T313, respectively. Tests were done on unaged, RTFO aged, and PAV aged bitumens. Rolling Thin Film Oven (RTFO) aging was done according to ASTM D2872 at 163° C. for 85 minutes while PAV aging was performed on the RTFO aged bitumen according to ASTM D6521 for 20 hours at 100° C. and 2.1 MPa pressure. The viscosity of the unaged control and unaged modified bitumens were measured using a rotational viscometer according to AASHTO T316.

To further investigate the effect of the soybean derived additive on the rheological properties of asphalt, a frequency sweep using a DSR was done on the unaged, RTFO aged, and PAV aged bitumens. The frequency sweep covered a range of frequencies extending from 0.6 to 100 rad/s at temperatures of 0, 10, 20, 30 and 40° C., using a controlled strain of 1%. An 8-mm diameter and 2-mm gap geometry was used for all samples. This agrees with widely accepted recommendations to use the 8-mm diameter geometry for temperatures up to 40° C. Alavi et al., "Evaluation of the Combined Effects of Reclaimed Asphalt Pavement (RAP), Reclaimed Asphalt Shingles (RAS), and Different Virgin Binder Sources on the Performance of Blended Binders for Mixes with Higher Percentages of RAP and RAS," University of California Pavement Research Center (2015) and Haghshenas et al., "Research on High-RAP Asphalt Mixtures with Rejuvenators and WMA Additives," University of Nebraska-Lincoln (2016), which are hereby incorporated by reference in their entirety. For comparison reasons, the tests were repeated using a 25-mm diameter and 1-mm gap geometry for the unaged and RTFO aged samples. However, the 25-mm geometry resulted in erroneous high phase angles, possibly due to inaccuracies of torque measurements at low test temperatures. Hence, the results of the 25-mm diameter geometry were discarded and only the results from the 8-mm diameter geometry are shown here. Master curves were generated at a reference temperature of 20° C.

For all of the above tests, replicates of three samples were measured at each testing condition and the average values are reported.

Example 2—Master Curves

The performance of asphalt bitumens can be characterized with the aid of "master curves" which are constructed using the time-temperature superposition principle. Asphalt is viewed as a linear viscoelastic material at low strains with a temperature-dependent behavior. At high temperatures, asphalt behaves as a Newtonian fluid where the viscosity is constant regardless of the shear rate whereas at low temperatures a limiting modulus, referred to as glass modulus, is reached due to physical hardening effects. The time-temperature superposition allows calculation of asphalt stiffness over a wide range of temperatures and frequencies, using limited range measurements. Shift factors are calculated and used to shift the modulus values, at various temperatures, horizontally to plot a master curve of the material at a reference temperature. The shift factor ($a_T$) defines the ratio between the reduced frequency at the reference temperature ($\omega r$) and the frequency at the desired temperature ($\omega$), expressed as:

$$a_T = \frac{\omega_r}{\omega} \quad [1]$$

Figure 2:
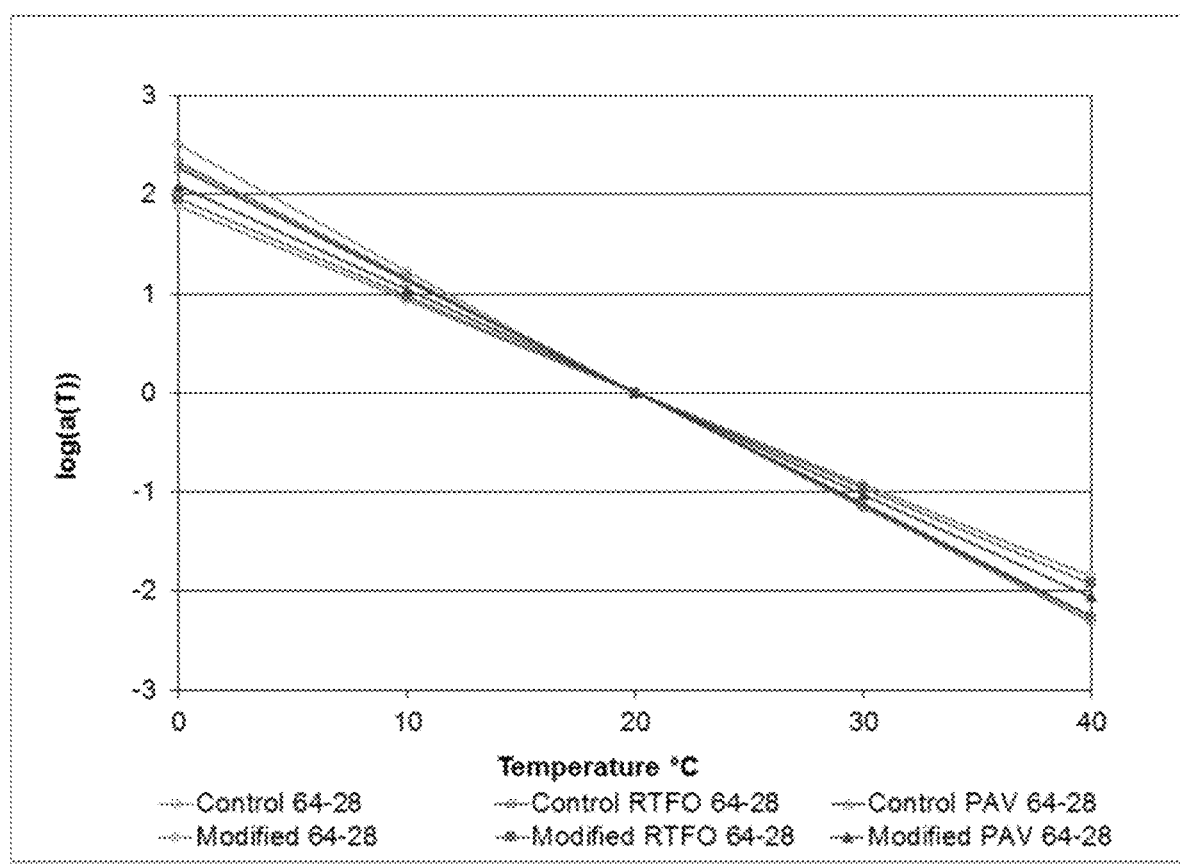
FIG. 2 shows log (aT) versus temperature for control and modified PG64-28 binders.

A number of models were proposed to calculate the shift factors, including Williams-Landel-Ferry (WLF) and Arrhenius models. For the purpose of this study, a second order polynomial relation that expresses log (aT) in terms of temperature was used (Kutay et al., "Preparation for Implementation of the Mechanistic-Empirical Pavement Design Guide in Michigan," Part 1-HMA Mixture Characterization, The Michigan Department of Transportation (2013), which is hereby incorporated by reference in its entirety):

$$\log(a_T) = a_1 T^2 + a_2 T + a_3 \quad [2]$$

where $a_1$, $a_2$, and $a_3$ are regression coefficients. The variation of log(aT) with temperature, as obtained using Equation 2, is shown in FIGS. 1 and 2 for both PG58-28 and PG64-28 binders, respectively.

The sigmoidal model has been used to describe the dynamic modulus of asphalt mixtures. Recently, it has been successfully applied by many researchers to model asphalt bitumens (Yao et al., "Evaluation of the Master Curves for Complex Shear Modulus for Nano-Modified Asphalt Binders," CICTP 2012: Multimodal Transportation Systems—Convenient, Safe, Cost-Effective, Efficient, pp. 3399-3414 (2012), which is hereby incorporated by reference in its entirety). The sigmoidal model can be used to represent the complex shear modulus of the bitumen G* in the following form:

$$\log|G^*| = \delta + \frac{\alpha}{(1 + e^{\beta + \gamma(\log(t_r))})} \quad [3]$$

Where tr is the reduced time of loading at the selected reference temperature, $\delta$ is the minimum value of G*, $\delta+\alpha$ is the maximum value of G*, and the parameters $\beta$ and $\gamma$ define the shape of the sigmoidal function.

Figure 3:
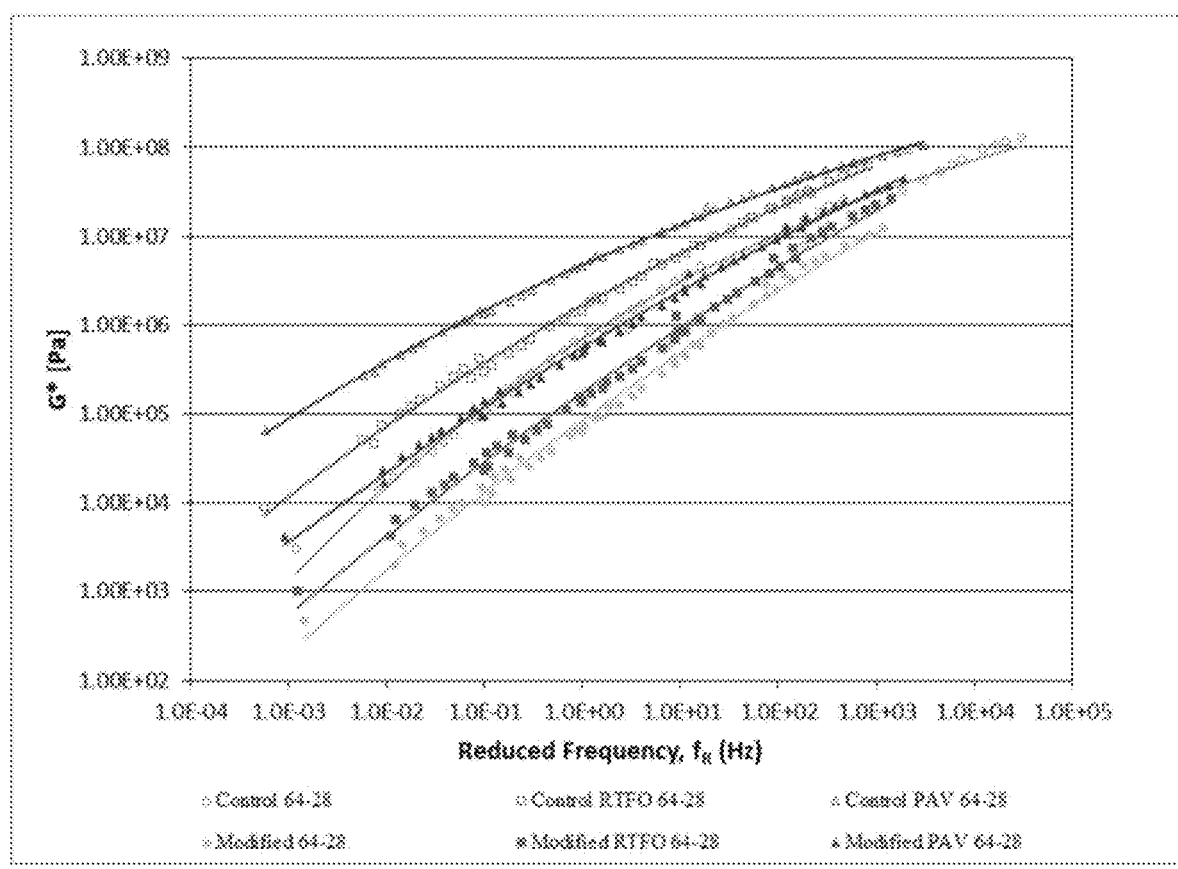
FIG. 3 shows master curves for the control and modified PG64-28 bitumens.
Figure 4:
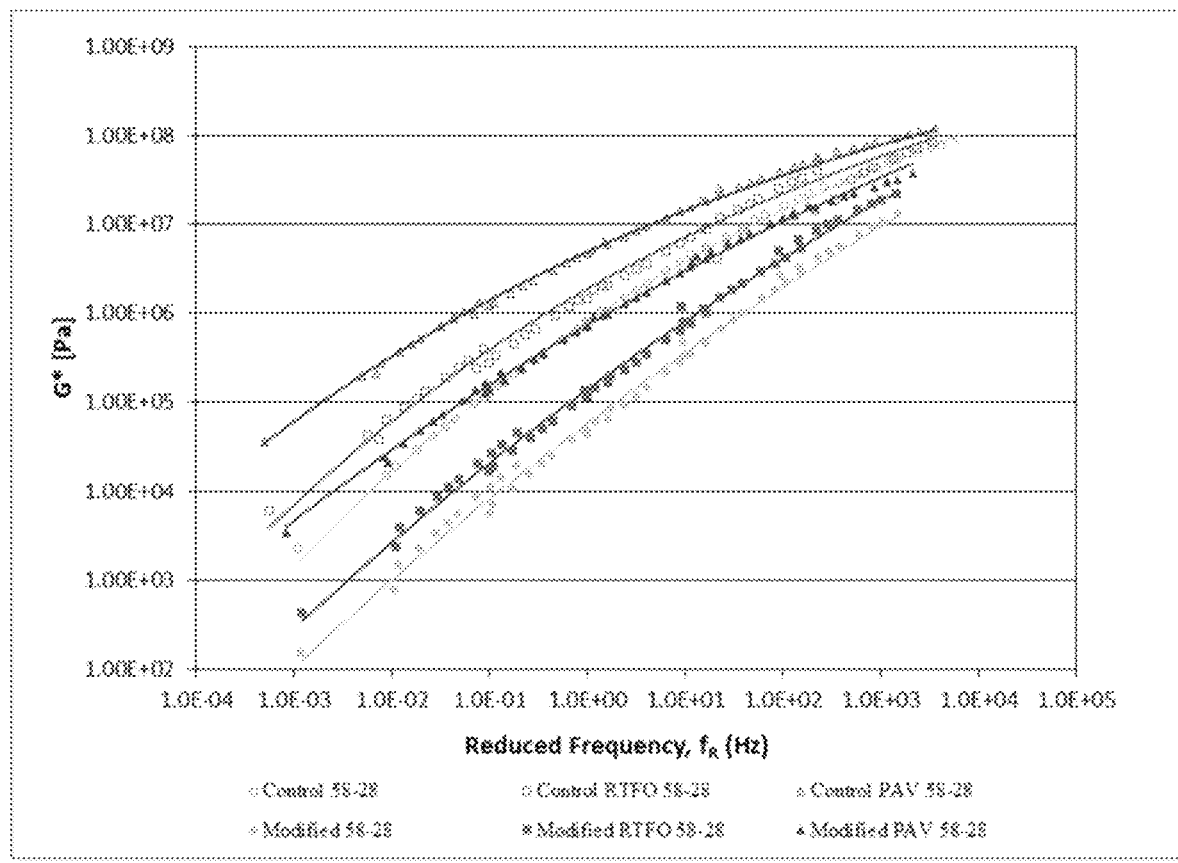
FIG. 4 shows master curves for the control and modified PG58-28 bitumens.

FIGS. 3 and 4 compare the G* master curves at the reference temperature of 20° C. for the PG64-28 and PG58-28 bitumens, respectively. The addition of the soybean modifier resulted in a reduction in the complex shear modulus at both high and low temperature ranges. The drop in the complex shear modulus was more significant in the low and intermediate temperature ranges, which is advantageous in terms of enhancing the fatigue and low-temperature thermal cracking resistance of the bitumen. The same trend was observed at all different aging stages of the two bitumen grades. The impact of the rejuvenator, at such low dosage, was substantial to the extent that the behavior of the PAV modified bitumen was comparable to the original unaged bitumen.

From the master curves, it can be concluded that the presence of the rejuvenator did not influence the aging characteristics of the bitumens. As expected, aging caused a distortion in the shape of the master curve indicating notable changes in the chemistry of the aged asphalt. Upon aging the master curve becomes flatter resulting in a decrease in temperature susceptibility. Aging also led to an upward shift in the master curve denoting an increase in the complex shear modulus. These changes that were associated with aging were noted for both the aged modified and aged control bitumens.

Figure 5:
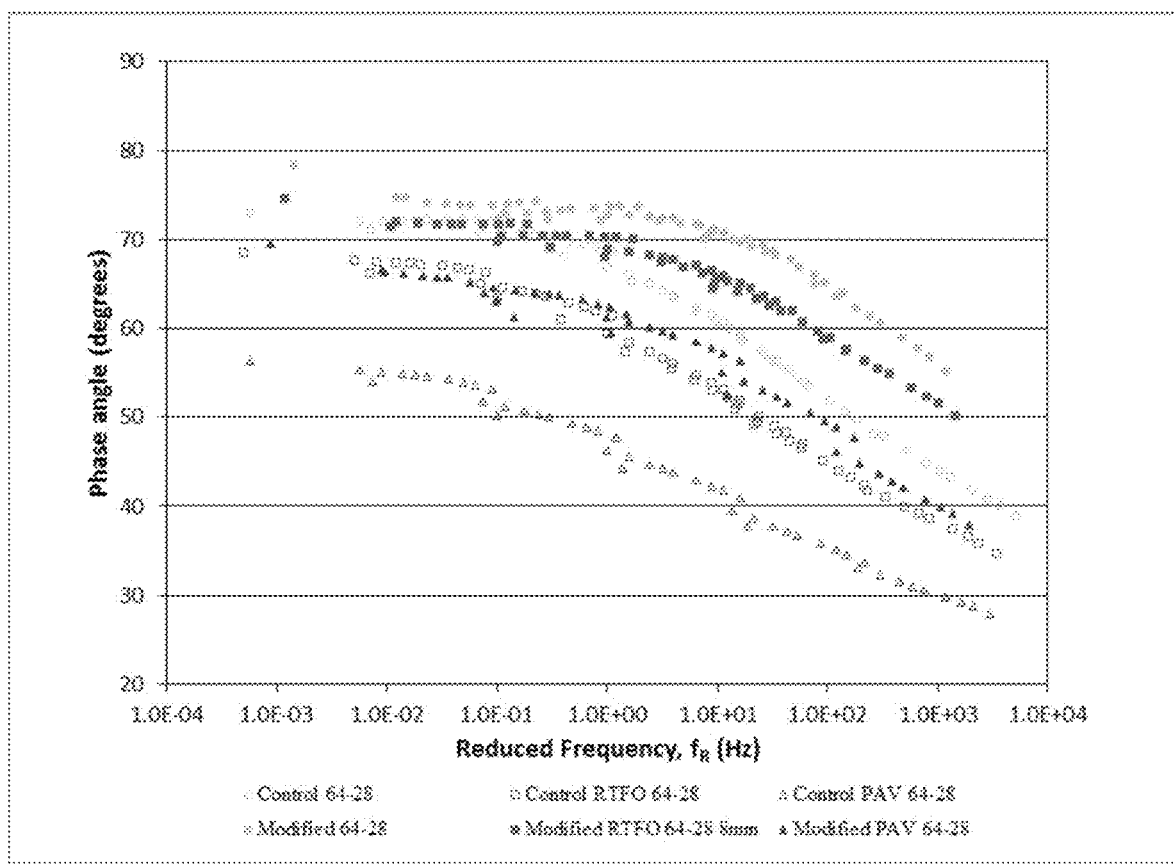
FIG. 5 shows phase angle master curves for the control and modified PG64-28 bitumen.
Figure 6:
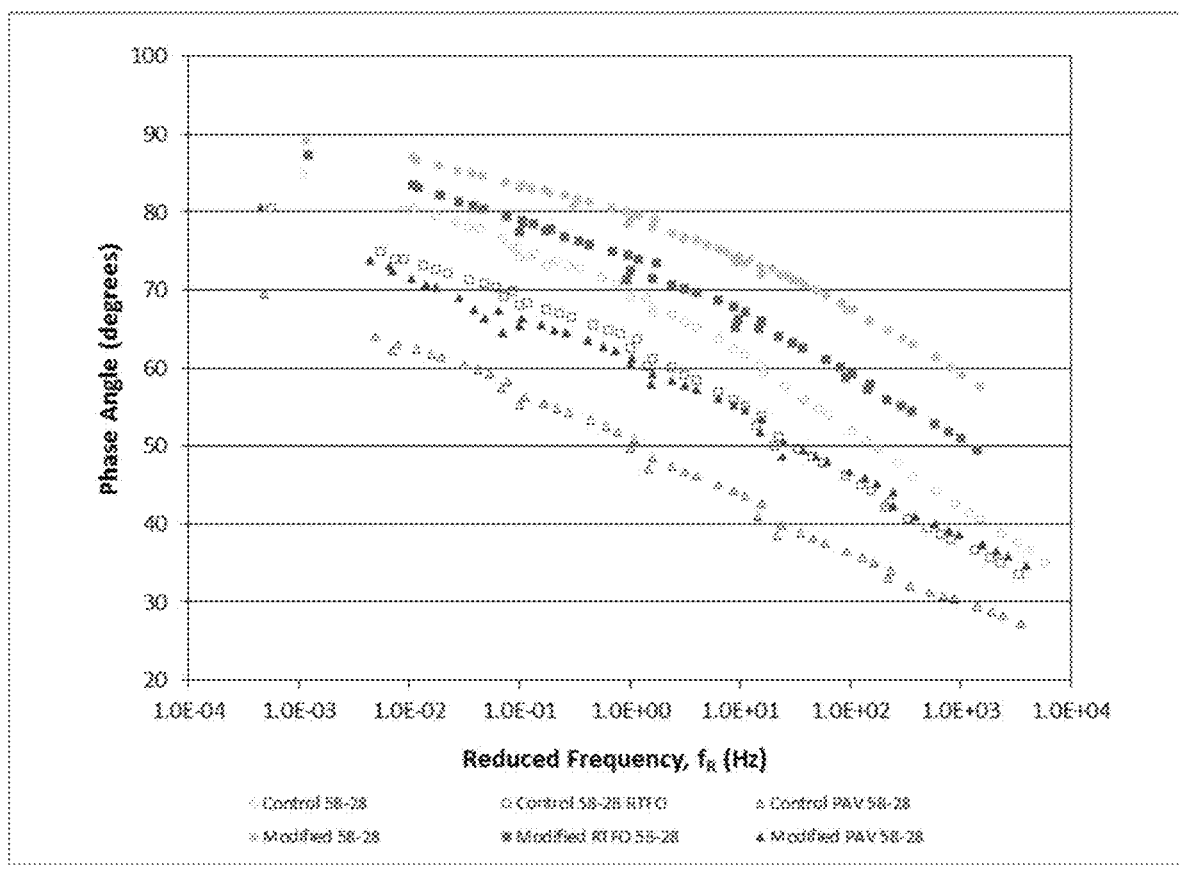
FIG. 6 shows phase angle master curves for the control and modified PG58-28 bitumen.

The shift factors obtained from the time-temperature superposition were used to generate phase angle master curves, as shown in FIGS. 5 and 6. The addition of the rejuvenator resulted in an increase in the phase angle in all cases. For both unaged bitumens, PG64-28 and PG58-28, the increase in phase angles was more pronounced at higher frequencies, corresponding to lower temperatures. With aging, both the modified and unmodified bitumens showed a decrease in phase angle, however the overall decrease in phase angle was higher in case of the modified bitumen. Nevertheless, the PAV aged modified bitumen still exhibited a notably higher phase angle compared to the PAV aged unmodified bitumen.

Example 3—Rutting and Fatigue Resistance

The rutting and fatigue resistance of the control and modified bitumens were assessed according to the bitumen specifications as given in AASHTO M320. The rutting parameter G*/sin $\delta$, determined from the DSR measurements at a frequency of 10 rad/s, was plotted with temperature in FIG. 7. The G*/sin $\delta$ parameter decreased with the addition of the soybean additive, indicating more susceptibility to rutting. Both bitumen grades showed very similar magnitudes of reduction in rutting with modification, where the rutting parameter dropped down to 7-10% of its original value.

In addition to the frequency sweep described above, the bitumens were tested according to AASHTO T315 to determine their critical high temperatures. The critical high temperatures for the unaged and RTFO aged bitumens corresponding to G*/sin $\delta$>1 kPa and G*/sin $\delta$>2.2 kPa are shown in Table 1.

TABLE 1

Properties of control and modified binders

| Binder | PG 58-28 Control | PG 58-28 Modified | PG 64-28 Control | PG 64-28 Modified |
|---|---|---|---|---|
| Unaged (High Temp.) | 60.0 | 45.1 | 67.1 | 51.5 |
| RTFO (High Temp.) | 62.5 | 46.7 | 66.5 | 52.5 |
| PAV (Low Temp.) | −29.9 | −36.3 | −29.0 | −36.9 |
| Performed Grade (PG) | 58-28 | 40-34 | 64-28 | 46-34 |
| Viscosity (Pa*s) at 135° C. | 0.329 | 0.188 | 0.718 | 0.381 |
| Viscosity (Pa*s) at 150° C. | 0.172 | 0.143 | 0.385 | 0.250 |
| Viscosity (Pa*s) at 165° C. | 0.107 | 0.125 | 0.230 | 0.193 |
| Viscosity temperature susceptibility (VTS) | −3.04 | −1.14 | −2.69 | −1.71 |
| Mass loss (%) | 0.82 | 0.99 | 1.01 | 1.00 |

Figure 8:
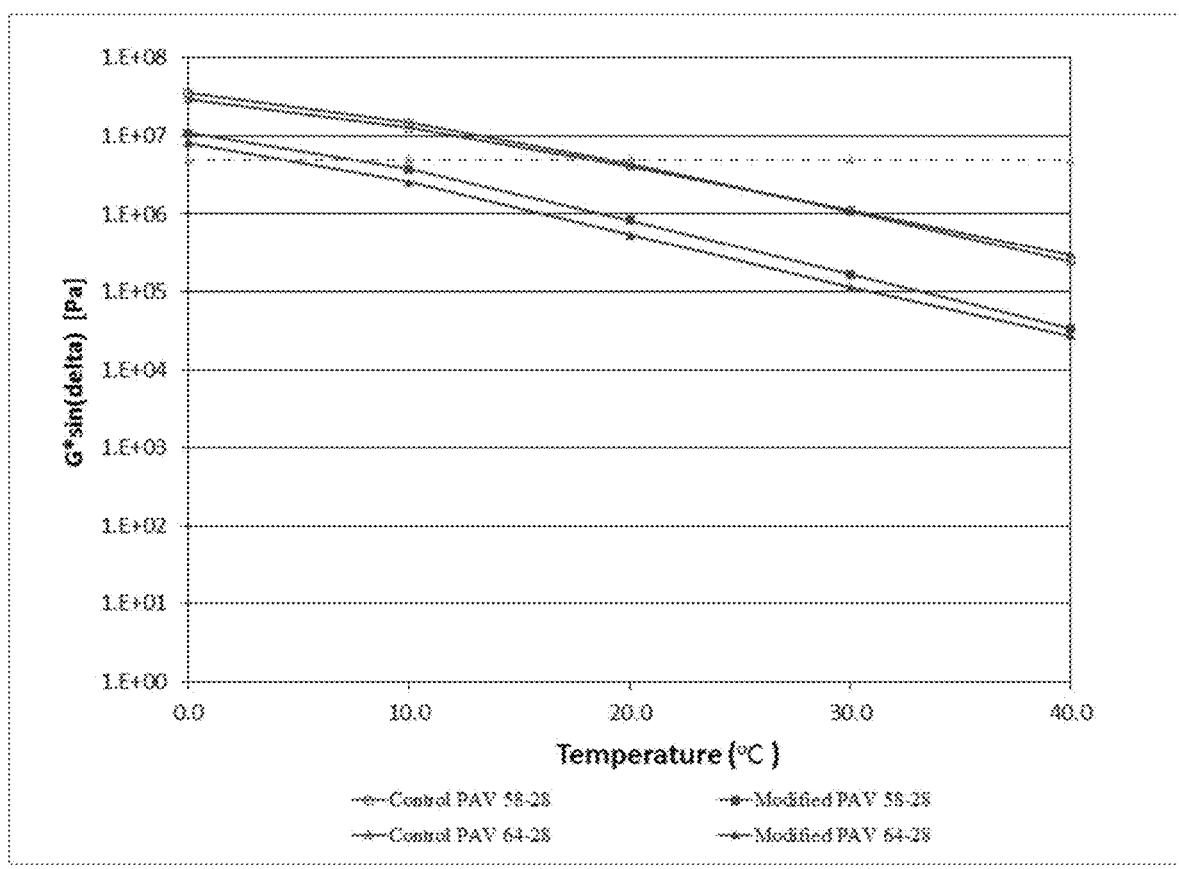
FIG. 8 depicts the variation of G*/sin δ parameter with temperature for the control and modified PAV PG58-28 and PG64-28 bitumens.

The fatigue potential, measured by G*sin $\delta$, was plotted against temperature as shown in FIG. 8. Superpave specifies a G*sin $\delta$ of less than 5 MPa as a critical intermediate temperature. The modified bitumens showed a notable increase in fatigue resistance, as indicated by the lower critical intermediate temperatures noted. It is interesting to note however that the modified PAV 64-28 showed more resistance to fatigue than the modified PAV 58-28 even though both the control PAV PG64-28 and control PAV PG58-28 exhibited similar fatigue resistance. From these results, it can be inferred that the presence of the soybean additive had the effect of reducing the rate of aging in the polymer modified PG64-28 as compared to the neat PG58-28. So, it can be fairly said that the degree of improvement in fatigue properties depended on the type of bitumen where in this case the polymer modified PG64-28 showed greater improvement. A rigorous chemical analysis may be required to reveal the nature of the interaction between the additive and the bitumen. Another important factor which may have had an effect is the interaction between the polymer and the additive. It should be noted however that the dependency of performance on the bitumen type was only true for fatigue, whereas rutting did not show such dependency.

To determine the critical low temperature of the PAV aged bitumens, tests were performed according to AASHTO T313. The results of the BBR testing are shown in Table 1, with the modified bitumens showing a significant reduction in critical low temperature. The overall Performance Grade (PG) of the modified bitumen, as shown in Table 1, indicates a significant change from the control bitumen.

The viscosity of the blend containing the soybean derived additive showed a noticeable decrease in viscosity at the different temperatures, indicating that the additive was successful in reducing the intermolecular interactions between the asphalt molecules.

Of particular importance is the mass loss of the modified bitumens was comparable to that of the control bitumens, as shown in Table 1, which gives clear evidence to the thermal stability of the soybean additive.

Such considerable change in the rheological properties was achieved by the addition of only 0.75% of the additive, which signifies its substantial effect. The dosage of the additive can be carefully controlled to achieve the required final properties of the blend.

Example 4—Black Diagrams

Since the properties of asphalt bitumens can only be fully described through both the dynamic modulus and phase angles, black diagrams were constructed to visually correlate between the two parameters. Black diagrams show the variation of the phase angle with the dynamic modulus. Unlike master curves, black diagrams simply plot the measured data without the need to do model fitting or shifting, hence inaccuracies in modeling are minimized. For this reason, black diagrams are found to be a very useful tool for analysis that is independent of temperature and frequency effects. Typically, black diagrams give a smooth curve that shows an increase in phase angle with decreasing complex shear modulus. At phase angles approaching 90°, the curve forms an asymptote signifying Newtonian behavior. The curve intercepts the Y-axis at the glass modulus at 0° phase angle.

Figure 9:
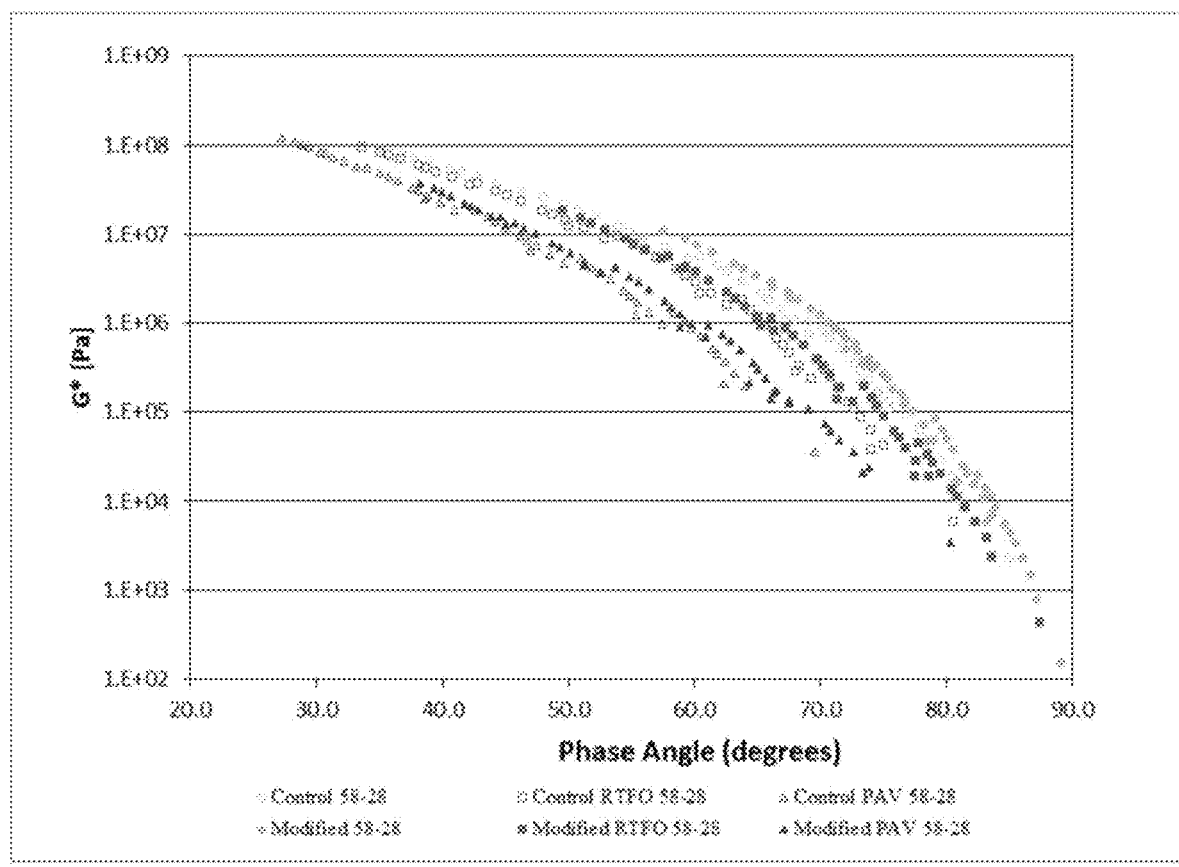
FIG. 9 shows a black diagram for PG58-28 bitumens.
Figure 10:
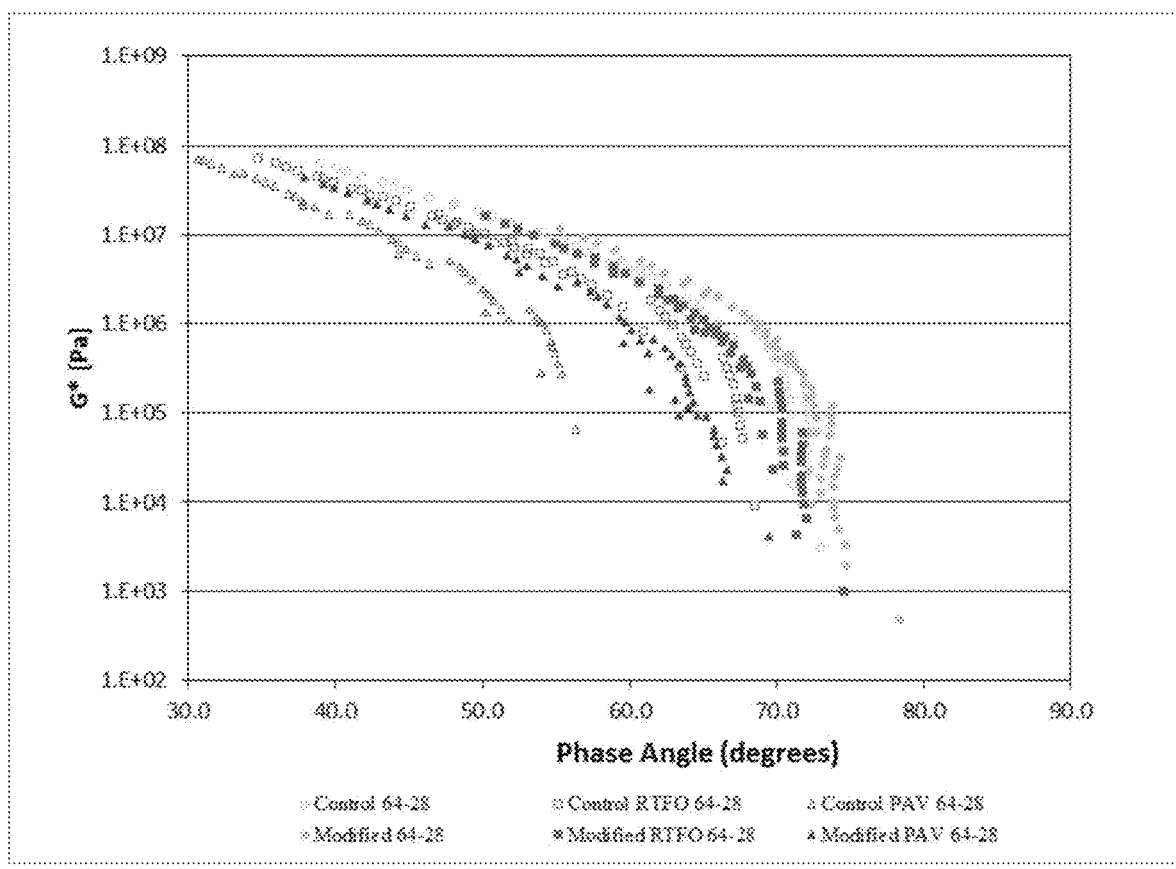
FIG. 10 shows a black diagram for PG64-28 bitumens.

The black diagram for the PG58-28 control and modified bitumens at the different aging conditions is shown in FIG. 9. It is clear that the curves for the modified bitumens were shifted to the right of the control bitumens' curves, denoting a reduction in stiffness accompanied by an increase in the phase angle. This observation was true at all aging stages. The amount of shift was the same for all aging states, which indicates that the rejuvenator's impact on the bitumen properties was not influenced by aging. Such observation attests to the longevity of the rejuvenator and its prolonged effect on the bitumen. FIG. 10 shows the black diagram of PG64-28 control and modified bitumens. It can be observed that there is a notable improvement in performance between the modified PAV bitumen and the control PAV bitumen. This observation points to the fact that the soybean additive had a positive effect on reducing the aging mechanism in the modified bitumen, as evidenced by the fatigue results in FIG. 8 above.

Black diagrams are also used to confirm that no phase separation between the rejuvenator and the asphalt bitumen is taking place with temperature. A smooth curve with no discontinuities mean that the material is rheologically simple, which indicates that the material is homogenous and no phase transition is occurring with temperature (Airey, G. D., "Use of Black Diagrams to Identify Inconsistencies in Rheological Data," *Road Materials and Pavement Design* 3(4):403-424 (2002), which is hereby incorporated by reference in its entirety). In this respect, black space diagrams can also be used to verify the validity of the time-temperature superposition principle which is essentially based on the assumption of the material being rheologically simple and linearly visco-elastic. The black diagrams for all the modified bitumens were smooth with no overlaps or sharp discontinuities, suggesting that the rejuvenator did not show any phase separation from the bitumen at any of the test temperatures, and confirming the validity of the time-temperature superposition used to construct the master curves above.

Example 5—Glower-Rowe Diagrams

The Glover-Rowe parameter was introduced to assess fatigue cracking of bitumen at low temperatures. This parameter was first introduced by Glover (Glover et al., "Development of a New Method for Assessing Asphalt Binder Durability With Field Validation," (2005), which is hereby incorporated by reference in its entirety) and was then found to correlate well with bitumen ductility measurements made by Kandhal (Kandhal, P. S., "Low-Temperature Ductility in Relation to Pavement Performance," in: C. R. Marek (Ed.), Low-Temperature Properties of Bituminous Materials and Compacted Bituminous Paving Mixtures, ASTM International (1977), which is hereby incorporated by reference in its entirety). Such correlation was based on Glover's fatigue parameter obtained using DSR measurements at 15° C. and 0.005 rad/s. According to Kandhal's work, the onset of cracking is marked by 5 cm ductility and significant damage takes place when the material reaches 3 cm ductility. The Glover-Rowe parameter was used to define a damage zone outlining the two stages of damage, namely damage onset and significant cracking. The damage thresholds are defined according to the equations: $G^*_* {}^{cos\ \delta^2}\!/\sin \delta = 180$ kpa for damage onset and $G^*_* {}^{cos\ \delta^2}\!/\sin \delta = 450$ kpa for significant damage. These equations are based on a test temperature of 15° C. and a test frequency of 0.005 rad/s.

Recognizing the excessively long time of testing at such a slow loading rate of 0.005 rad/s, it was suggested to use frequency sweeps conducted at temperatures above and below 15° C. to obtain $G^*$ and $\delta$ at a temperature of 15° C. and a frequency of 0.005 rad/s using the principle of time shifts (Anderson et al., "Evaluation of the Relationship Between Asphalt Binder Properties and Non-Load Related Cracking," *Journal of the Association of Asphalt Paving Technologists* 80 (2011), which is hereby incorporated by reference in its entirety).

In this study, the results of the DSR frequency sweeps covered an extended range of temperatures from 0 to 40° C. so it was possible to calculate time shifts at an intermediate reference temperature of 15° C. Using these time shifts, a sigmoidal function fit was obtained to represent a master curve at 15° C. The value of $G^*$ and $\delta$, at 15° C. and 0.005 rad/s were plotted along with the Glover-Rowe parameters as shown in FIG. 9. The lower and upper Glover-Rowe bounds define a damage zone where the former represents the onset of damage and the latter represents significant cracking.

Figure 11:
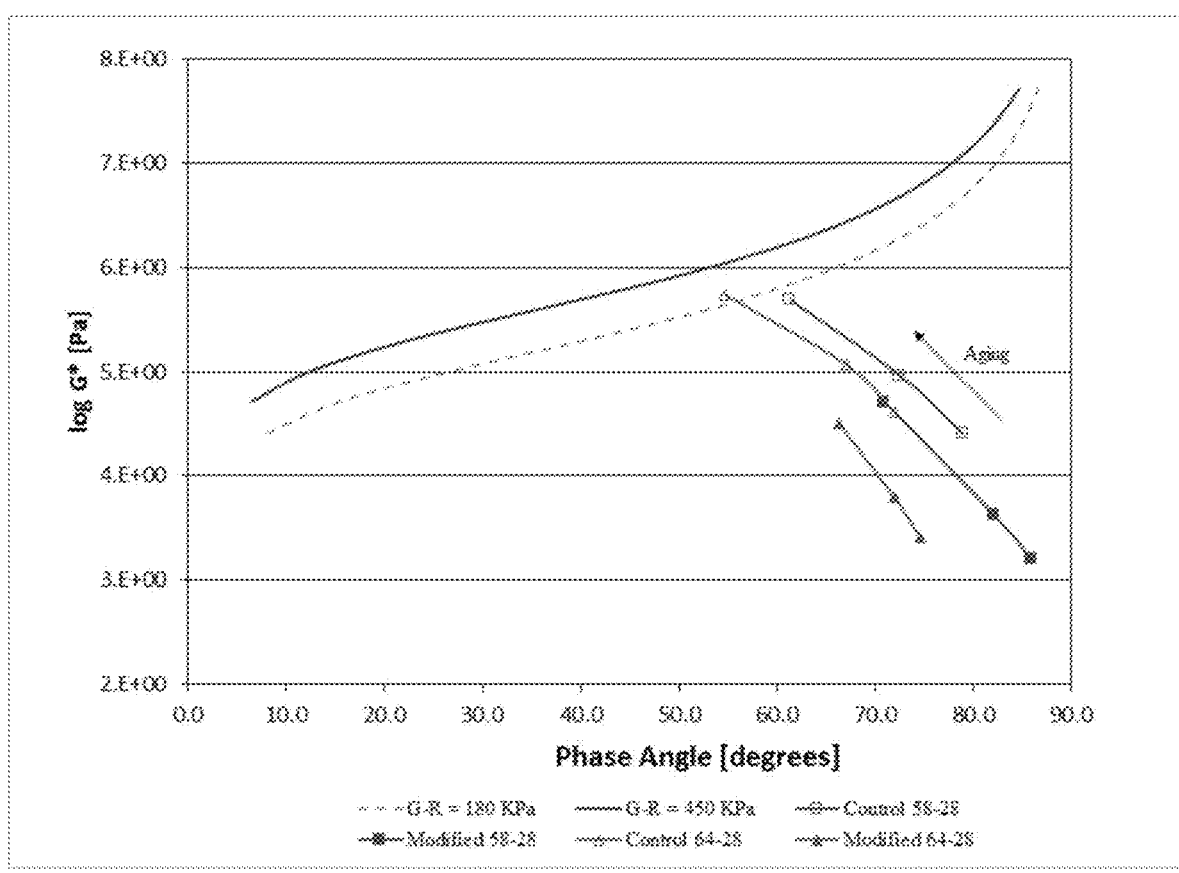
FIG. 11 depicts a Glover-Rowe diagram of phase angle versus log G* [Pa].

FIG. 11 shows the change in the state of the bitumen with aging in comparison to the Glover-Rowe damage lines. Generally, aging is shown to push the bitumen closer to the damage lines. At PAV aging, the PG64-28 bitumen crossed the onset damage line into the damage zone marking crack initiation. The PG58-28 did not fall into the damage zone after PAV aging, however it was very close indicating that a limited additional time of PAV aging would have rendered it damaged. The use of the soybean additive brought about a considerable reduction in the complex shear modulus and an increase in the phase angle, which is opposite to the effect of aging. With the addition of the soybean additive, the modified bitumen was pushed away from the damage lines indicating an enhanced ability to withstand additional time of PAV aging without failure. It is interesting to note that the rate of aging of the modified PG64-28 bitumen was less than the control PG64-28, whereas this was not the case for the PG58-28 bitumen. This finding confirms with both the results from the fatigue parameter and black diagram. The soybean additive works in a way to render the polymer modified PG64-28 bitumen less susceptible to aging, and hence increases its fatigue resistance.

Example 6—Cole-Cole Diagram

Figure 12:
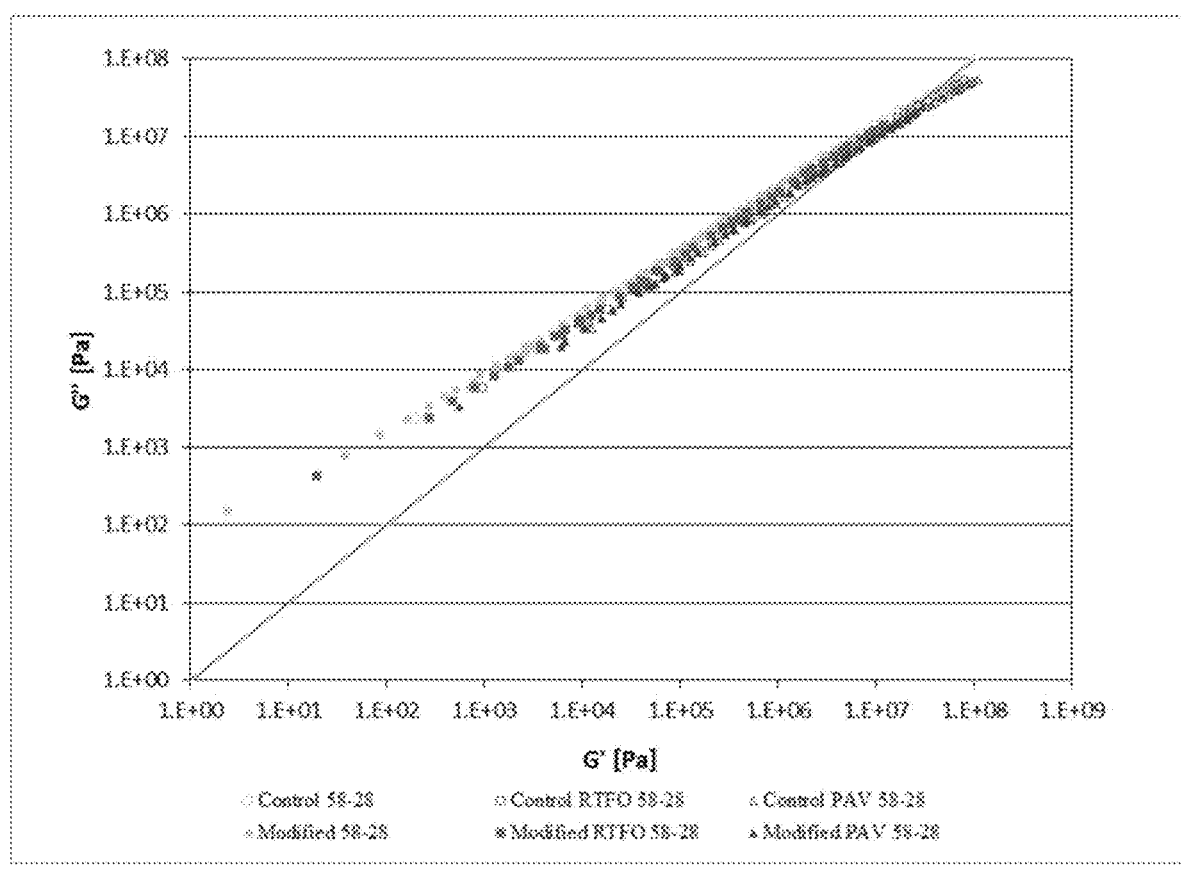
FIG. 12 shows a Cole-Cole diagram for PG58-28.
Figure 13:
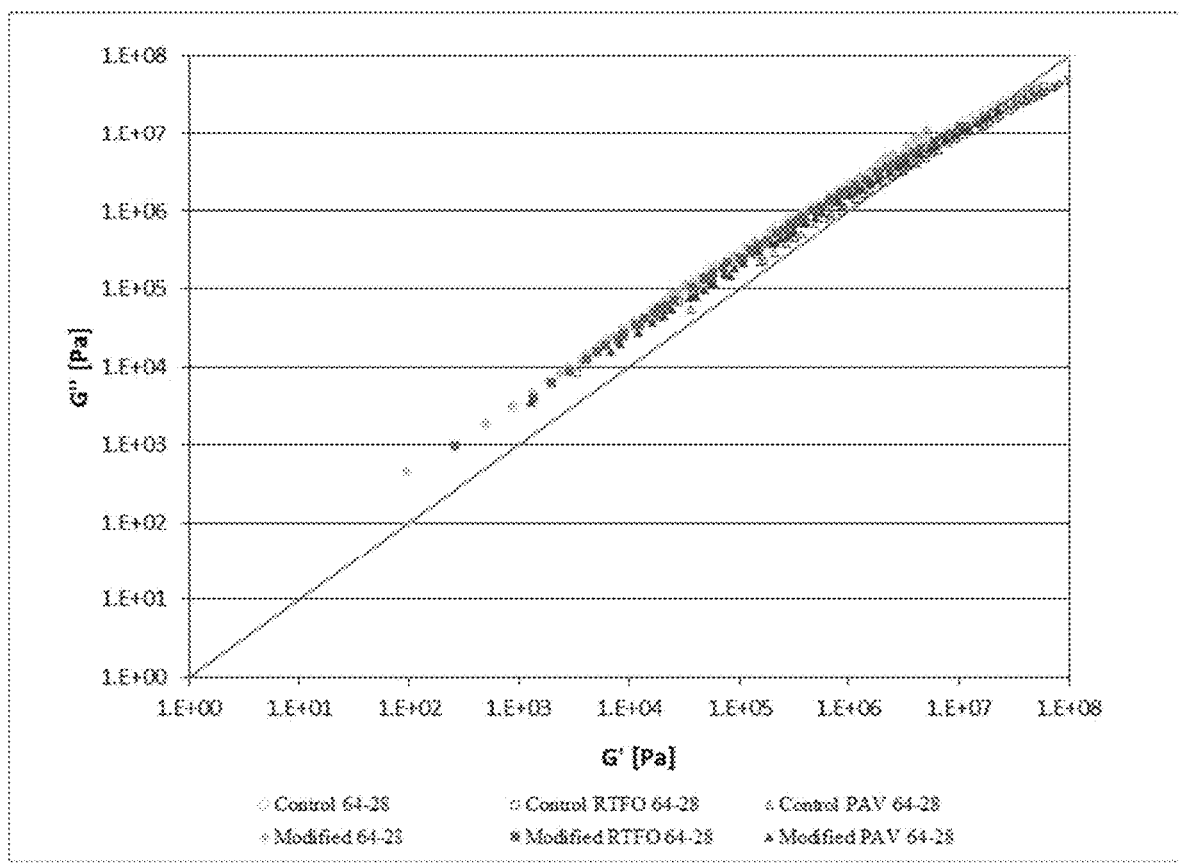
FIG. 13 shows a Cole-Cole diagram for PG64-28.

Another widely-used diagram that serves as a mean of bitumen characterization is the modified Cole-Cole plot, which shows the elastic complex shear modulus (G') versus the viscous complex shear modulus (G"). The plot provides a simple visual tool to describe the relationship between the elastic and viscous behavior of a bitumen. A straight line defined by G'=G" is usually superimposed on the plot to provide more insight on the significance of the data. This line acts as a boundary line where data points lying to its left indicate prevalence of the viscous properties whereas data points on its right indicates a shift towards a more elastic behavior. FIGS. 12 and 13 present the Cole-Cole diagram for both PG58-28 and PG64-28 bitumens, respectively. At high temperatures, the viscosity portion of the complex shear modulus is dominant. As the temperature decreases, the bitumen starts to lose some of its viscous characteristics in favor of the elastic behavior. Eventually, the overall behavior is dominated by the elastic mechanism at low temperatures. The aged bitumens show more elastic behavior compared to the unaged bitumens at all test temperatures. The addition of the soybean into the control bitumens adds more viscosity, mainly due to its effect on increasing the phase angle. All the tested bitumens exhibited an almost linear relationship in the Cole-Cole diagram which essentially means that no structural changes were evident with the addition of the soybean additive.

Discussion of Examples 1-6

In this work, a bio-derived soybean material was added to both a polymer modified PG64-28 and a neat PG58-28 bitumens at a low dosage of 0.75% by mass. DSR was used to conduct a frequency sweep on both the control and modified bitumens at further stages of aging, namely unaged, RTFO and PAV aged. The data from the frequency sweeps were used to construct master curves for the different bitumens. Comparison of the master curves showed a considerable reduction in the complex shear modulus accompanied by an increase in phase angle with the addition of the soybean derived material. These changes were evident for both types of bitumens. Further analysis of the modified bitumens was done to determine the Performance Grade using a DSR and BBR. It was noted that a considerable improvement in fatigue and low temperature performance was achieved through the use of the soybean additive. This improvement was maintained even after the modified bitumen was subjected to PAV aging. In one case, the modified PAV 64-28 bitumen even showed a reduced aging rate compared to the control PAV 64-28 bitumen. The mass loss of the modified bitumens was comparable to those of the control bitumens, which attests to the thermal stability of the biomaterial used. The black diagrams for the modified bitumens showed a continuous plot with no discontinuities implying no phase separation with temperature.

The Glover-Rowe parameters were used to assess the non-load induced cracking potential of the bitumens. Based on this model, it was found that the control PAV aged bitumens either cracked as with the PG64-28 bitumen or was close to cracking as with the PG58-28 bitumen. However, the addition of the soybean derived biomaterial greatly enhanced the cracking resistance of the bitumens, as suggested by the Glover-Rowe model, which would allow for additional hours of aging without cracking. Using a Cole-Cole diagram, it was shown that the biomaterial increased the viscosity of the bitumen at all temperatures.

In summary, the soybean derived biomaterial used was successful in introducing notable changes to the rheology of both a polymer modified and a neat bitumen, at a very low dosage of 0.75%. This is considered a significant effect when compared to the regular dosages used for commercial rejuvenators which usually exceeds 12%. With such significant performance, an even lower dosage can be designed to tailor the properties of the blend without greatly sacrificing the rutting resistance.

Example 7—Additional Binder Testing

Control and modified binders were tested according to AASHTO T315 in order to determine their critical high temperature. The critical high temperature is determined from both unaged and RTFO aged specimens at $G^*/\sin \delta > 1$ kPa and $G^*/\sin \delta > 2.2$ kPa, respectively. The critical low temperature was determined using PAV aged specimens according to AASHTO T313. The results of both the critical high and low temperatures, along with the performance grade (PG), are shown in Table 1 above. The PG of the modified binder indicates a considerable change from the control binders for both binder grades; PG 64-28 and PG 58-28. A drop in the critical high temperature accompanied by a notable reduction in the critical low temperature was characteristic of the modified binders in comparison to the control binders. For both binder grades, the high temperature grade decreased by 18° C. whereas the low temperature grade decreased by 6° C. A decrease in the high temperature grade denotes more susceptibility to rutting while a decrease in the low temperature grade marks more resistance to low-temperature cracking.

Figure 7:
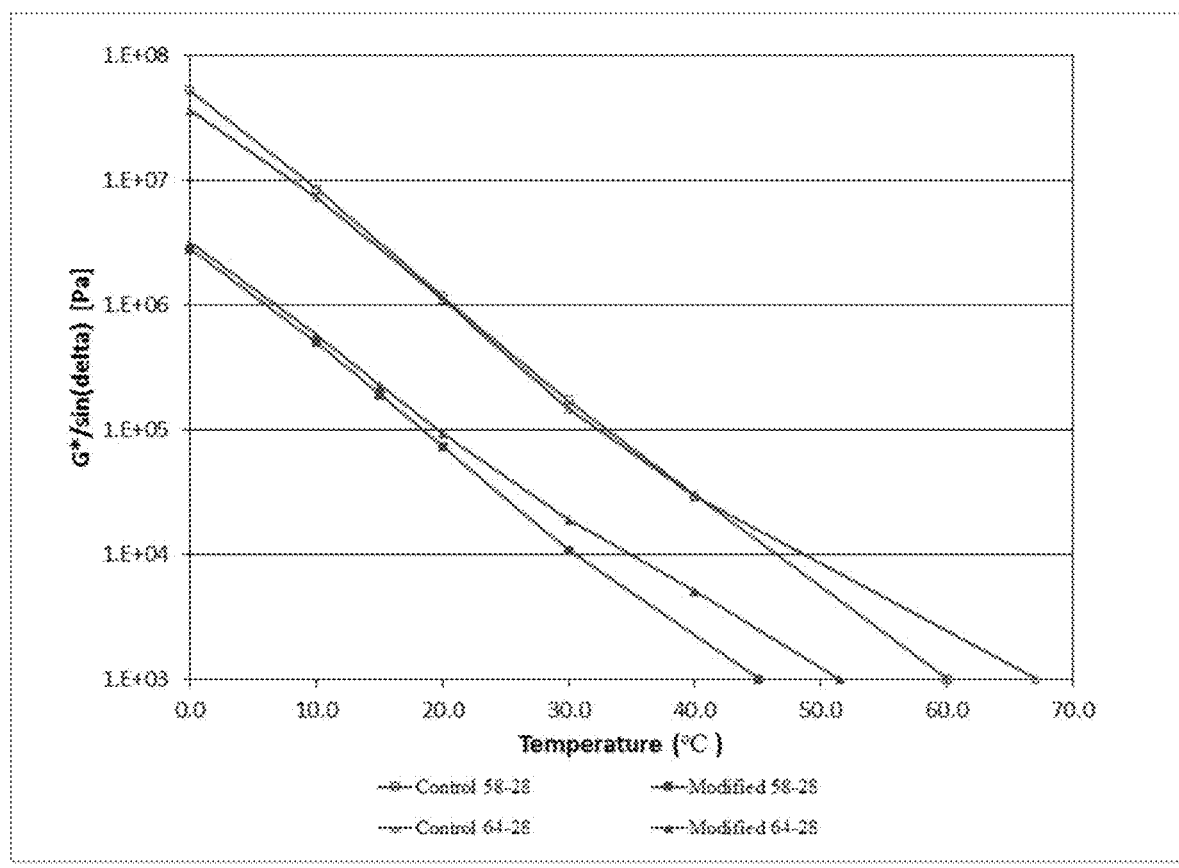
FIG. 7 illustrates the variation of G*/sin δ parameter with temperature for the control and modified PG58-28 and PG64-28 bitumens.

To further study the effect of modification, the rutting parameter $G^*/\sin \delta$ obtained using DSR measurements at a frequency of 10 rad/s was plotted against temperature as shown in FIG. 7. The addition of the soybean additive caused a decrease in the rutting parameter signaling an increase in rutting susceptibility. This was true for both binder grades.

A similar plot, as FIG. 7, was drawn to examine the fatigue parameter $G^*\sin \delta$ as shown in FIG. 8. According to Superpave criteria, the critical intermediate temperature is reached when the value $G^*\sin \delta$ is equal to 5 MPa. A notable decrease in the lower critical intermediate temperatures occurs with modification which means that modified binders are more resistant to low temperature cracking than the control binders. The modified PAV aged PG 64-28 binder showed a better improvement in low temperature resistance compared to the PAV aged PG 58-28 binder. The effect of the soybean additive was more pronounced in the case of the PG 64-28 binder compared to the PG 58-28 binder. This dependency of performance on the binder grade was only true for thermal cracking, e.g. low temperature performance, whereas rutting resistance, e.g. high temperature performance, did not show such notable dependency.

Example 8—Viscosity-Temperature Susceptibility

Figure 14:
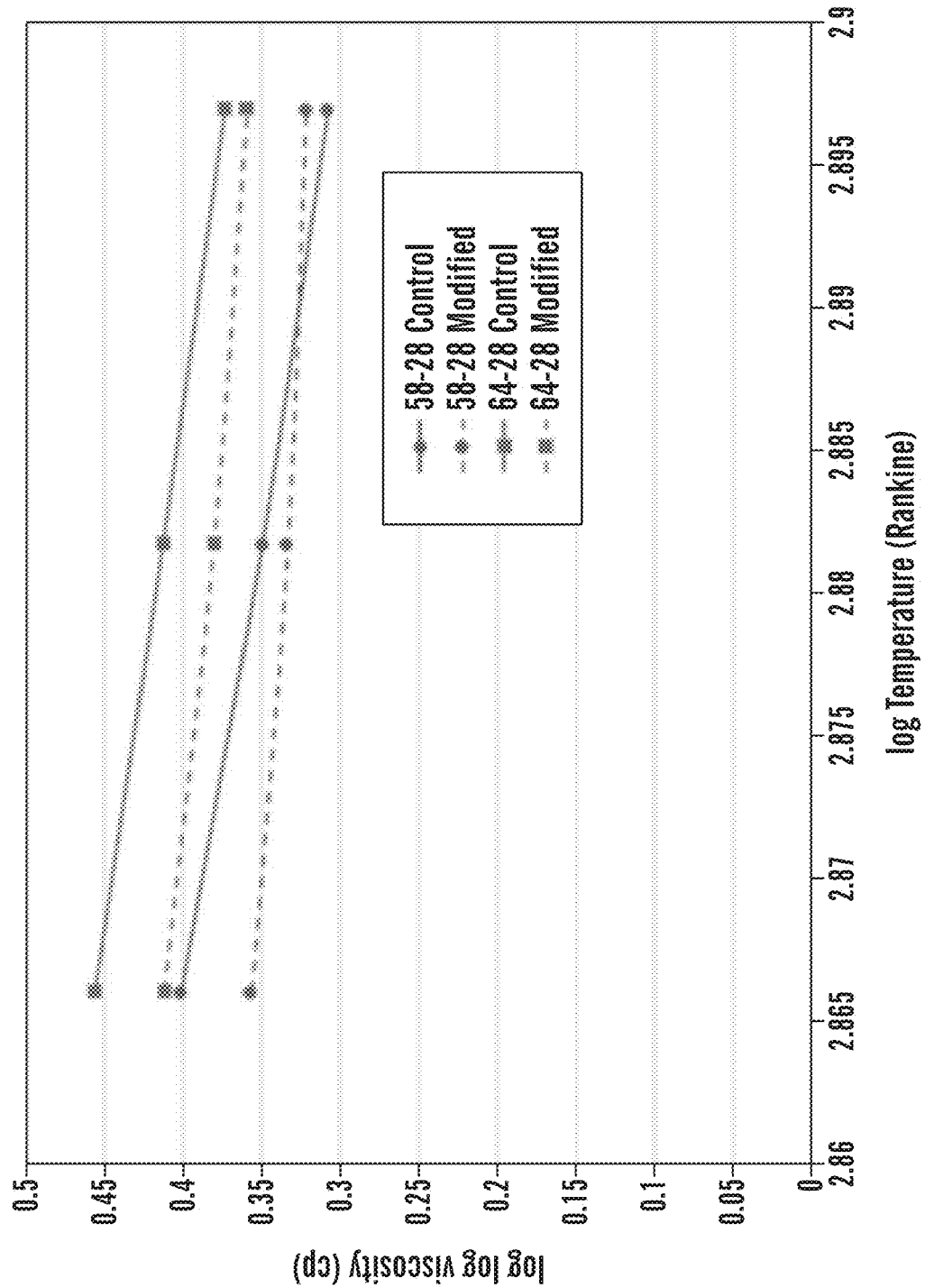
FIG. 14 depicts the relationship between viscosity and temperature for control and modified PG 58-28 and PG 64-28 bitumen.

The rate of change of the consistency of asphalt binder with temperature determines its temperature susceptibility. Binders with high temperature susceptibility exhibit very low viscosity at high temperatures leading to mixing and compaction problems. Additionally, such binders become very stiff at low temperatures and thus prone to low temperature cracking. For those reasons, high temperature susceptibility is considered to be problematic. To assess the temperature susceptibility, the viscosity temperature susceptibility parameter (VTS) has been used by many researchers due to its simple formulation (Raouf et al., "General Rheological Properties of Fractionated Switchgrass Bio-Oil as a Pavement Material," Road Materials and Pavement Design 11(sup1):325-353 (2010), which is hereby incorporated by reference in its entirety) for formulating binders. Other parameters such as the penetration index (PI) and penetration viscosity number (PVN) have also been reported as good indicators of temperature susceptibility (Zaumanis et al., "Evaluation of Rejuvenator's Effectiveness with Conventional Mix Testing for 100% Reclaimed Asphalt Pavement Mixtures," Transportation Research Record: Journal of the Transportation Research Board 2370:17-25 (2013), which is hereby incorporated by reference in its entirety). VTS is defined as the slope of the least-square best fit line between log-log viscosity and log temperature according to Equation 4:

$$VTS = \frac{\log[\log(\eta_1)] - \log[\log(\eta_2)]}{\log(T_2) - \log(T_1)} \quad [4]$$

Where $T_1$ and $T_2$ are temperatures of bitumen in Rankine at known points and $\eta_1$ and $\eta_2$ are the corresponding viscosities in cp. The measured VTS values for more than 50 commonly used binders in the United States during the 1960s ranged between 3.36 and 3.98 (Puzinauskas, V. P., "Evaluation of Properties of Asphalt Cements With Emphasis on Consistencies at Low-Temperatures," Asphalt Institute Research report (1967) and Rasmussen et al., "Method to Predict Temperature Susceptibility of an Asphalt Binder," Journal of Materials in Civil Engineering 14(3):246-252 (2002), which are hereby incorporated by reference in their entirety). FIG. 14 shows the viscosity versus temperature for both PG 64-28 and PG 58-28 control and modified binders. For both control and modified binders, the relationship between log temperature and log-log viscosity proved to be of a linear form as expressed by Equation 4. The viscosity decreases with modification for both binders. The decrease in viscosity is more pronounced at lower temperatures. The use of modified binder would allow for lower mixing and compaction temperatures compared to the control binder. The VTS values calculated from Equation 4 are given in Table 1. The modified binders demonstrated a considerably lower temperature susceptibility indicating much less change in viscosity with temperature, compared to the control binders.

Example 9—Dynamic Modulus

The dynamic modulus is an important parameter which indicates the stiffness of asphalt concrete mixtures under dynamic loading. Dynamic modulus testing is performed over a range of temperatures and frequencies which simulates different environmental conditions and traffic loading. The work done under NCHRP Project 1-37A provided the basis for the development of the AASHTO Mechanistic-Empirical Pavement Design Guide for New and Rehabilitated Pavement structures which uses dynamic modulus, E*, of hot mix asphalt as a key input parameter for all three hierarchal levels of design ("NCHRP Guide for Mechanistic-Empirical Design of New and Rehabilitated Pavement Structures," in Washington, D.C.: Transportation Research Board (2004), which is hereby incorporated by reference in its entirety). For level 1, E* is determined experimentally, whereas in both levels 2 and 3, the E* values are determined using the Witczak predictive equation. The E* test was introduced as a preferred Simple Performance Test (SPT), under NCHRP Project 9-19, and incorporated in the Superpave mix design procedure (Witczak et al., "NCHRP Report 465: Simple Performance Test for Superpave Mix Design" (2002), which is hereby incorporated by reference in its entirety). The dynamic modulus E* forms a key input parameter in AASHTOW are Pavement ME Design (AASHTO, AASHTOW are Pavement ME Design (2016), which is hereby incorporated by reference in its entirety).

The test setup was based on the work done by Witczak (Witczak, M. "NCHRP Report 547: Simple Performance Tests: Summary of Recommended Methods and Database" (2005), which is hereby incorporated by reference in its entirety). A compressive haversine load was applied with a frequency ranging from 25 to 0.01 Hz at different temperatures. The specimens prepared using PG 64-28 were tested at temperatures of 4° C., 21° C., and 37° C., whereas those prepared with PG 58-28 were tested at temperatures of −4° C., 4° C., 21° C. and 28° C. The specimens made using PG 58-28 binder were too soft at temperatures above 28° C., and attempts to test them at a higher temperature were met with failure as the mounted brackets slipped off the face of the specimens while testing. The specimens were tested under the conditions of unconfined pressure and the strain was kept between 50 and 150 micro-strain to ensure that deformations are within the linear viscoelastic range of the material. To record the deformation, three LVDTs were placed at equal spacing around the circumference of the specimen and the average of all three readings was reported. The LVDTs were positioned on mounted brackets that were held in place using buttons glued to the face of the specimens.

The dynamic modulus is expressed as the ratio between the maximum stress ($\epsilon o$) and maximum recoverable axial strain ($\epsilon o$) as outlined in Witczak, M. "NCHRP Report 547: Simple Performance Tests: Summary of Recommended Methods and Database" (2005), which is hereby incorporated by reference in its entirety.

A phase angle ($\varphi$) is defined which is used to evaluate the elasticity of the asphalt mix, where $\varphi=0$ denotes a purely elastic mix and $\varphi=90°$ indicates a purely viscous mix. The construction of "master curves" using dynamic modulus data provides a very efficient way to characterize asphalt mixtures. The concept of time-temperature superposition is utilized to calculate asphalt stiffness across different temperatures and frequencies. Time-temperature superposition is based on the assumption that asphalt materials are rheologically simple and linearly viscoelastic at low strain measurements. Shift factors are used where the dynamic modulus data are shifted horizontally to plot a master curve at a selected reference temperature. Master curves typically follow a sigmoidal curve. A horizontal asymptote at low temperatures indicates a glassy modulus due to physical hardening of the asphalt. At intermediate and high temperatures, asphalt behaves as a Newtonian fluid with a constant slope indicating constant viscosity irrespective of the shear rate.

Shift factors (aT) were calculated as noted above in Equation [1]. A second-order polynomial relation expresses shift factors as a function of temperature, according to Equation [2] above. The sigmoidal model used to describe the dynamic modulus of asphalt mixtures is expressed as, $$\log|E^*| = \delta + \frac{\alpha}{(1 + e^{\beta + \gamma(\log(t_r))})} \quad [5]$$

where $t_r$ is the reduced time of loading at the selected reference temperature, $\delta$ is the minimum value of E*, $\delta+\alpha$ is the maximum value of E*, and the parameters $\beta$ and $\gamma$ define the shape of the sigmoidal function.

Figure 15:
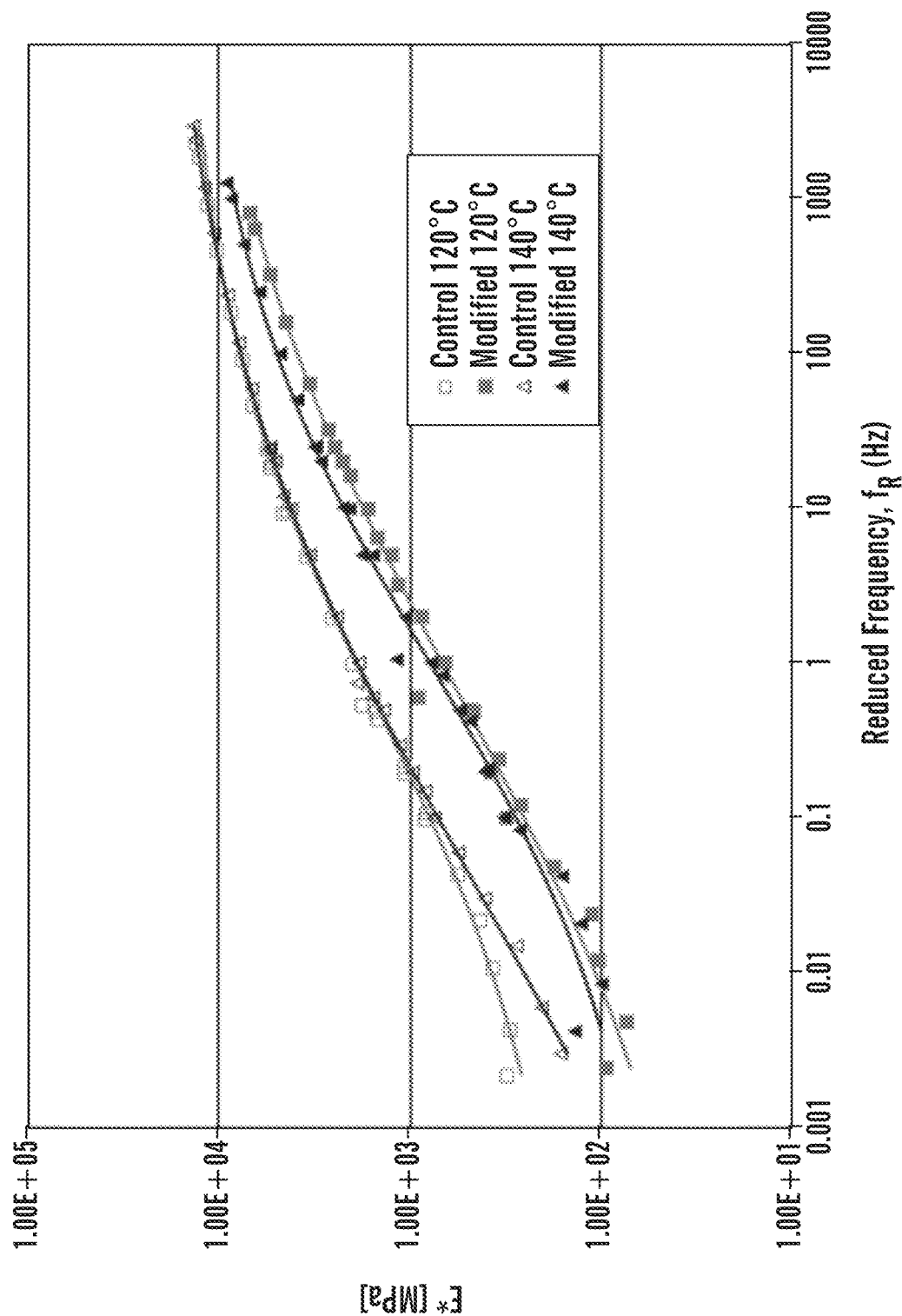
FIG. 15 is a master curve for mixes prepared with PG 64-28.
Figure 16:
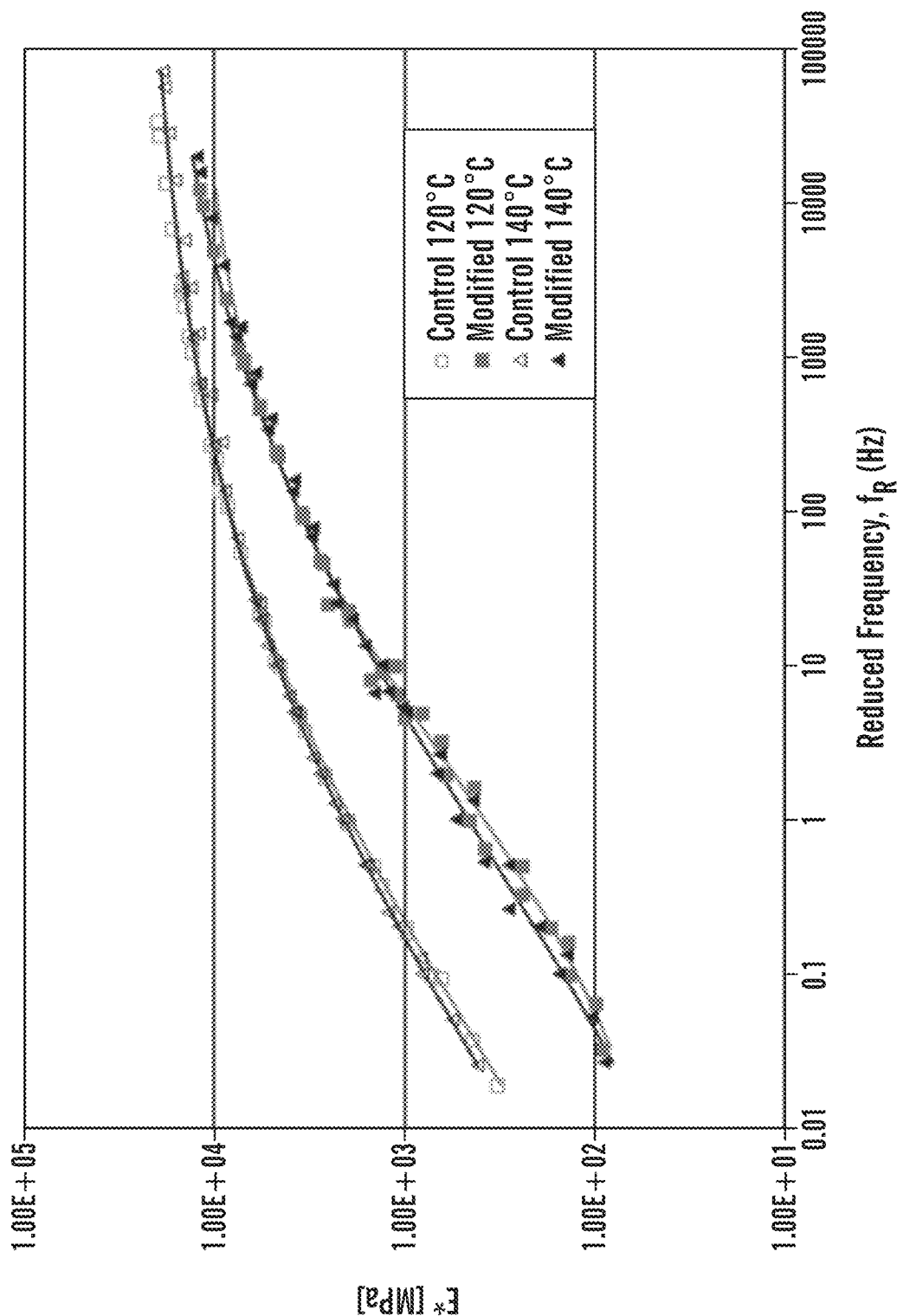
FIG. 16 is a master curve for mixes prepared with PG 58-28.

The master curves for the mixtures prepared using PG 64-28 and PG 58-28 binders, at a reference temperature of 21° C., are shown in FIGS. 15 and 16, respectively. For all mixtures, it is clear that the addition of the soybean additive caused a reduction in the dynamic modulus at all frequencies. However, the degree in reduction of the dynamic modulus was not constant along the entire range of the master curve, with more reduction taking place at lower frequencies, i.e. higher temperatures. The dynamic modulus values for both PG 64-28 and PG 58-28 control mixtures did not seem to vary significantly with changes in the mixing and compaction temperatures. The performance of PG 64-28 modified mixture, however, was noted to depend on the mixing and compaction temperature, with more reduction in dynamic modulus occurring at a mixing and compaction temperature of 120° C. compared to 140° C. The effect of the mixing and compaction temperature was not as clear in the case of the mixtures using the modified PG 58-28. At high test temperatures, the effect of the mixing and compaction temperature on the dynamic modulus could not be assessed due to the wide variability in the results. It was also difficult, using the master curves alone, to compare between the efficiency of the soybean additive for the PG 64-28 and PG 58-28 mixtures. Based on the preceding master curve discussion, it was clear that despite the usefulness of the master curves in characterizing the control and modified mixtures, a more in-depth analysis is required to further study the performance of the soybean additive. The statistical analysis that follows will investigate the significance of each of the test parameters along with their interactions.

Example 10—Statistical Analysis

The log-log scale used in the plotting of master curves makes it difficult to identify subtle differences between various specimen groups. To provide a detailed analysis and to quantify the differences between dynamic modulus values, a complex statistical analysis using analysis of variance (ANOVA) was performed. The analysis conducted involved more than a simple ANOVA analysis in that it utilized the concept of split-plot repeated measures (SPRM). The dynamic modulus test, in itself, is a repeated measure test since the same specimen is tested under a range of different temperatures and frequencies. A recent study has concluded that using SPRM isolates statistical errors which arises from reusing the same specimen for repeated testing (Buss et al., "Extracting More from Dynamic Modulus Data using Split-Plot Repeated Measures Analysis," *Journal of Testing and Evaluation, ASTM.* (2017), which is hereby incorporated by reference in its entirety). Such a statistical technique provides a clear advantage over common simplified statistical analyses that involve comparing data at a fixed temperature or frequency only. Using SPRM provides a full analysis that takes into account the interaction between the different experimental factors and isolates the error due to the variability of specimens that are treated the same.

The design of SPRM experiments involves dividing the experimental factors into whole plot and split plot factors. For the purpose of this analysis, the whole plot factors were identified as the main factors of interest, namely modification, mix temperature, and performance grade. Each of these whole plot factors comprised two levels; the modification factor included control and modified groups, the mix and compaction temperature included 120° C. and 140° C., and the performance grade included PG 64-28 and PG 58-28. As for the split plot factors, these were identified as temperature and frequency, where the temperature factor included 4° C. and 21° C., and the frequencies used were 0.1, 1, 2, 5, 10, 20, and 25 Hz. Data from –4° C., 28° C., and 37° C. were excluded as they were not common between specimens made of the two performance grade binders. The whole plot factors were combined at their different levels to create the whole plot groups, making a total of (2*2*2) 8 groups. Three specimens were tested at each group, for a total of 24 specimens. Each of the whole plot specimens were tested at the various test temperatures and frequencies.

As part of the SPRM design, it was important to isolate the error due to the variability in making the specimens, which could be due to the natural variability of the materials being used, slight differences in air voids, aggregate structure and binder absorption. In doing so, the specimens were defined as a separate factor so that variations among specimens could be determined and factored out of the analysis. The variations in specimens that are treated the same will constitute the sum of squares error term.

Figure 17:
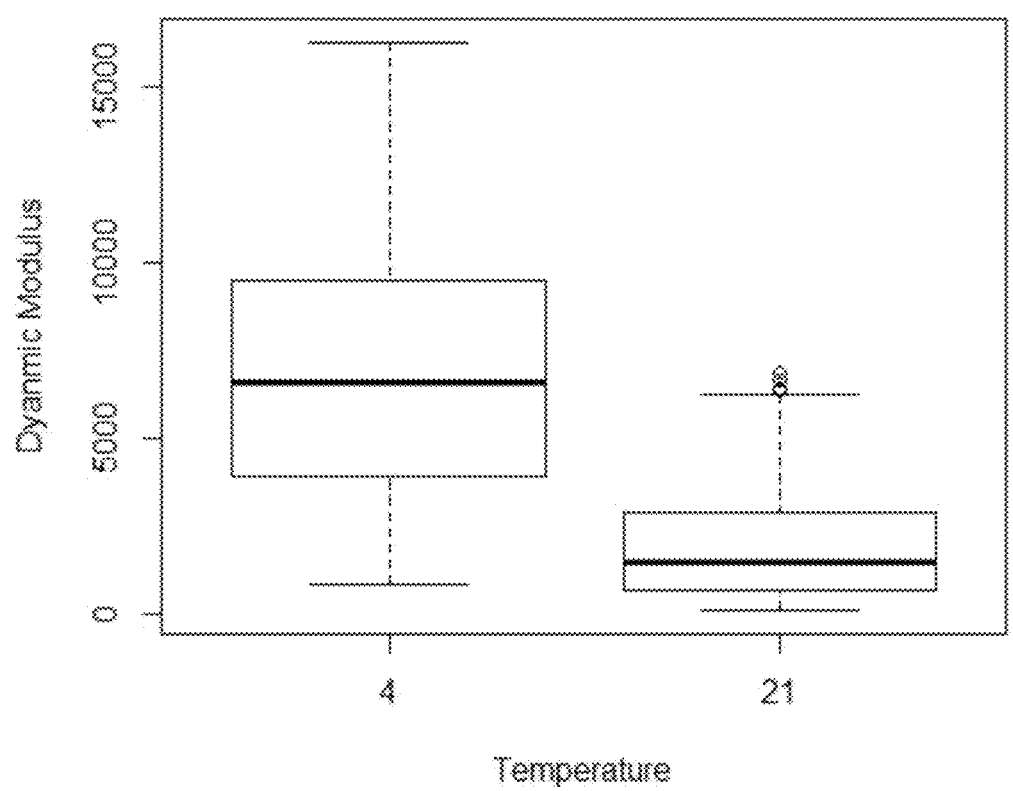
FIG. 17 is a box-plot distribution of the dynamic modulus with test temperature.
Figure 18:
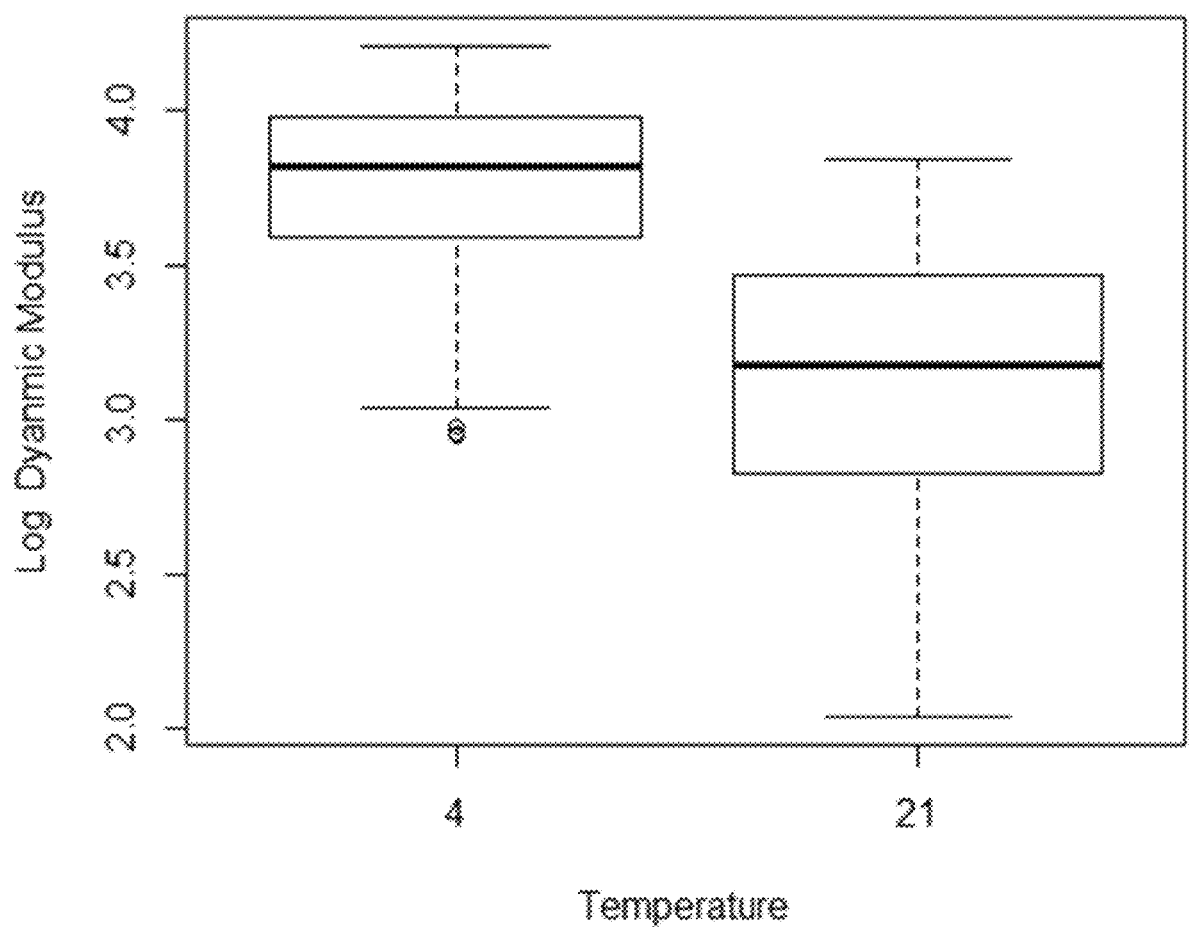
FIG. 18 is a box-plot distribution of log dynamic modulus with test temperature.

One of the fundamental assumptions for conducting an ANOVA analysis is that the variance between the specimen measurements within each group must be equal among all groups. To verify this assumption, a box-plot distribution of dynamic modulus values was plotted for the different test temperatures as shown in FIG. 17. It was revealed that the variance in the dynamic modulus measurements was not the same for the different test temperatures, with the highest variance occurring at the lower test temperature. A log transformation of the dynamic modulus data proved to be very useful in providing a data set with roughly similar variances among different test temperatures, as shown in FIG. 18.

An open-access statistical software "R" is used for the analysis. A summary of the p-values for the whole plot and subplot factors along with their interactions are shown in Tables 2 and 3. The p-values are used as an indicator of the statistical significance of a given factor or factor interaction. Factors or factor interactions with p-values at or below a chosen alpha value are considered statistically significant. An alpha value of 0.05 represents 95% statistical difference at 95% confidence level. The factors or factor interactions with p-values below a chosen alpha value of 0.05 are highlighted.

TABLE 2

Summary of Whole Plot P-values for the ANOVA analysis

| Whole plot factors | Df | Sum Sq | Mean Sq | F value | p-value |
|---|---|---|---|---|---|
| PG | 1 | 0.255 | 0.255 | 6.09 | 0.025251 |
| Modify | 1 | 21.552 | 21.552 | 515.308 | 1.35E−13 |
| MixTemp | 1 | 0.314 | 0.314 | 7.512 | 0.014506 |
| PG:Modify | 1 | 0.746 | 0.746 | 17.833 | 0.000647 |
| PG:MixTemp | 1 | 0.008 | 0.008 | 0.181 | 0.675909 |
| Modify:MixTemp | 1 | 0.154 | 0.154 | 3.676 | 0.073221 |
| PG:Modify:MixTemp | 1 | 0.039 | 0.039 | 0.935 | 0.347971 |
| Residuals | 16 | 0.669 | 0.042 | | |

TABLE 3

Summary of Sub Plot P-values for the ANOVA analysis

| Sub plot factors | Df | Sum Sq | Mean Sq | F value | p-value |
|---|---|---|---|---|---|
| Temp | 1 | 42.18 | 42.18 | 34218 | <2E−16 |
| Freq | 8 | 32.77 | 4.1 | 3322.6 | <2E−16 |
| PG:Temp | 1 | 0.23 | 0.23 | 185.16 | <2E−16 |
| Modify:Temp | 1 | 0.28 | 0.28 | 227.63 | <2E−16 |
| MixTemp:Temp | 1 | 0.02 | 0.02 | 16.342 | 6.89E−05 |
| PG:Freq | 8 | 0.13 | 0.02 | 13.625 | <2E−16 |
| Modify:Freq | 8 | 0.99 | 0.12 | 100.34 | <2E−16 |
| MixTemp:Freq | 8 | 0.01 | 0 | 0.764 | 0.63451 |
| Temp:Freq | 8 | 1.58 | 0.2 | 159.81 | <2E−16 |
| PG:Modify:Temp | 1 | 0.12 | 0.12 | 95.998 | <2E−16 |
| PG:MixTemp:Temp | 1 | 0.02 | 0.02 | 13.387 | 0.0003 |
| Modify:MixTemp:Temp | 1 | 0.01 | 0.01 | 4.169 | 0.04214 |
| PG:Modify:Freq | 8 | 0.07 | 0.01 | 7.335 | 7.85E−09 |
| PG:MixTemp:Freq | 8 | 0.01 | 0 | 1.143 | 0.3348 |
| Modify:MixTemp:Freq | 8 | 0 | 0 | 0.447 | 0.89165 |
| PG:Temp:Freq | 8 | 0.03 | 0 | 2.606 | 0.00923 |
| Modify:Temp:Freq | 8 | 0.08 | 0.01 | 8.531 | 2.31E−10 |
| MixTemp:Temp:Freq | 8 | 0 | 0 | 0.46 | 0.88377 |
| PG:Modify:MixTemp:Temp | 1 | 0 | 0 | 0.005 | 0.94543 |
| PG:Modify:MixTemp:Freq | 8 | 0 | 0 | 0.237 | 0.98354 |
| PG:Modify:Temp:Freq | 8 | 0.01 | 0 | 1.415 | 0.18995 |
| PG:MixTemp:Temp:Freq | 8 | 0.01 | 0 | 0.896 | 0.52048 |
| Modify:MixTemp:Temp:Freq | 8 | 0 | 0 | 0.431 | 0.90222 |
| PG:Modify:MixTemp:Temp:Freq | 8 | 0 | 0 | 0.409 | 0.91473 |
| Residuals | 272 | 0.34 | 0 | | |

Figure 19:
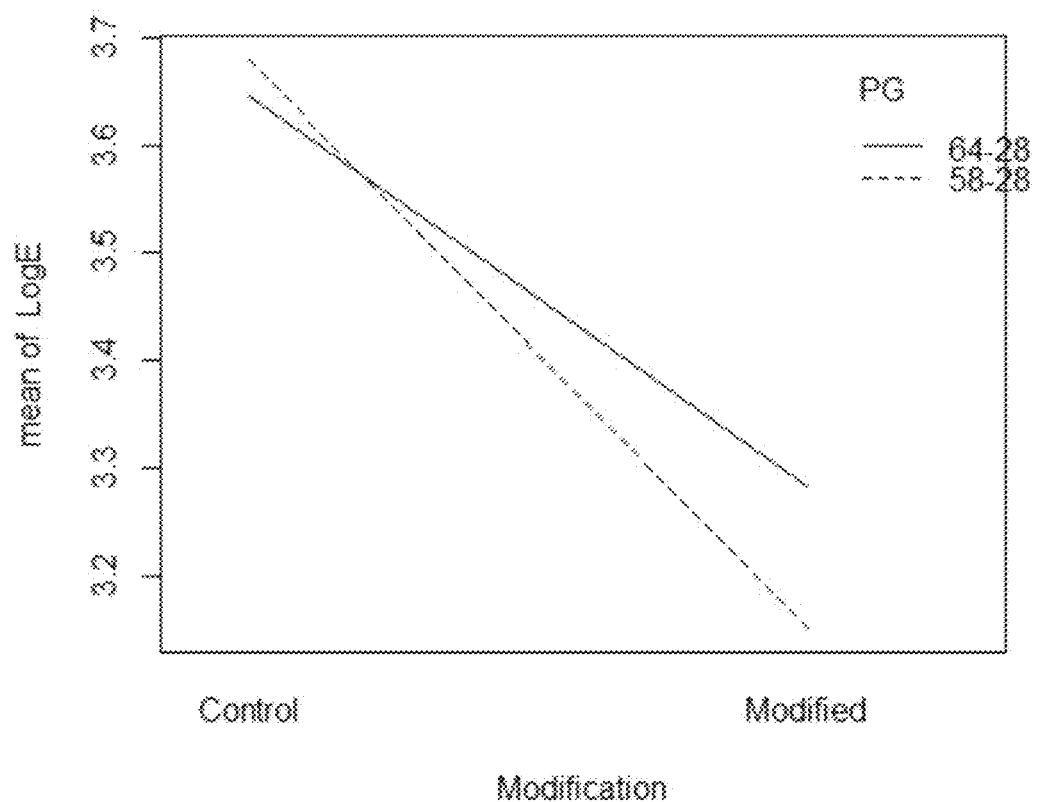
FIG. 19 shows an interaction plot for PG and modification.

According to Table 2, the type of binder (PG), mixing and compaction temperature and the modification were all significant factors in determining the dynamic modulus. More precisely, differences in dynamic modulus values between groups of specimens using, for instance, different binder grades were statistically significant at a 95% confidence level. This was also true between groups of specimens made at different mixing temperatures, as well as between groups of specimens made with control and modified binders. In addition to the significance of the three whole plot main factors, the interaction between the binder type (PG) and the modification factors was also shown to be significant. This essentially means that that the extent of the effect of modification on the dynamic modulus is found to be significantly dependent on the binder grade. A plot of the mean of the log dynamic modulus, of the type shown in FIG. 19, clearly demonstrates this finding where the lack of parallelism between the two lines is an indicator of the interaction between the two factors. From FIG. 19, it can be seen that the drop in the mean of the log dynamic modulus as a result of modification was significantly larger in case of the PG 58-28 binder compared to the PG 64-28 binder. This leads one to believe that the efficiency of the soybean additive in reducing the dynamic modulus is dependent to a large extent on the binder grade and the binder's composition.

Figure 20:
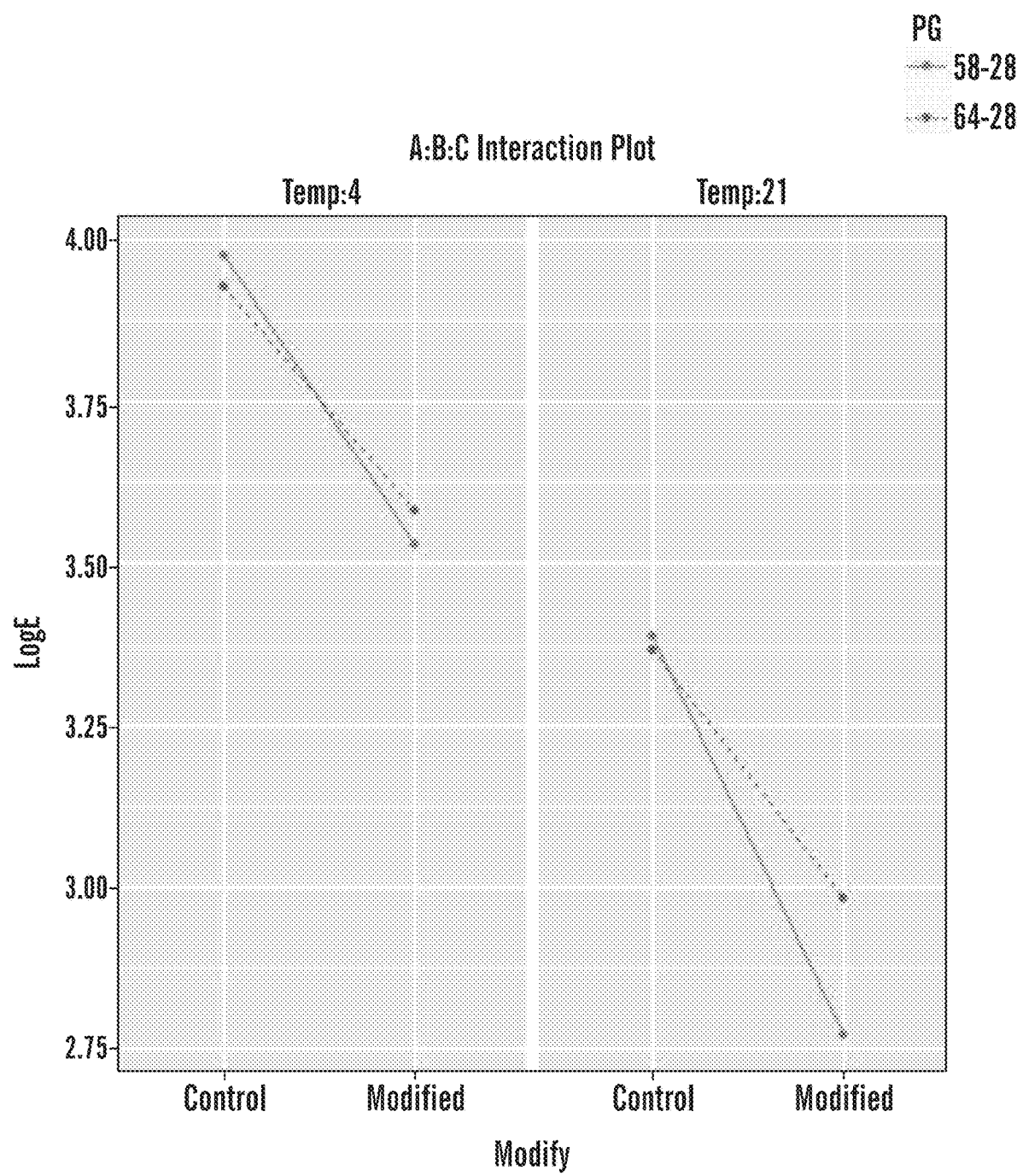
FIG. 20 is a plot of the three-way interaction between PG, modification, and temperature.

According to Table 3, both the subplot factors, namely temperature and frequency were also found to be statistically significant, along with their two-way interaction with the whole plot factors. The analysis also revealed a number of three-way interactions between factors. An example of a three-way interaction is the interaction between PG, modification and temperature. This interaction is best explained through FIG. 20, which plots the mean log dynamic modulus for both the control and modified binders at both test temperatures. It is shown that the degree of interaction between PG and modification varies with test temperature. More interaction is taking place between the two factors at the higher test temperature of 21° C. This can be explained in terms of the PG of the two binders. Both binders have the same low temperature grade, which explains their roughly similar response to modification at low temperature whereas their response to modification deviates notably at high temperature due to the fact that their high temperature grades are different. This finding further illustrates that the degree in reduction of the dynamic modulus is binder grade and composition dependent, where the drop in dynamic modulus at both low and high temperature ranges is related to the low and high temperature binder grades, respectively.

Figure 21:
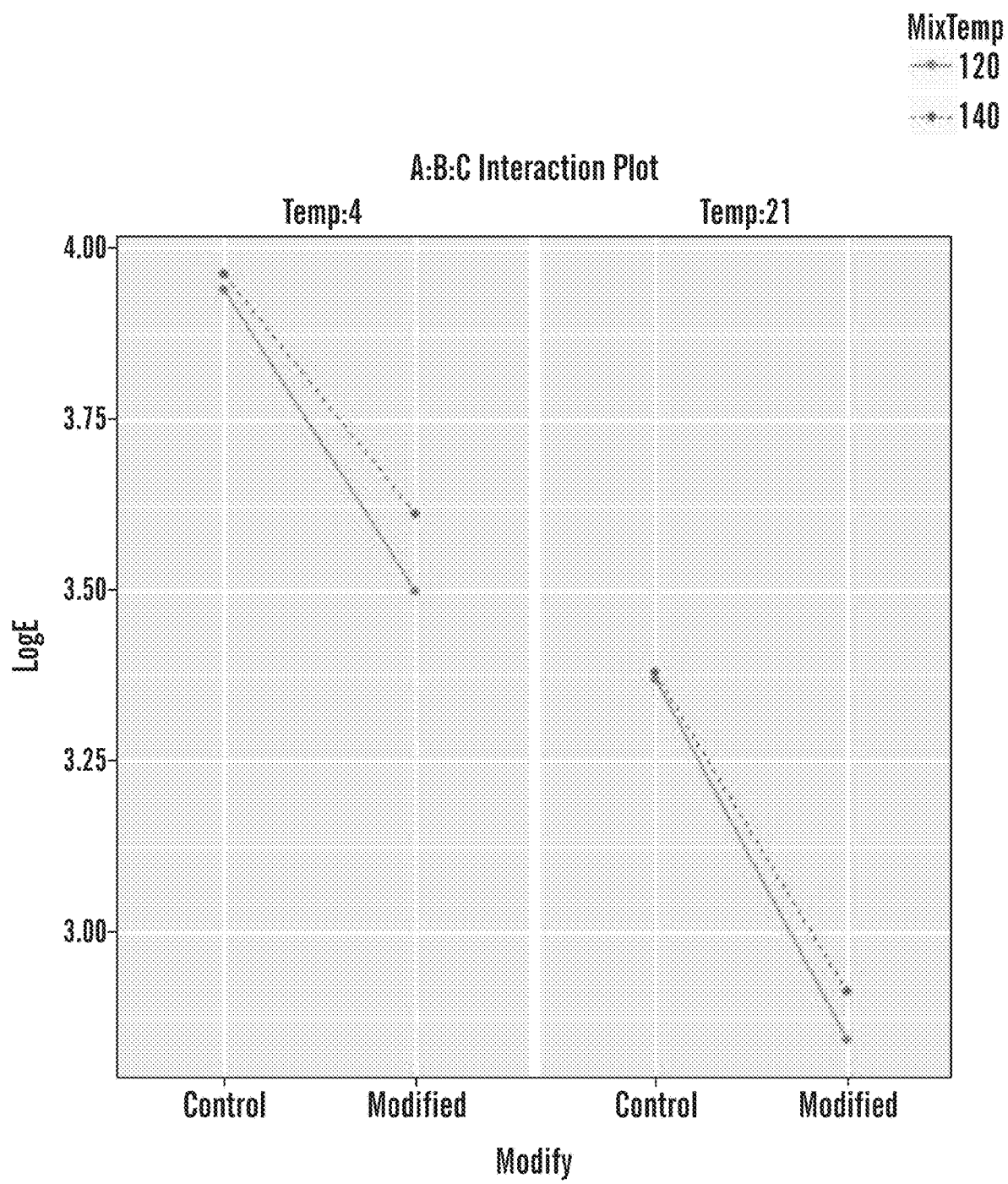
FIG. 21 is a plot of the three-way interaction between mixing temperature, modification and test temperature.

The analysis also revealed an interesting three-way significant interaction between mixing and compaction temperature, test temperature and modification. FIG. 21 illustrates the interdependence of these three factors, where the lack of parallelism at test temperature 4° C. signifies more interaction between the modification and the mixing and compaction temperature compared to 21° C. test temperature. When tested at 4° C., the drop in dynamic modulus of the specimens prepared at a mixing and compaction temperature of 120° C. was significantly larger than those specimens prepared at 140° C. However, at the 21° C. test temperature, the effect of mixing and compaction temperature on the change in dynamic modulus upon modification was not as evident. This finding verifies the results from the master curve analysis where it was noted that the effect of the mixing and compaction temperature was insignificant at the higher test temperature.

Example 11—FTIR-ATR

FTIR is used extensively to identify functional groups present in asphalt binders. Absorption/transmission peaks in an IR spectrum mark different vibrational frequencies of atomic bonds, which represent different functional groups. A study of the functional groups can reveal some useful information about aging of bitumen. An increase in carbonyls and sulfoxides chemical functional groups has been associated with an increase in viscosity and was noted to take place with aging (Herrington et al., "Oxidation of Roading Asphalts," *Industrial & engineering chemistry research* 33(11):2801-2809 (1994) and Petersen et al., "Asphalt Oxidation Mechanisms and the Role of Oxidation Products on Age Hardening Revisited," *Road Materials and Pavement Design* 12(4):795-819 (2011), both of which are incorporated by reference in their entirety).

FTIR-ATR uses attenuation of light internally reflected on a non-absorbing surface. The specimen is directly placed on the reflecting surface and absorbs the attenuated light, which penetrates a depth of only a few micrometers. The use of FTIR-ATR increases the sensitivity of measurement because multiple reflections lead to increased absorbance.

FTIR has been used to characterize aging in bitumens using the sulfoxides and carbonyls functional groups. The peaks at wavenumbers 1030 cm-1 and 1740 cm-1 represent the sulfoxides and carbonyls, respectively. Due to the differences in thickness between samples, the absolute peak values cannot be used as a measure of aging evolution. The sulfoxide and carbonyl peak values are however normalized against reference aliphatic functional groups, which do not significantly change with aging. The peaks at wavenumbers≈1377 cm-1 and ≈1466 cm-1 representing methyl ($CH_3$) and ethyl ($CH_2$) groups, respectively, are usually taken as reference. Carbonyl and sulfoxides indices are calculated as follows:

$$I_{CO} = V_{CO}/V_r \qquad [6]$$

$$I_{SO} = V_{SO}/V_r \qquad [7]$$

where, $I_{CO}$: Carbonyl index, $I_{SO}$: Sulfoxide index, $V_{CO}$: Carbonyl peak value (Height or area), $V_{SO}$: Sulfoxide peak value (Height or area), $V_r$: Ethyl+Methyl peak values.

Calculating the peak areas was shown to be a good indicator of the aging indices (Marsac et al., "Potential and Limits of FTIR Methods for Reclaimed Asphalt Characterisation," *Materials and Structures* 47(8):1273-1286 (2014), which is hereby incorporated by reference in its entirety). In this study, the carbonyl peak area was calculated between wavenumbers 1753 cm-1 and 1660 cm-1, the sulfoxide peak area between wavenumbers 1047 cm-1 and 966 cm-1, and the ethyl and methyl peak areas between wavenumbers 1525 cm-1 and 1350 cm-1, as outlined in the French MLPC Method No. 69 (Mouillet et al., "Identification and Quantification of Bituminous Binder's Oxygenated Species," *Analysis by Fourier transform infrared spectroscopy, Méthode d'essai* LPC (69) (2009), which is hereby incorporated by reference in its entirety).

Figure 22:
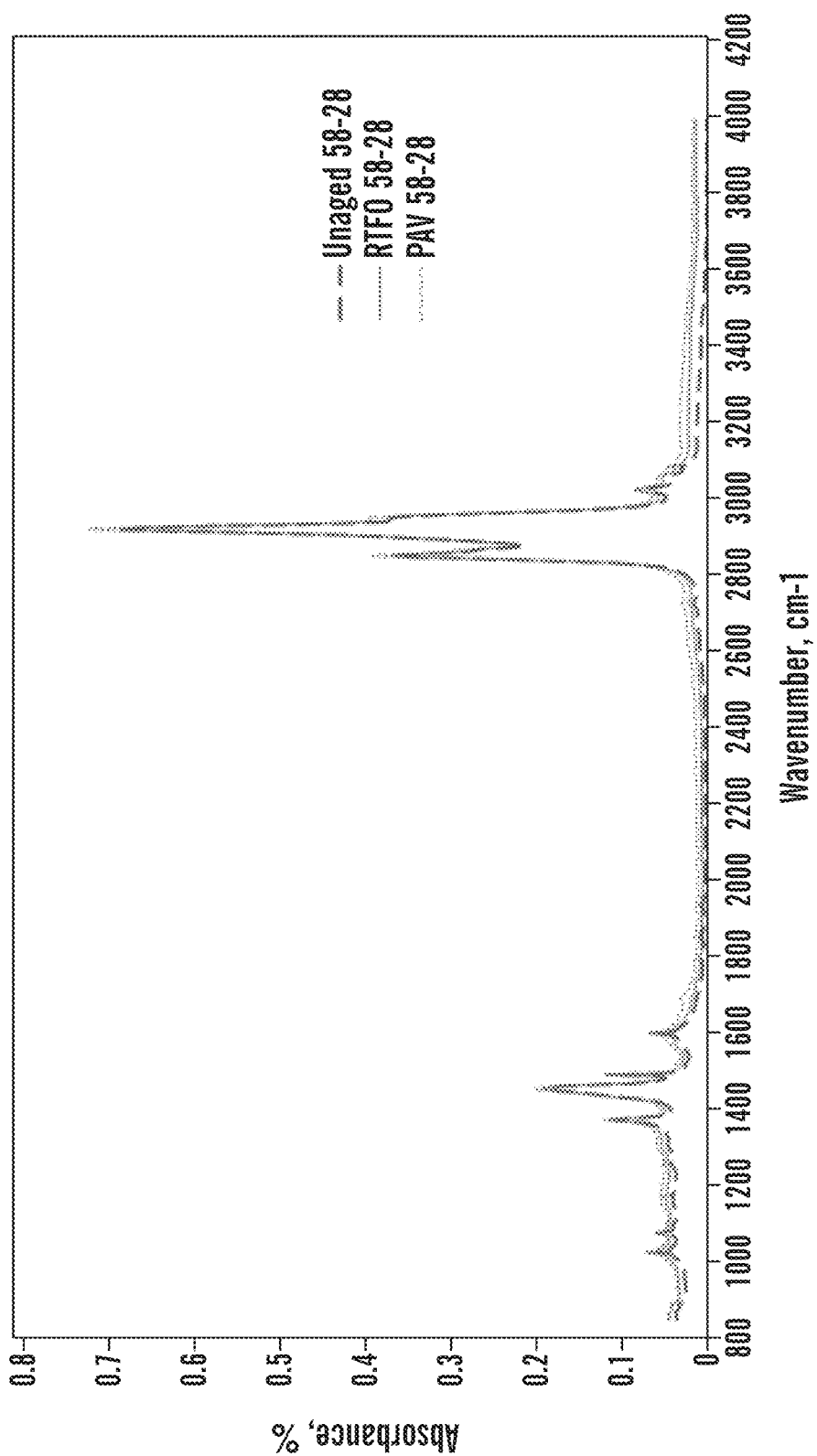
FIG. 22 is an FTIR spectrum for the control PG58-28.
Figure 23:
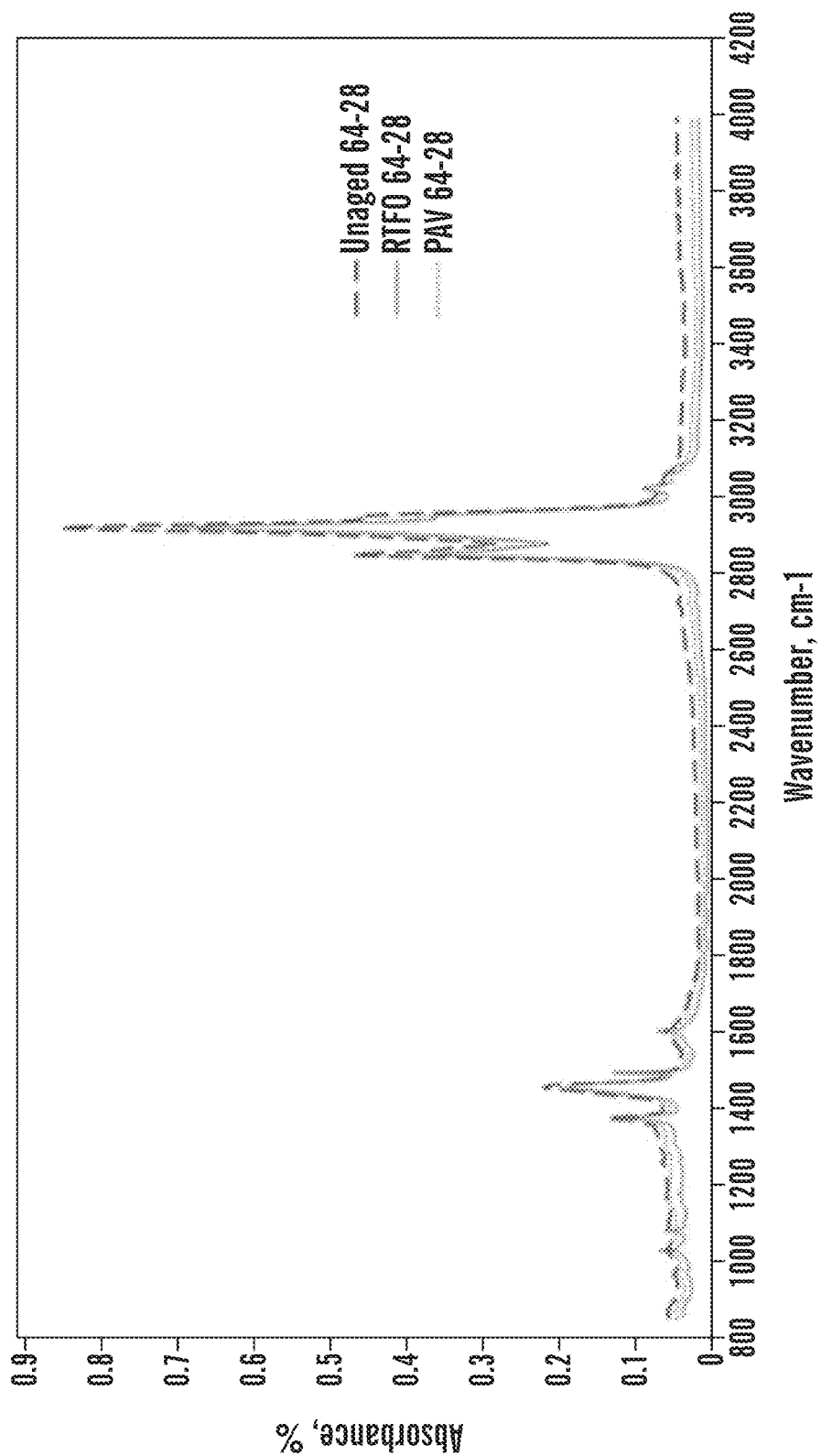
FIG. 23 is an FTIR spectrum for the control PG64-28.

FIGS. 22 and 23 show the absorption FTIR spectra for the unaged, RTFO, and PAV control PG58-28 and PG64-28 binders. All spectra show distinct peaks that are typical of asphalt binders. An interpretation of the important peaks that appear in the spectra are provided in Table 4.

TABLE 4

Interpretation of functional groups appearing in the FTIR spectra

| Functional group | Absorption wavenumbers (cm-1) |
|---|---|
| Carbonyls | 1741 (stretch) |
| Aromatic and Heteroaromatic rings | 1604 (ring stretch) |
| Sulfoxides | 1030 (stretch) |
| Methyl (aliphatic) | 2955-2871 (stretch), 1456-1377 (bend) |
| Ethyl (aliphatic) | 2924-2853 (stretch), 1496 (bend) |

Figure 24:
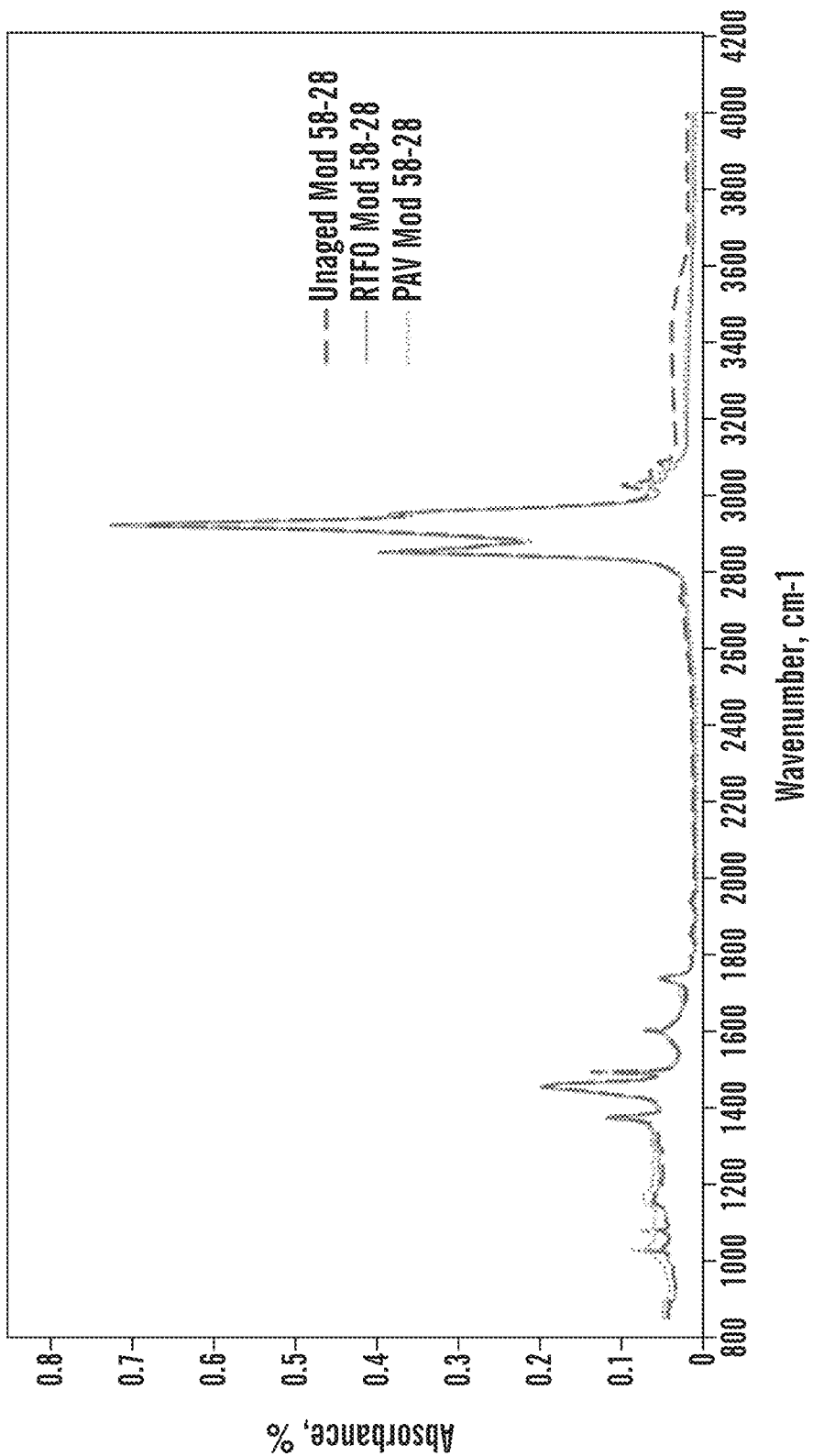
FIG. 24 is an FTIR spectrum for the modified PG58-28.
Figure 25:
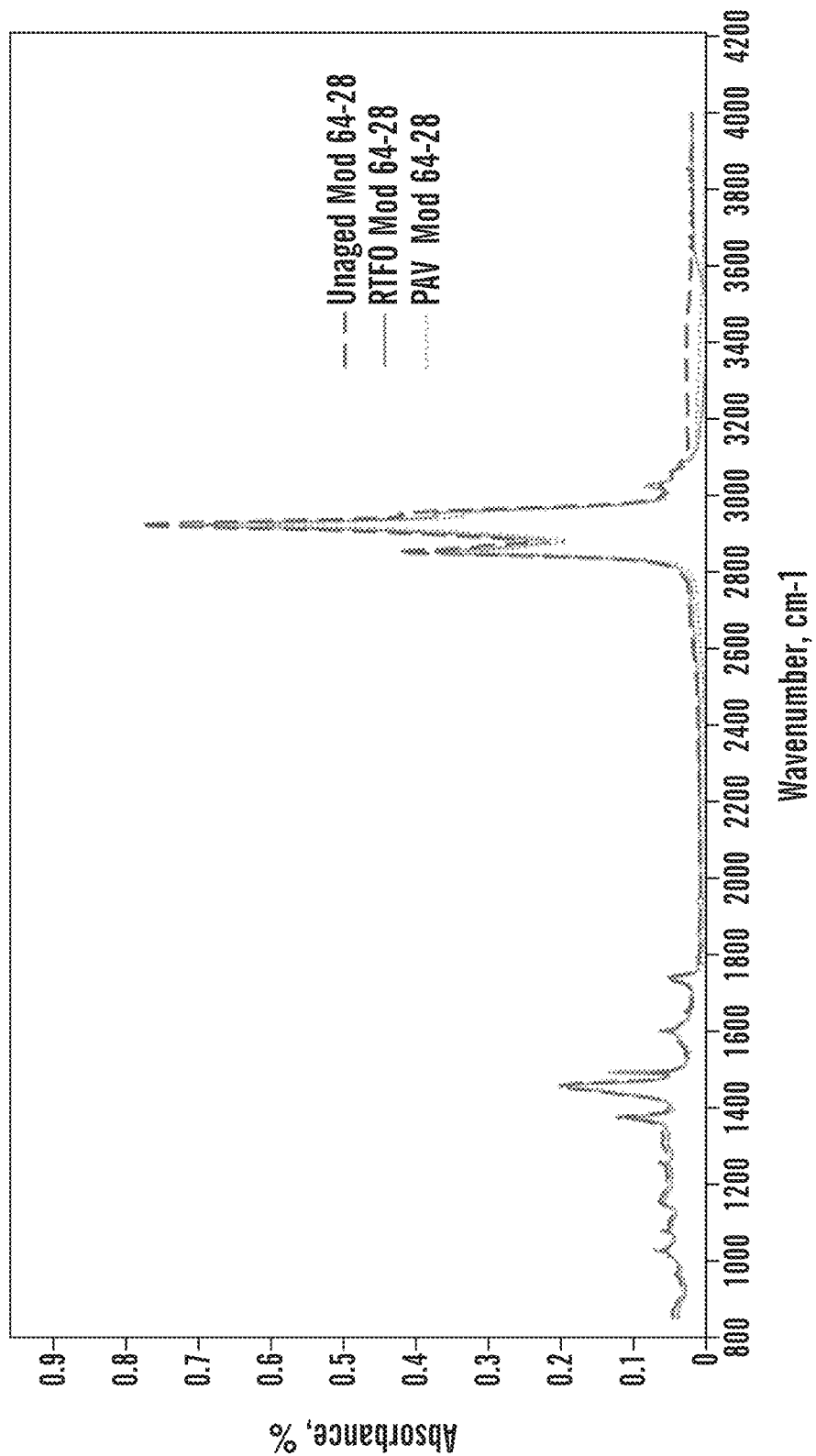
FIG. 25 is an FTIR spectrum for the modified PG64-28.

The FTIR spectra for the modified PG58-28 and modified PG64-28 are shown in FIGS. 24 and 25, respectively. Apart from the peaks in Table 4, an additional peak at 1155 cm-1 appears in the spectra for the modified binders, which is attributed to the benzene ring that is part of the soybean additive. It is also observed that the carbonyl peak increases significantly with the addition of the soybean additive owing to the ester bond that is present in the soybean additive structure.

Figure 26:
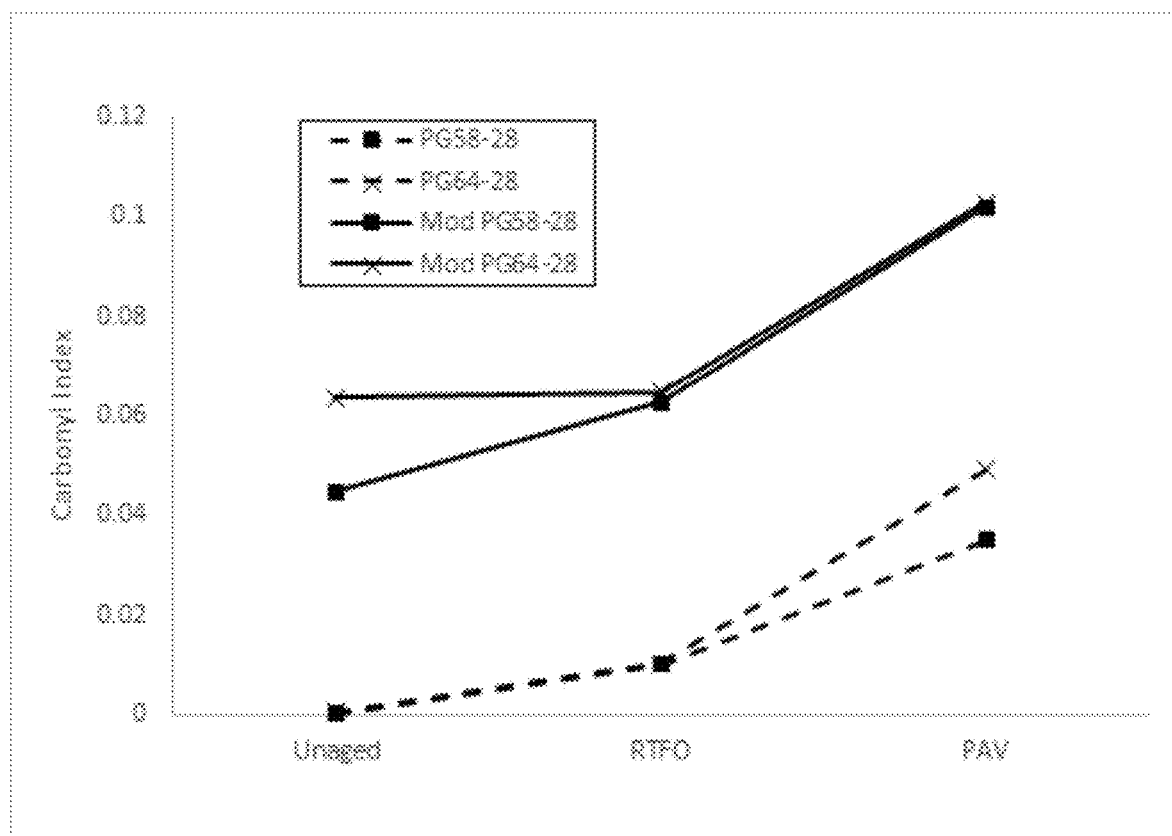
FIG. 26 depicts a change in carbonyl index with aging.
Figure 27:
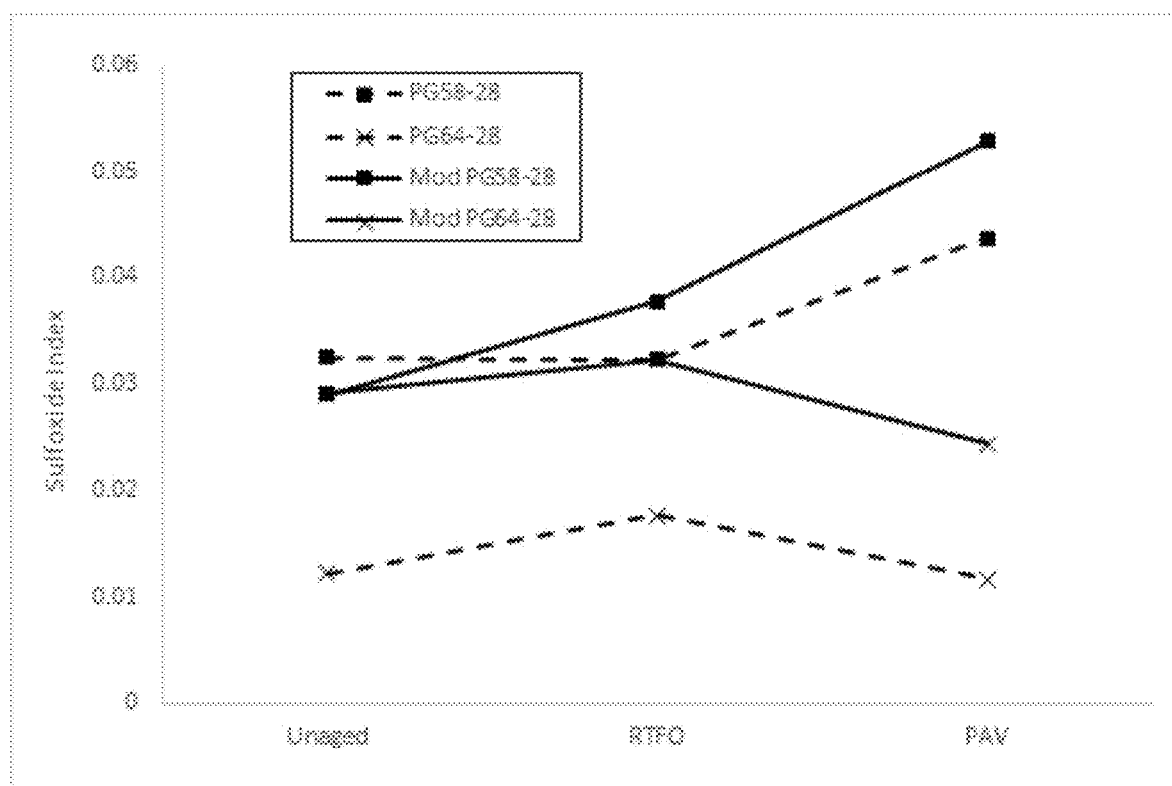
FIG. 27 depicts a change in sulfoxide index with aging.

The carbonyl and sulfoxide indices were calculated according to Equations 6 and 7, using the peak areas as detailed above. A plot of both indices is provided in FIGS. 26 and 27. As expected, the carbonyl index is shown to increase with aging. The evolution rate of the carbonyl index was comparable for both control and modified binders which indicate that the addition of the soybean additive did not influence the aging behavior of the binder. The sulfoxide index showed a similar increase with aging for the PG58-28 binder, however, a drop in the sulfoxide index was noted at later stages of aging for the PG64-28 binder. The drop was noted for both control and modified binders. Such drop in the sulfoxides index is not uncommon as decomposition of sulfoxides under severe aging conditions have been previously reported (Herrington, P. R., "Thermal Decomposition of Asphalt Sulfoxides," *Fuel* 74(8):1232-1235 (1995) and Ouyang et al., "Improving the Aging Resistance of Styrene-Butadiene-Styrene Tri-Block Copolymer Modified Asphalt by Addition of Antioxidants," *Polymer Degradation and Stability* 91(4):795-804 (2006), which are hereby incorporated by reference in their entirety).

Discussion of Examples 7-11

In this paper, a soybean-derived additive was investigated as a potential rejuvenator. The effect of adding a 0.75% rejuvenator by weight of binder on the rheological properties of both a PG58-28 and a PG64-28 was studied. The rejuvenator resulted in an improvement in the low temperature performance of both asphalt binders. The performance efficiency of the rejuvenator was shown to be dependent on the performance grade (PG) of the asphalt binder. In this case, the enhancement in fatigue resistance upon addition of the rejuvenator was more for the PG64-28 compared to the PG58-28. The use of rejuvenator also led to an increase in the rutting susceptibility, which could be controlled by careful selection of the rejuvenator content.

Rotational viscometer testing revealed that the soybean modified binders had much lower viscosity values as compared to the control binders at all test temperatures. The reduction in viscosity was greater at low temperatures, which promotes applying lower mixing temperatures when using the modified asphalt binders. It was also apparent that the modified binders had less viscosity-temperature susceptibility compared to the control binders.

Asphalt mixtures prepared using the modified binders at two different mixing and compaction temperature, namely 120° C. and 140° C., were tested for dynamic modulus, and compared against mixtures made with control binders. The constructed master curves showed a reduction in dynamic modulus with the soybean modification at both mixing temperatures. The effect on dynamic modulus at low test temperatures was, however, more prominent at the mixing temperature of 120° C., in particular for the PG64-28 mixtures.

A comprehensive statistical analysis was performed to further analyze the effect of the different factors on the dynamic modulus. It was shown that the performance grade (PG), the mixing and compaction temperature, and modification were significant parameters in determining the dynamic modulus. The statistical analysis also verified that the performance of the soybean additive is dependent on the asphalt binder. Furthermore, it was revealed that the effect of the mixing and compaction temperature was significant at low test temperatures only, but not at high test temperatures.

FTIR-ATR was used to characterize aging in both the control and modified asphalt binders. It was noted that the carbonyl and sulfoxide functional groups were shown to increase with aging. Studying the evolution of these two functional groups, it was concluded that the modification did not cause any significant influence on the aging behavior of the asphalt binders.

In conclusion, the soybean-derived additive has proven to be very efficient in modifying the rheological properties of asphalt binders and the dynamic modulus of asphalt mixtures. It is remarkable to note that such effect of the soybean additive was achieved at a very small dosage of 0.75%, compared to dosages that can exceed 12% with commercially available rejuvenators. An even lower dosage can be used to reduce the negative impact of lowering rutting resistance, while still improving the low temperature fatigue performance considerably.

Example 12—Additional Materials and Methods

The binder used is a neat PG58-28. A soybean-derived material is used as a rejuvenator. Reclaimed asphalt pavement (RAP) was milled from pavements in the State of Iowa, USA. The RAP had a nominal maximum aggregate size of 12.5 mm and a binder content of 5.1%.

The extraction of the RAP binder was conducted as per ASTM D2172-Method A—using toluene. A rotary evaporator was then used to evaporate out the toluene and recover the RAP binder as per ASTM D5404. The recovery process was performed under a nitrogen blanket to prevent further oxidation of the binder. The recovered RAP binder was tested using a Dynamic Shear Rheometer (DSR) to determine their RTFO high critical temperature. PAV-aged RAP binder was tested using a Bending Beam Rheometer (BBR) to determine their low critical temperature.

The soybean rejuvenator was added to the PG58-28 binder at a dosage of 12%. A neat PG58-28 and the 12% modified PG58-28 were then blended with the extracted RAP binder at a ratio of 1:5, resulting in an effective rejuvenator dosage of 0% and 2%, respectively. A pure RAP binder was also used as a control.

For performance grade evaluation, DSR and BBR tests were conducted as per AASHTO T315 and AASHTO T313, respectively. Short-term aging using a Rolling Thin Film Oven (RTFO), was done according to ASTM D2872 at 163° C. for 85 minutes. Long-term aging using PAV was conducted on the RTFO aged binder as per ASTM D6521 for a duration of 20 hours at 100° C. and 2.1 MPa pressure.

To assess fatigue using the Glover-Rowe parameter, DSR testing was done at a temperature of 44.7° C. and a frequency of 10 rad/s. The Glover-Rowe damage lines were plotted and the condition of the various binders at different aging conditions were marked on the Glover-Rowe diagram.

To evaluate low temperature cracking resistance, the Disc-Shaped Compact Tension (DCT) test was conducted in accordance with ASTM D7313 at a temperature of −6° C. DCT specimens measuring 50 mm in thickness and 150 mm in diameter were used. Three samples were prepared and tested for each mixture at the desired test temperature and the average fracture energy was reported. Specimens were conditioned at the test temperature for 2 hours prior to testing. The load was applied using loading rods inserted into two holes cored into the specimen, at rate inducing a crack mouth opening displacement (CMOD) of 1 mm/min.

Thermogravimetric analysis (TGA) was performed using a Netzsch STA449 F1 instrument to assess the thermal stability of the studied binders, namely RAP, RAP+PG58-28 and RAP+ 12% modified PG5-28. TGA was also conducted on the soybean-derived rejuvenator to determine its thermal decomposition behavior. A 5-mg sample was placed in an alumina crucible and an internal mass balance allowed recording changes in mass with temperature. The instrument also provided differential scanning calorimetry (DSC) data. A reference crucible made of alumina was used and the difference in heat flow needed to keep the sample crucible at the same temperature as the reference crucible was recorded. DSC data can be used to identify endothermic and exothermic events taking place during the heating process. DSC data was retrieved and used to further analyze the thermal behavior of the soybean-derived rejuvenator.

To provide some insight on the chemical composition of the binders and the rejuvenator, the evolved gases from the TGA run was analyzed using Fourier Transform Infrared (FTIR). The TGA instrument is connected to a Bruker Tensor 37 FTIR instrument. An FTIR spectrum was acquired every 15 seconds so a complete analysis of the evolved gases can be obtained. FTIR is useful to identify different functional groups within the sample. The FTIR spectra of the rejuvenator can be studied and a comparison between the chemical composition of the unrejuvenated and rejuvenated binders can be made.

Example 13—Performance Grading

The performance grades of the control RAP binder as well as the rejuvenated RAP binders were determined and are listed in Table 5. The critical high temperature was obtained using DSR testing in accordance with AASHTO T315 as per the criteria $G^*/\sin \delta > 1$ kPa and $G^*/\sin \delta > 2.2$ kPa for both the unaged and RTFO aged binders. No unaged result is available for the extracted RAP binder since it was considered RTFO aged. The RAP binder failed at a high temperature of 108.6° C. No appreciable drop in the critical high temperature was noted with the addition of the neat PG58-28. However, the modified PG58-28 resulted in a reduction in the critical high temperature from 108.6° C. to 73.9° C. A similar reduction in the critical low temperature was noted from −10.8° C. to −22.3° C. The overall effect of the 12% modified PG58-28 was to bring down the PG of the RAP binder from PG106-10 to PG70-22.

TABLE 5

Rheological properties of tested binders

| Binder | RAP | RAP + PG58-28 | RAP + 12% Modified PG58-28 |
|---|---|---|---|
| Unaged (High Temp.), ° C. | NA | 105.6 | 76.2 |
| RTFO (High Temp.), ° C. | 108.6 | 99.9 | 73.9 |
| PAV (Low Temp.), ° C. | −10.8 | −11.9 | −22.3 |
| Performance Grade (PG) | 106-10 | 100-10 | 70-22 |
| Mass loss (%) | NA | 0.4 | 0.5 |

The mass loss values show that there was no considerable mass loss difference due to the addition of the soybean-derived rejuvenator, which points to its thermal stability. A more thorough analysis of the thermal stability of the rejuvenator will be given by the TGA results.

Example 14—ΔTc Parameter

Figure 28:
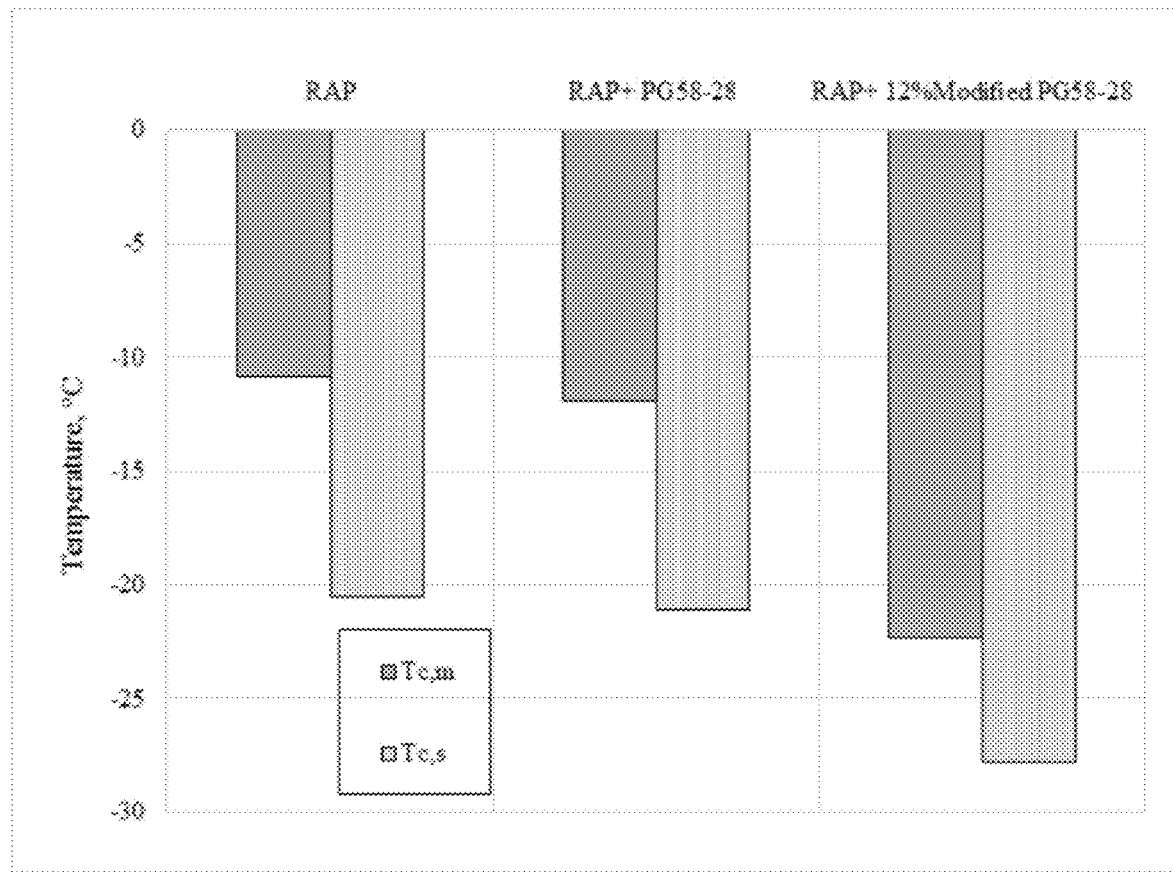
FIG. 28 shows values for Tc,S and Tc,m for the tested binders.

The PAV low temperature shown in Table 5 is the minimum temperature at which both the stiffness and m-value from the BBR test satisfy the conditions set forward in ASTM D7643. Recently, there has been a lot of interest in studying both the stiffness and m-value property independently and in relation to one another (Anderson et al., "Evaluation of the Relationship Between Asphalt Binder Properties and Non-Load Related Cracking," *Journal of the Association of Asphalt Paving Technologists* 80 (2011), which is hereby incorporated by reference in its entirety). Aged binders have shown to exhibit more deterioration in their m-values (Glover et al., "Development of a New Method for Assessing Asphalt Binder Durability With Field Validation," (2005), which is hereby incorporated by reference in its entirety). With aging, the difference between the temperature at the limiting stiffness S=300 MPa (Tc,S) and the temperature at the limiting m-value m=0.4 (Tc,m) starts to increase. To provide more insight into the low temperature properties, the values of both Tc,S and Tc,m are plotted in FIG. 28. It is seen that the addition of the PG58-28 did not affect the values of both temperatures significantly. The addition of the soybean rejuvenator caused a decrease in both temperatures. However, there was more drop in the value of Tc,m compared to the value of Tc,S upon the addition of the rejuvenator. Aged binders suffer from a largely reduced m-value which significantly lower their stress relaxation properties. The effect the rejuvenator has on the value of ΔTc illustrates its ability to restore the stress relaxation properties of the aged binder. The difference between Tc,S and Tc,m was defined as ΔTc (Anderson et al., "Evaluation of the Relationship Between Asphalt Binder Properties and Non-Load Related Cracking," *Journal of the Association of Asphalt Paving Technologists* 80 (2011), which is hereby incorporated by reference in its entirety). The ΔTc parameter for the RAP, RAP+PG58-28 and the RAP+12% modified PG5-28 binders was calculated as −9.7° C., −9.2° C. and −5.5° C. A more negative ΔTc value is characteristic of an aged binder. The ΔTc was improved significantly with the soybean rejuvenator.

Example 15—Rutting and Fatigue Parameters

Figure 29:
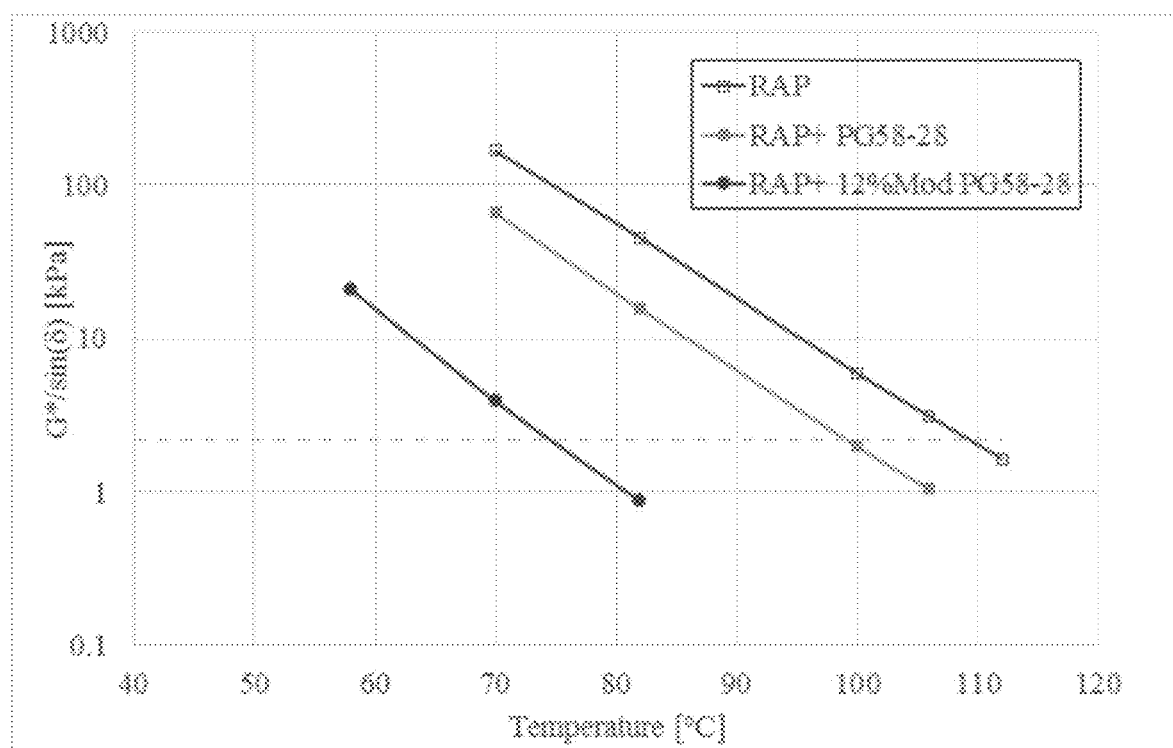
FIG. 29 shows variation of G*/sin δ parameter with temperature.

FIG. 29 shows the variation of the rutting parameter, $G^*/\sin\delta$, with temperature for all three binders. The data shown in FIG. 29 was obtained using DSR testing at a frequency of 10 rad/s using RTFO-aged binders. Unaged binders could not be assessed since there was no unaged data for the RAP binder. Additionally, the critical high temperature, shown in Table 5, was limited by the RTFO-aged binder rutting performance. For RTFO-aged binders, rutting performance is considered acceptable when the measured rutting parameter is above 2.2 KPa, as specified by AASHTO T315. RAP binders, being very stiff, typically have high resistance against rutting. With the addition of the rejuvenator, the stiffness drops and so does the rutting resistance. The rejuvenated RAP binder showed acceptable rutting resistance up to a temperature of 73.9° C.

Figure 30:
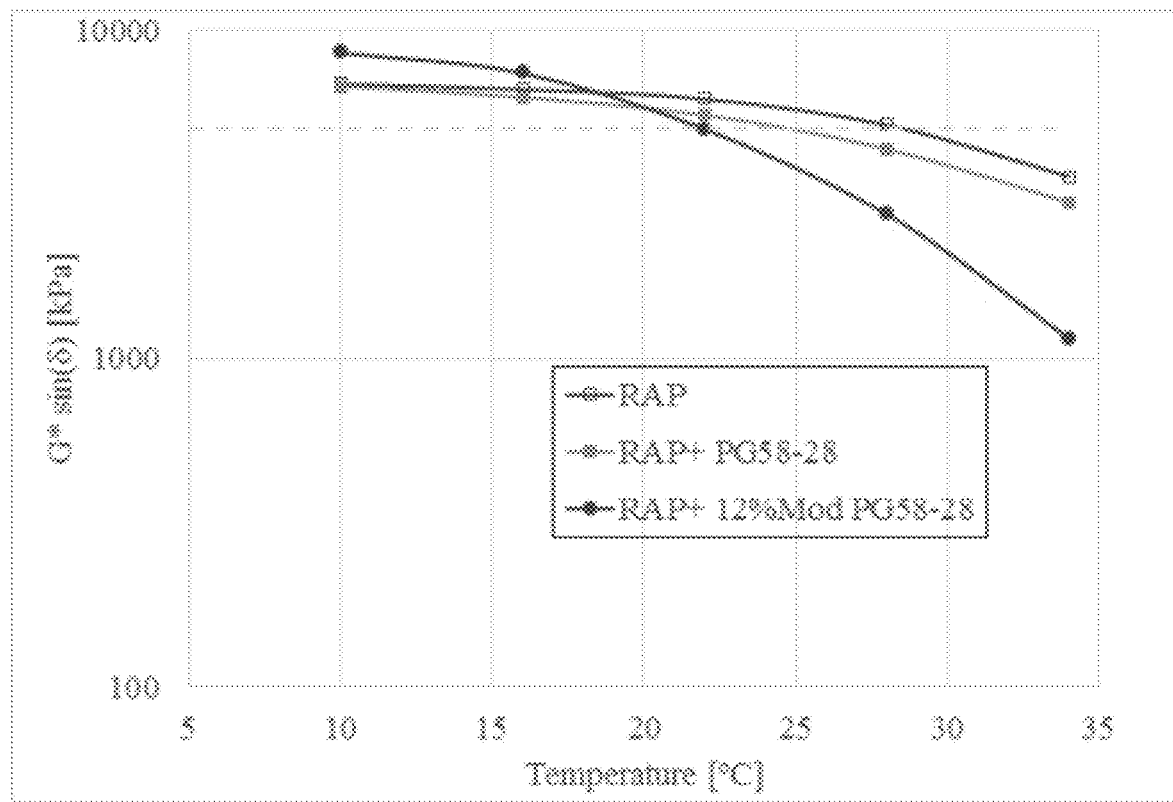
FIG. 30 shows the variation of G* sin δ parameter with temperature.

The fatigue parameter $G^* \sin\delta$ examines the fatigue performance at intermediate temperature. The critical intermediate temperature is defined as the value when $G^*\sin\delta=5000$ kPa as per AASHTO T315. FIG. 30 shows the variation of $G^* \sin\delta$ with temperature. The rejuvenated RAP binder shows a lower critical intermediate temperature compared to both the control RAP binder and the RAP binder blended with the PG58-28. The fatigue parameter for the rejuvenated binder however increases relative to the other two binders below a temperature of around 18° C. This is largely due to the increase in phase angle with the addition of the rejuvenator.

The fatigue parameter $G^*\sin\delta$ adopted by Superpave is a measure of energy dissipation. A lower fatigue parameter indicates less energy dissipated in the form of cracks and deformation. This parameter however has been scrutinized recently specifically due to its insensitivity to aging (Glover et al., "Development of a New Method for Assessing Asphalt Binder Durability With Field Validation," (2005), which is hereby incorporated by reference in its entirety). A recently developed parameter, namely the Glover-Rowe parameter, will be used to further study the fatigue performance and aging characteristics of the binders below.

Example 16—Glover-Rowe Parameter

The Glover-Rowe Parameter has been recognized as a valuable tool to investigate fatigue in bitumen. The parameter was based on the work done by Glover (Glover et al., "Development of a New Method for Assessing Asphalt Binder Durability With Field Validation," (2005), which is hereby incorporated by reference in its entirety) who initially introduced the parameter in the form of $G'/(\eta'/G')$ where G' is the storage modulus and iris the dynamic viscosity. Glover's fatigue parameter was found to correlate well with ductility measurements made by Kandhal (Kandhal, P. S., "Low-Temperature Ductility in Relation to Pavement Performance," in: C. R. Marek (Ed.), Low-Temperature Properties of Bituminous Materials and Compacted Bituminous Paving Mixtures, ASTM International (1977), which is hereby incorporated by reference in its entirety). The fatigue parameter was later simplified in the form of $G^*{_*}^{\cos\delta^{2/}}\sin\delta$. The parameter can be calculated using DSR measurements at 15° C. and 0.005 rad/s, where the data correlated best with ductility and field performance. Two damage zones were identified denoting the onset of cracking and significant damage. The damage zones are defined in terms of the fatigue parameter per the equations: $G^*{_*}^{\cos\delta^{2/}}\sin\delta=180$ kpa for damage onset and $G^*{_*}^{\cos\delta^{2/}}\sin\delta=600$ kpa for significant damage. Since it is impractical to perform DSR testing at the shear rate of 0.005 rad/s, it was proposed to run the testing at a temperature of 44.7° C. and a frequency of 10 rad/s (Anderson et al., "Evaluation of the Relationship Between Asphalt Binder Properties and Non-Load Related Cracking," *Journal of the Association of Asphalt Paving Technologists* 80 (2011), which is hereby incorporated by reference in its entirety).

Figure 31:
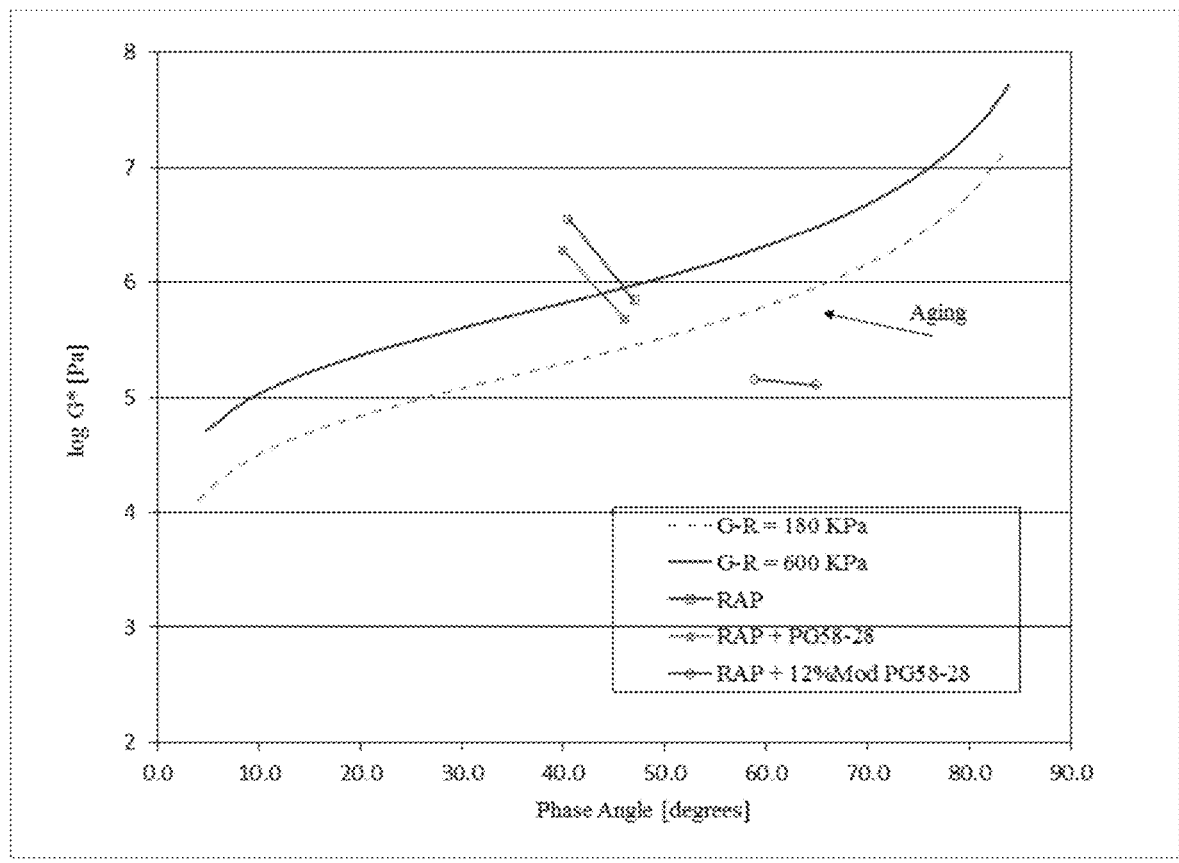
FIG. 31 shows a Glower-Rowe diagram of phase angle versus Log G* [Pa].

DSR testing was performed on the RTFO aged and the RTFO+PAV aged binders at a temperature of 44.7° C. and a frequency of 10 rad/s. The complex shear modulus and the phase angle for each of the binders at the respective aging condition were noted and marked on the Glover-Rowe fatigue diagram in FIG. 31. The Glover-Rowe damage lines were also plotted indicating onset of damage and significant damage. For all binders, PAV aging cause a shift towards the upper left corner of the diagram denoting higher stiffness and lower phase angles. For the RAP binder, the deteriorated condition of the binder was evident by its proximity to the significant damage line. The diagram predicts the PAV-aged RAP binder to show significant signs of fatigue cracking if used as is. Blending the RAP binder with a PG58-28 did not considerably improve its fatigue resistance. The PAV-aged RAP binder blended with PG58-28 is still destined to total failure under fatigue, as suggested by the diagram. Using the soybean-derived rejuvenator clearly improved the fatigue cracking resistance of the RAP binder. The rejuvenator helped reduce the stiffness as well as increase the phase angle hence shifting the RAP binder away from the damage zone. It is also worth noting that the rate of damage with PAV aging was lower with the rejuvenated RAP binder compared to the pure RAP binder and the RAP binder blended with the neat PG58-28.

Example 17—Disk-Shaped Compact Tension (DCT)

DCT specimens were prepared using 100% RAP aggregate mixed with virgin binder. The RAP aggregate, having a 5.1% binder content, was mixed with virgin binder to bring the binder content to a total of 6%. Two groups of specimens were made using neat PG58-28 and 12% modified PG58-28 as virgin binders. During actual mixing, the virgin binder does not fully blend with the RAP binder. Hence, these specimens represented real/partial blending conditions. To assess full blending condition, RAP binder was first extracted and recovered from the RAP aggregate. The RAP binder was then blended with the virgin binder; neat PG58-28 or 12% modified PG58-28. The resulting blend was then remixed with the recovered bare RAP aggregate and compacted to produce two additional groups of DCT specimens representing full blending conditions. In total, four groups of specimens were prepared and tested, to assess the difference in performance between the neat PG58-28 and the 12% modified PG58-28 considering both real/partial and full blending with the RAP binder. Testing for all specimens was done at −6° C. All mixtures were prepared with a total binder content of 6% and a target air void content of 4%. Mixing and compaction was done at a temperature of 150° C.

The DCT test results for both real blending and full blending conditions are shown in Table 6. In general, the average fracture energy of the mixtures prepared with the rejuvenated PG58-28 binder was higher than the mixtures prepared using the neat PG58-28. Regardless of the blending condition, the fracture energy of the RAP mixtures made with the neat PG58-28 were lower than the minimum threshold of 400 J/m$^2$ required to provide adequate transverse cracking performance (Buttlar et al., "Comprehensive Database of Asphalt Concrete Fracture Energy and Links to Field Performance," 89th Annual Meeting of the *Transportation Research* Board, 502 Washington, DC (2010), which is hereby incorporated by reference in its entirety). The difference between the real blending and full blending conditions for these mixtures was not discernable due to the fact that the low temperature performance grades of the pure RAP binder and the RAP binder modified with neat PG58-28 were not distinctly different as shown in Table 5.

Typically, DCT testing is done at a temperature which is 10° C. higher than the binder's low temperature performance grade (PG). Noting that the low temperature performance grade of the RAP+12% modified PG58-28 blend was −22° C. as shown in Table 5, one would expect the mixtures prepared with the rejuvenated PG58-28 to provide satisfactory performance up to a test temperature of −12° C. However, the DCT results under real blending conditions show that these mixtures barely exceeded the minimum threshold of 400 J/m$^2$ at a test temperature of −6° C. When full blending condition was achieved, the fracture energy of these mixtures increased to 528 J/m$^2$.

Partial or improper blending can cause non-uniform distribution of the rejuvenator throughout the aged RAP binder. This non-uniform blending creates spots of unrejuvenated stiff RAP binder which acts as stress concentration regions leading to reduced fracture energy. The large coefficient of variation noted with the real blending mixes could be an indication of non-uniform blending as indicated above.

The results clearly indicate that the degree of blending can have a major impact on the performance of the rejuvenated RAP mixtures. It is thus of paramount importance to ensure a high degree of blending so that the full potential of the rejuvenator is achieved. A comprehensive study into the way the rejuvenator is added and mixed with the RAP mixtures is important to ensure proper blending.

TABLE 6

DCT results for the tested mixtures at −6° C.

| Mixture Type | Real blending | | Full blending | |
| --- | --- | --- | --- | --- |
| | Average fracture energy (J/m$^2$) | Coefficient of variation | Average fracture energy (J/m$^2$) | Coefficient of variation |
| RAP + PG58-28 | 377 | 0.17 | 379 | 0.07 |
| RAP + 12% Mod PG58-28 | 424 | 0.18 | 528 | 0.06 |

Example 18—Thermogravimetric Analysis (TGA)

TGA was conducted for all three binders to assess changes in their mass with temperature. The binders were heated from 50° C. to 1000° C. at a rate of 20° C./min. Nitrogen was used as a purging gas at a flow rate of 20 ml/min to prevent combustion until a temperature of 550° C. was reached. At this temperature, the purging gas was then changed to a 50:50 mixture of oxygen and nitrogen at a total flow rate of 20 ml/min. The use of oxygen helped promote combustion of the remaining asphalt constituents beyond a temperature of 550° C.

Figure 32:
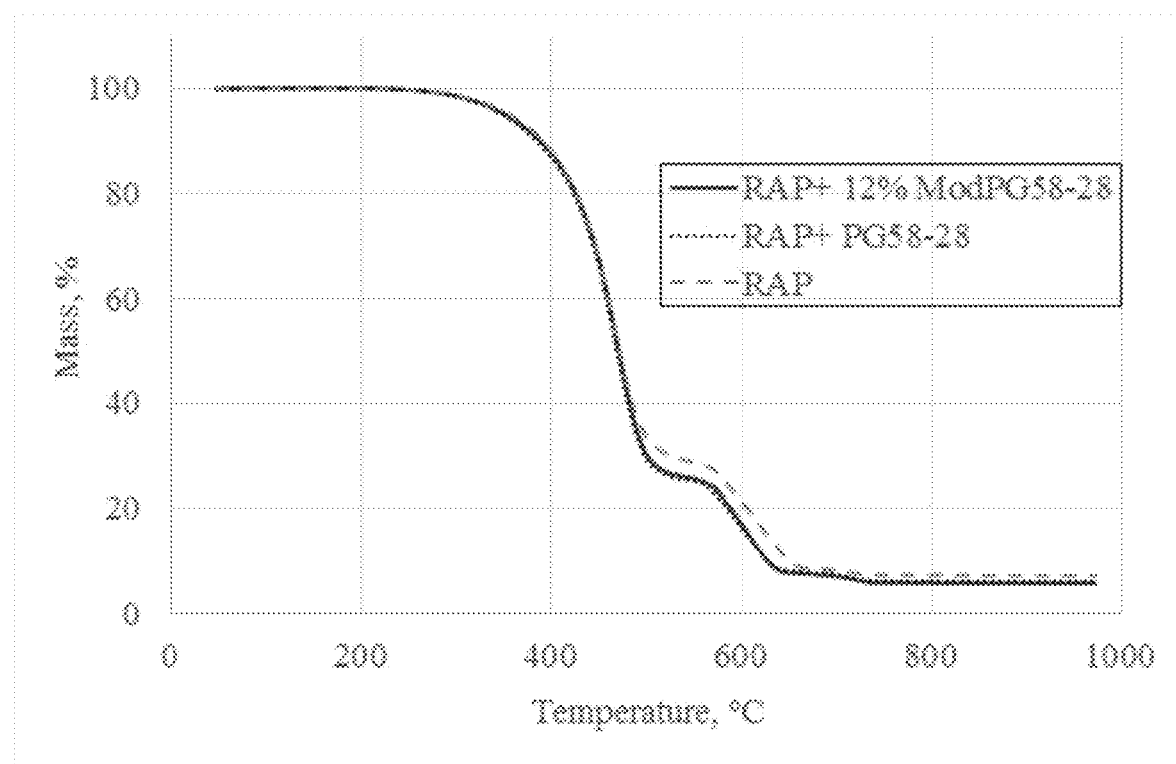
FIG. 32 are thermogravimetric analysis (TGA) curves of studied binders.

The TGA curves for all three binders are shown in FIG. 32. All curves show four distinct regions. The initial region showing minimal mass loss. The end of this region is marked by the initial decomposition temperature which is hereby defined as the temperature where the mass loss reached a value of 2%. The second region shows a consistent mass loss denoting thermal decomposition of asphalt constituents. A third region which starts around 540° C. exhibits a near horizontal plateau indicating no further mass loss. The fourth and last region represents the combustion of the remaining carbonaceous constituents upon the addition of oxygen.

Figure 33:
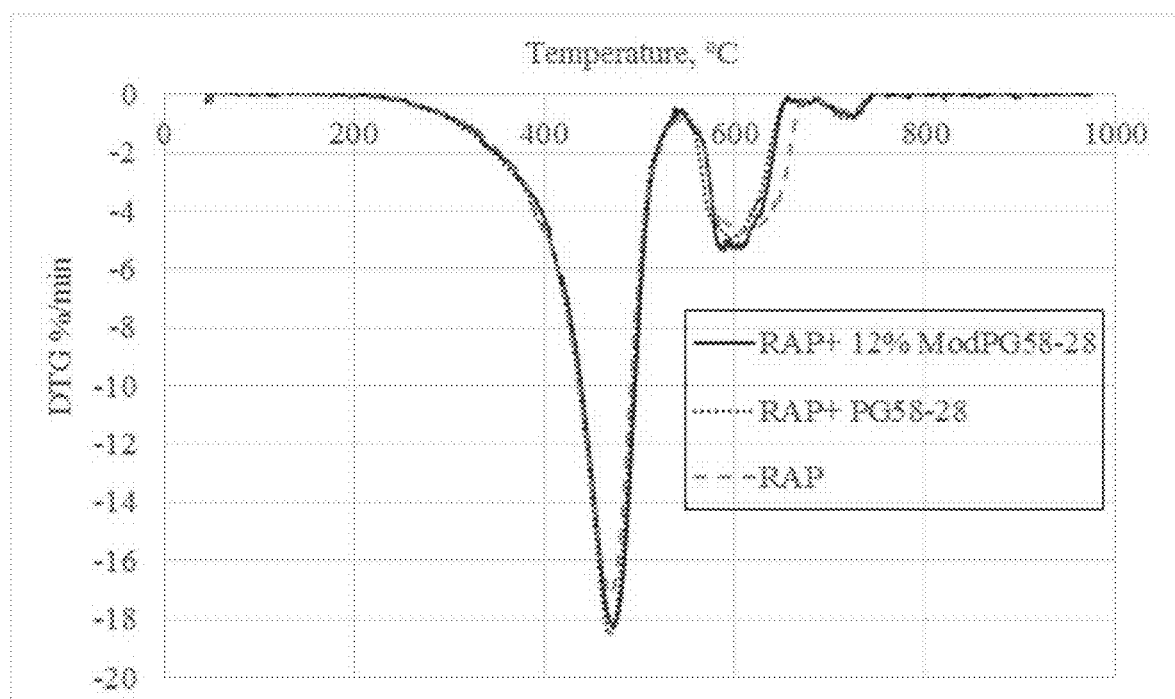
FIG. 33 shows derivative thermogravimetric (DTG) curves of studied binders.

FIG. 33 shows the first derivative of the TGA curve, referred to as the derivative thermogravimetric (DTG) curve. DTG provides information about the rate of change of mass loss with temperature, and can be used to identify the temperature at which this rate reaches a maximum. The region in the DTG curve where the rate of mass loss was nearly zero corresponds to the part of the TGA curve where negligible mass loss was occurring. The thermal decomposition region showed an increasing rate of mass loss up to a temperature of 470-480° C. where the rate of mass loss was maximized. Beyond this temperature, the rate of decomposition starts to drop down until it reaches a near zero value at about 540° C. where no significant mass loss was taking place. The addition of oxygen at a temperature of 550° C. triggered further mass loss because of combustion. The combustion process resulted in two more mass loss peaks at around 600-620° C. and 700° C.

Table 7 shows the initial decomposition temperature (IDT), char yield percentage, and percentage residue for all three binders, obtained from the TGA curves. The char yield is the mass remaining at a temperature of 550° C., and the percentage residue is the remaining percentage of asphalt material at the end of the analysis. A study of the parameters in Table 7, as well as a comparison of the TGA curves, clearly indicate that the RAP binder shows the highest thermal stability among all three binders. This result confirms with the fact that aged binders have a large portion of asphaltene which are thermally stable at high temperatures. The increased thermal stability is evidenced by the high initial decomposition temperature, as well as the high percentage of char yield and residues. Adding a softer binder, PG58-28, lowers the initial decomposition temperature by a few degrees, from 316° C. to 309° C., as given by Table 7.

More importantly is the effect of the soybean-modifier on the TGA curve, DTG curve and the TGA parameters. The TGA results point to the fact that the addition of the soybean rejuvenator does not seem to impact the binders' thermal stability. The TGA and DTG curves of the soybean rejuvenated binder does not deviate much from the RAP+PG58-28 binder. It is also important to note that there was no sign of thermal decomposition of the rejuvenator at normal asphalt mixing and compaction temperatures.

TABLE 7

TGA results of the studied asphalt binders

| | IDT (° C.) | Chair yield (%) | Residue (%) |
|---|---|---|---|
| RAP | 316 | 30 | 7 |
| RAP + PG58-28 | 309 | 26 | 6 |
| RAP + 12% Mod PG58-28 | 309 | 26 | 6 |

Figure 34:
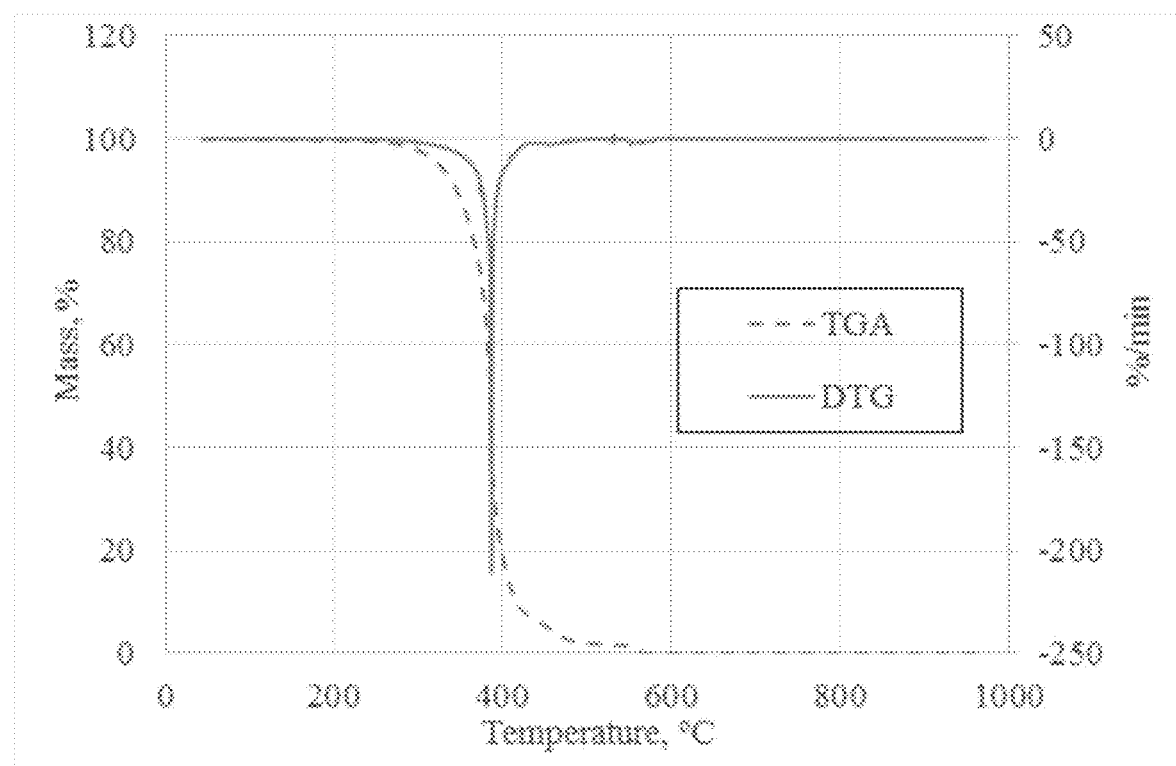
FIG. 34 shows TGA and DTG curves of the soybean-derived rejuvenator.

To assess the thermal stability of the pure soybean-derived rejuvenator. TGA was conducted on a 5-mg sample of pure rejuvenator placed in an alumina crucible under the same conditions described above. The TGA and DTG plots are shown in FIG. 34. The TGA curve shows good thermal stability up to a temperature of around 300° C. Following this temperature, the rejuvenator starts to thermally decompose at an increasing rate. An abrupt mass loss is observed from 370° C.-400° C. where more than 60% of the soybean-derived rejuvenator is lost. The DTG curve shows a peak mass loss at around 390° C. The entire sample was thermally degraded at the end of the temperature program leaving no residue behind.

Figure 35:
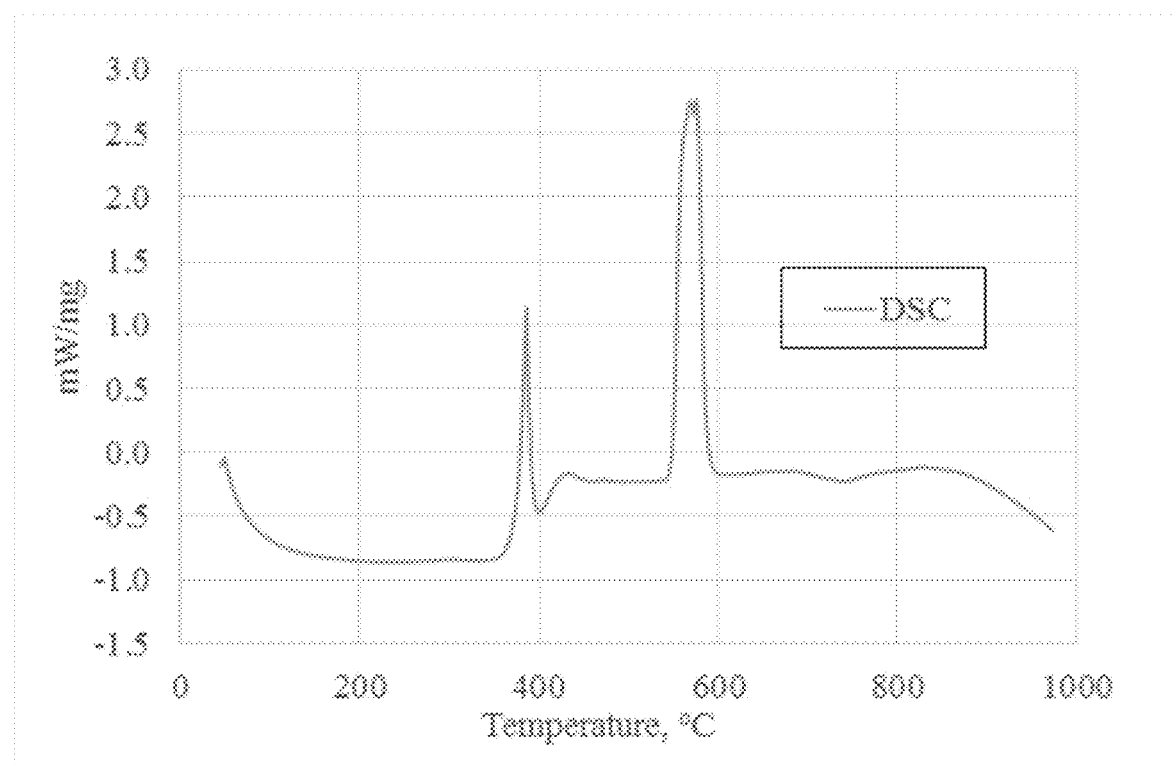
FIG. 35 depicts a differential scanning calorimetry (DSC) curve of the soybean-derived rejuvenator.

FIG. 35 provides a DSC curve for the soybean-derived rejuvenator. Positive and negative peaks on this plot indicate exothermic and endothermic events, respectively. The DSC curve shows two distinct exothermic events. The first event around 390° C. relates to the thermal decomposition of the rejuvenator. The sharpness of this peak is an indication of the homogeneity of the rejuvenator sample. The second peak around 580° C. denotes the combustion of the sample under oxygen.

Example 19—FTIR Analysis

Figure 36:
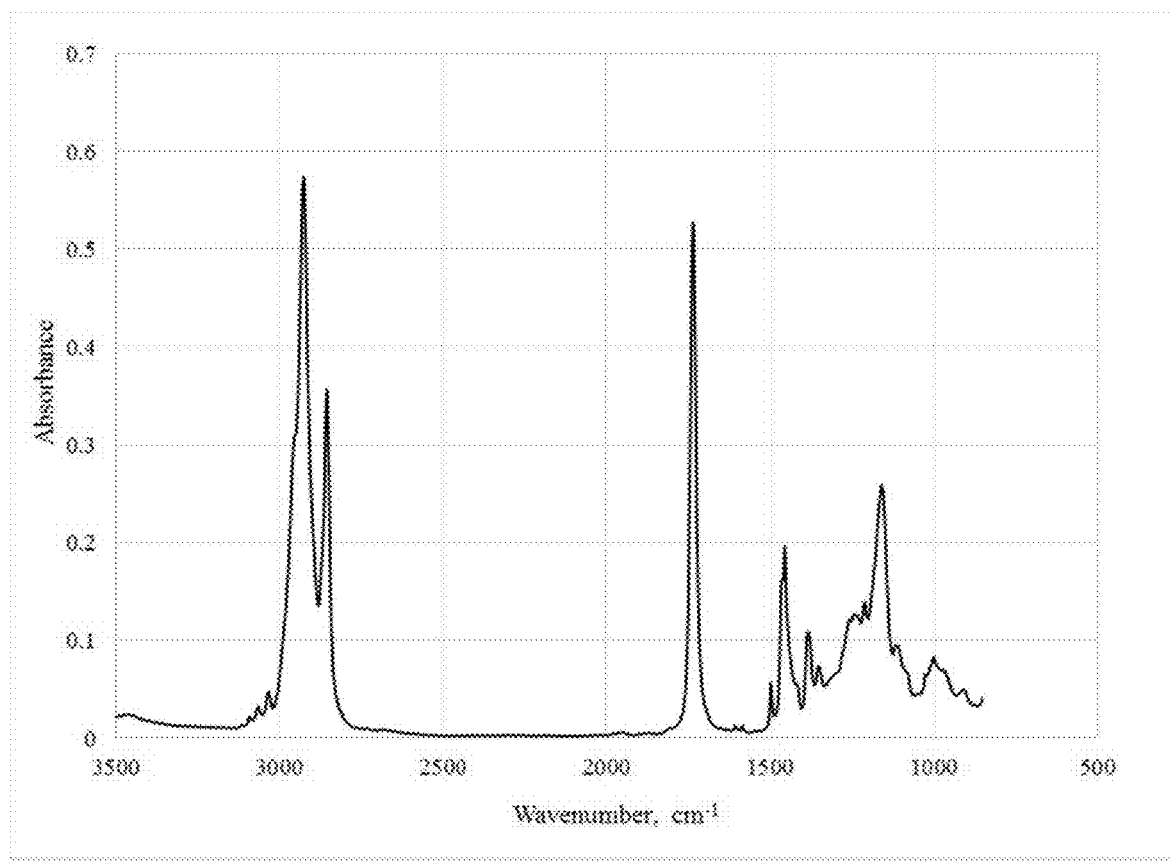
FIG. 36 shows an FTIR Spectrum for the rejuvenator at 390° C.

An FTIR spectrum can be collected for the evolved gases from the TGA analysis. The FTIR spectrum for the gases produced during the TGA analysis of the soybean-derived rejuvenator at a temperature of 390° C. is shown in FIG. 36. This temperature corresponds to the maximum mass loss of the rejuvenator as determined earlier from the TGA results. The FTIR spectrum of the soybean-derived rejuvenator shows a distinct peak at 1736 cm-1 which corresponds to the C=O stretch in the ester moiety present in the rejuvenator's structure. The ester moiety is also characterized by the peaks at 1015 cm-1 and 1153 cm-1 which correspond to the C—O stretch.

Figure 37:
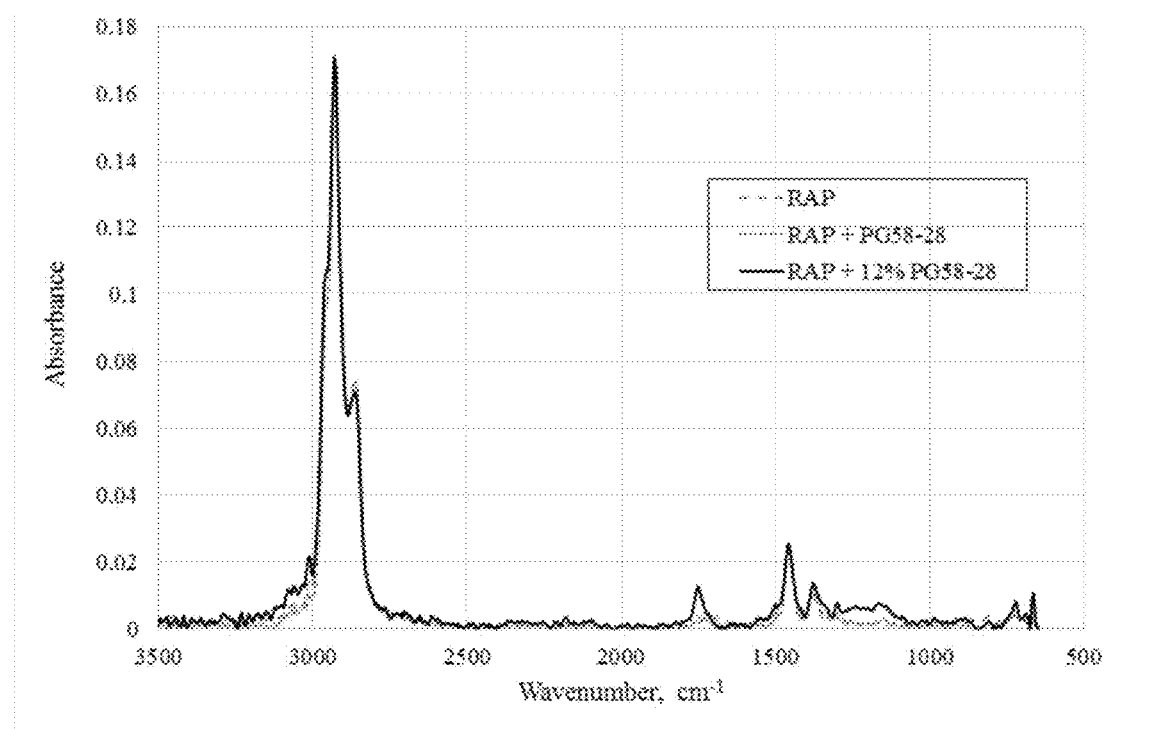
FIG. 37 shows an FTIR Spectrum for the rejuvenator at 500° C.

The FTIR spectra obtained for the evolved gases from the three different binders at 390° C. are shown in FIG. 37. The peak at 2930 cm-1, which corresponds to the C—H stretch in the alkane hydrocarbon structure, was used to normalize the three spectra. The characteristic peaks of the rejuvenator appear in relatively high intensity in the rejuvenated RAP binder. These peaks are absent or are of negligible intensity in the other two binders that did not contain the rejuvenator.

Figure 38:
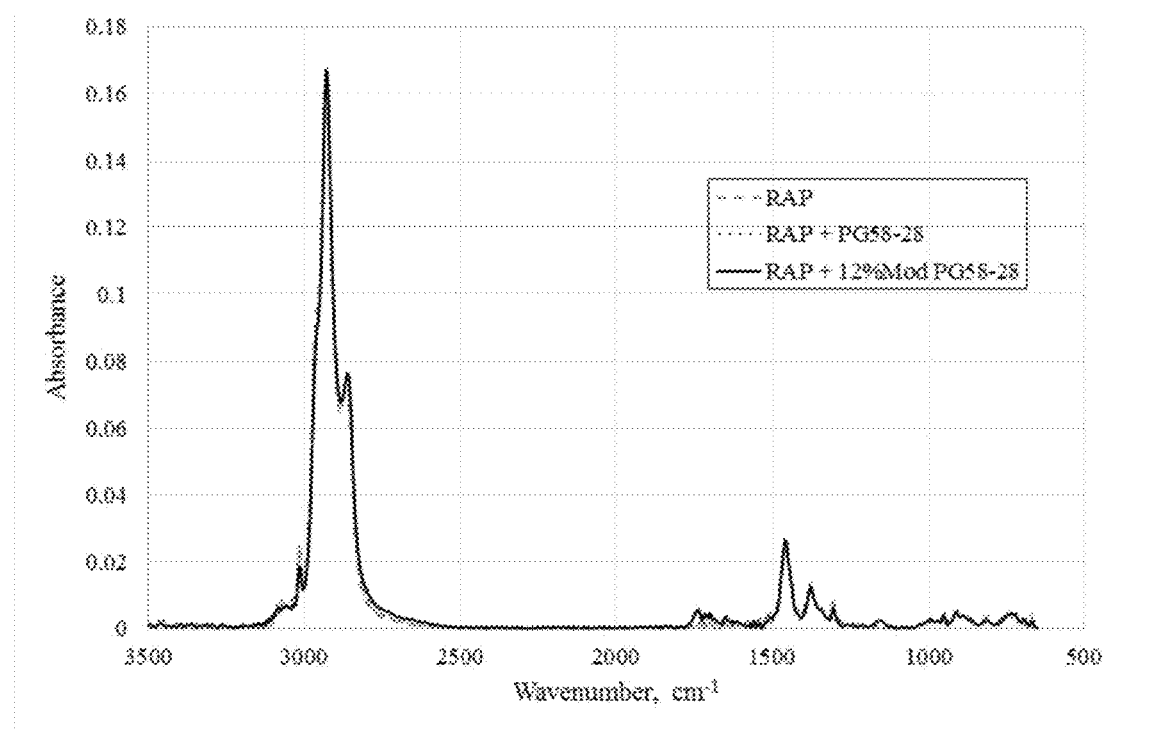
FIG. 38 shows an FTIR Spectrum at 390° C.

The FTIR spectra can also serve as an indication of rate of mass loss of the rejuvenator. This is done by comparing the relative intensities of the rejuvenator's characteristic peaks; ester peaks, in the rejuvenated binder. To illustrate this, the FTIR spectra for the three binders at a temperature of 500° C. are displayed in FIG. 38. At this temperature, the rate of mass loss of the rejuvenator is considerably lower than at 390° C., as per the TGA results. The characteristic peaks of the rejuvenator at 1736 cm-1, 1015 cm-1, and 1153 cm-1 are barely discernable in the spectra in FIG. 38. This is because only a small amount of the rejuvenator is still evolving at this temperature. Hence, the relative intensity of the rejuvenator's peaks in the binder can provide a clue about the rate at which the rejuvenator is thermally decomposing at a given temperature.

Discussion of Examples 12-19

The work done here aimed at investigating the impact of using a soybean-derived rejuvenator on the properties and thermal stability of a RAP binder. Rejuvenated RAP mixtures prepared with 100% RAP aggregate were also assessed based on their DCT fracture energy results. The effect of blending was also highlighted.

The use of the soybean-derived rejuvenator clearly brought down the RAP binder performance grade to acceptable working ranges. The highly stiff RAP with a PG of 106-10 was changed to a PG70-22 with the addition of the 12% soybean-modified PG58-28, for a 2% rejuvenator dosage of the total binder. No significant mass loss was noted due to the addition of the soybean-derived rejuvenator.

The Glover-Rowe parameter showed considerable improvement in the fatigue cracking resistance for the rejuvenated RAP binder. The rate of aging of the rejuvenated RAP binder was lower than that of the control RAP binder, as suggested by the Glover-Rowe diagram.

The DCT results showed improvement in the fracture energy with the use of the soybean-derived rejuvenator. Such improvement was more pronounced when the full blending condition was achieved. The real blending condition showed less increase in fracture energy owing to the partial blending between the virgin binder and the RAP binder.

The TGA results verified the thermal stability of the rejuvenated RAP binder. The soybean-derived rejuvenator did not show any signs of premature thermal decomposition. The TGA curve for the rejuvenated RAP binder showed very similar resemblance to the control RAP and the RAP binder blended with PG58-28. FTIR analysis of the evolved gases revealed that the rejuvenator has characteristic peaks which can serve as an indication of the rate of its thermal decomposition within the asphalt binder.

Example 20—Additional Materials and Methods

A PG58-28 and a soybean-derived rejuvenator was used for this study. The reclaimed asphalt pavement (RAP) used in this study was milled from pavements in the State of Iowa, USA. The RAP was crushed to a nominal maximum aggregate size of 12.5 mm, and dried in an oven at 110° C. The RAP gradation is given in Table 8. The RAP binder content was determined to be 5.1% using an ignition oven. Extraction of the RAP binder was performed as per ASTM D2172-Method A—using toluene as a solvent. Subsequent recovery of the RAP binder was done by the aid of a rotary evaporator as specified in ASTM D5404. A nitrogen blanket was pumped over the binder solution continuously to eliminate any oxidation of the RAP binder resulting from the recovery process. In the determination of the PG of the RAP binder, the extracted RAP binder was considered already RTFO aged and hence was used directly to determine the RTFO critical high temperature. The RAP binder was, however, PAV aged before testing for the critical low temperature using a Bending Beam Rheometer (BBR).

TABLE 8

RAP gradation

| Sieve Size (in.) | Sieve Size (mm) | Percent passing |
|---|---|---|
| 3/4 | 19 | 100 |
| 1/2 | 12.5 | 91 |
| 3/8 | 9.5 | 82 |
| #4 | 4.75 | 57 |
| #8 | 2.36 | 42 |
| #16 | 1.18 | 26 |
| #30 | 0.6 | 14 |
| #50 | 0.3 | 12 |
| #100 | 0.15 | 10 |
| #200 | 0.075 | 8 |

PG58-28 binder was initially blended with the soybean rejuvenator at a dosage of 6% and a 12% by weight. The prepared blends were then mixed with the extracted RAP binder at a ratio of 1:5 by weight, resulting in an effective rejuvenator dosage rate of 1% and 2% by total weight of binder respectively. This ratio was selected to match with the proportions of the binder in the tested asphalt mixtures. A control blend was prepared by mixing the RAP binder with a neat PG58-28 at the same ratio. Hence the binder characterization phase is comprised of four different binders as follows; RAP binder, RAP binder+ PG58-28, RAP binder+ 6% modified PG58-28 and RAP binder+ 12% modified PG58-28.

To evaluate the performance grade of the different binders, DSR and BBR tests were performed as per AASHTO T315 and AASHTO T313, respectively. Rolling thin Film Oven (RTFO) aging was done in accordance with ASTM D2872 at 163° C. for 85 minutes. PAV aging was conducted on the RTFO aged binder as per ASTM D6521 for a duration of 20 hours at 100° C. and 2.1 MPa pressure.

A temperature-frequency sweep was performed for both the RTFO and RTFO+PAV aged binders using a DSR. For the RTFO aged binders, a 25-mm diameter and a 1-mm gap geometry was used, whereas an 8-mm diameter and a 2-mm gap geometry was used for the RTFO+PAV aged binders. A temperature range that extends from 10° C. to 34° C. at 6° C. increments was used for the RTFO+PAV aged binders with frequencies that ranged from 0.6 to 100 rad/s. The same frequency range was used for the RTFO aged binders but with temperatures that ranged from 46° C. to HTPG+6° C. for the soybean-modified binders and 70° C. to HTPG+6° C. for the other binders. HTPG stands for the high temperature PG of the specific binder. The Christensen-Anderson-Marasteanu (CAM) model was used to construct master curves at a reference temperature of 70° C. for the RTFO aged binders and 22° C. for the RTFO+PAV aged binders.

Linear amplitude sweep (LAS) testing was done on RTFO+PAV aged binder using a DSR with an 8-mm-diameter and a 2-mm gap geometry as per AASHTO TP 101.

Dynamic modulus specimens were made using a mixing and compaction temperature of 140° C. A superpave gyratory compactor was used to compact the specimens which were designed to have a total binder content of 6% and a target air void of 4%. Three specimens were prepared for each test group. Dynamic modulus testing was conducted according to AASHTO T342, at 4° C., 21° C., 155, and 37° C. The specimens measured 100 mm in diameter and 150 mm in height. To ensure that the deformation remains within the linear viscoelastic range, the axial strain was kept between 50 and 150 micro-strain. Deformations were recorded using the average reading of three LVDTs placed around the circumference of the specimen. The LVDTs were attached to the specimen using mounted brackets and buttons glued to the specimen face. The sigmoidal model was used to construct master curves at a reference temperature of 21° C.

The disc-shaped compaction tension (DCT) test was conducted according to ASTM D7313 to evaluate the low temperature cracking resistance of the mixtures. Testing was performed on lab-compacted samples with a binder content of 6% and a target air void content of 4%.

Example 21—Performance Grading (PG) and ΔTc

The binders were tested in accordance with AASHTO T315 to determine their critical high temperatures. The specification criteria used to determine the critical high temperature were $G^*/\sin \delta > 1$ kPa and $G^*/\sin \delta > 2.2$ kPa for both the unaged and RTFO aged binders, respectively. The extracted RAP binder was not RTFO-aged as it was considered short-term aged. Hence, it was tested as is to determine its RTFO critical high temperature. Accordingly, there was no unaged data for the extracted RAP binder. The PG results are shown in Table 9. The RAP binder was shown to be considerably aged with a very high critical temperature of 108.6° C. The critical high temperature of the RAP binder was reduced by almost 30 degrees, when blended with the 6% modified PG58-28. This large reduction in the critical high temperature caused the binder to drop down by 5 PGs, which is quite a significant drop. In comparison, the mere addition of the neat PG58-28 to the RAP binder led to a drop of only one PG. It is also important to note that there was no significant mass loss associated with the soybean additive, which attest to its thermal stability.

The critical intermediate temperature was also determined using PAV aged binders, as shown in Table 9. The critical intermediate temperature was based on the criterion $G^* \times \sin \delta < 5000$ kPa. A slight drop in the RAP binder's critical intermediate temperature was noted with the use of the neat PG58-28. The soybean-modified PG58-28 had a much more notable effect on the critical intermediate temperature.

The critical low temperature of the PAV aged binders was determined according to AASHTO T313, and the results are displayed in Table 9. The soybean-modified RAP binder showed a significant decrease in the critical low temperature compared to the pure RAP binder. This decrease in the critical low temperature resulted in a one PG and a two PG drop with the addition of a 6% and 12% modified PG58-28 respectively. Compared to the effect of the neat PG58-28 which had almost no impact on the critical low temperature, it can be fairly concluded that the soybean modification was largely successful in enhancing the low temperature properties of the RAP binder.

TABLE 9

Binder Properties

| Binder | RAP | RAP + PG58-28 | RAP + 6% Modified PG58-28 | RAP + 12% Modified PG58-28 |
|---|---|---|---|---|
| Unaged (High Temp.), ° C. | NA | 105.6 | 78.4 | 76.2 |
| RTFO (High Temp.), ° C. | 108.6 | 99.9 | 76.5 | 73.9 |
| PAV (Intermediate Temp.), ° C. | 29.9 | 28.3 | 24.6 | 23.2 |
| PAV (Low Temp.), ° C. | −10.8 | −11.9 | −20.2 | −22.3 |
| Performance Grade (PG) | 106-10 | 100-10 | 76-16 | 70-22 |
| ΔTc, ° C. | −9.7 | −9.2 | −6.6 | −5.5 |
| Mass loss (%) | NA | 0.4 | 0.4 | 0.5 |

The BBR test provides a plot of the stiffness of the tested beam with time. The value of the stiffness and the slope of the stiffness curve at a time of 60 seconds are referred to as S and m respectively. The parameter ΔTc was recently introduced as a measure to assess the non-load thermal cracking potential of binders (Anderson et al., "Evaluation of the Relationship Between Asphalt Binder Properties and Non-Load Related Cracking," *Journal of the Association of Asphalt Paving Technologists* 80 (2011), which is hereby incorporated by reference in its entirety). ΔTc is readily calculated from the BBR results, as the difference between the continuous grade temperatures at S=300 MPa and m=0.3 as per ASTM D7643. Earlier work has shown that the parameter ΔTc is related to aging where a decrease in that parameter is noted as the binder loses its ability to undergo stress relaxation (Anderson et al., "Evaluation of the Relationship Between Asphalt Binder Properties and Non-Load Related Cracking," *Journal of the Association of Asphalt Paving Technologists* 80 (2011) and Glover et al., "Development of a New Method for Assessing Asphalt Binder Durability With Field Validation," (2005), which are hereby incorporated by reference in their entirety). Aged binders were shown to exhibit a strong m-controlled behavior, where the low temperature properties become largely limited by the m-value. The critical low temperature of an m-controlled binder is dictated by its m-value. Hence the temperature at which m=0.3 is significantly higher than that at which S=300, leading to large negative values for ΔTc. From Table 9, the RAP binder showed a very low value of ΔTc indicating that stress relaxation is greatly hindered by the excessive oxidation that accompanied aging. Mixing the RAP binder with unmodified PG58-28 binder does not significantly improve its stress relaxation ability. However, an increase in the parameter ΔTc occurs with the addition of the soybean-modified PG58-28. Nevertheless, all tested binders showed m-controlled behavior.

Example 22—Complex Shear Modulus Master Curves

Temperature-frequency sweeps results can be used to fully characterize asphalt binders over a wide range of frequencies and temperatures using the concept of time-temperature superposition. Time-temperature superposition principle defines shift factors which are used to transform properties at a given frequency and test temperature to an equivalent reduced frequency at a reference temperature. Shift factors are calculated using the Williams-Landel-Ferry (WLF) equation as given by:

$$\log \alpha_T = -\frac{C_1(T - T_o)}{C_2 + (T - T_o)} \quad [8]$$

Where $\alpha_T$=shift factor; $T_o$=reference temperature, T=test temperature, and the parameters $C_1$ and $C_2$ are dependent on the reference temperature. Once shift factors are determined, the reduced frequency, ωr, can be obtained from Equation [1] above.

The Christensen-Anderson-Marasteanu (CAM) model is considered very effective in describing the rheological behavior of asphalt within the linear viscoelastic region (Kim, "Modeling of asphalt concrete," ASCE Press, Reston, Va., 2008, which is hereby incorporated by reference in its entirety). The CAM model is expressed as follows (Marasteanu, D., "Time-Temperature Dependency of Asphalt Binders—An Improved Model (With Discussion)," *Journal of the Association of Asphalt Paving Technologists* 65 (1996), which is hereby incorporated by reference in its entirety):

$$|G^*| = G_g \left[1 + \left(\frac{\omega_c}{\omega}\right)^v\right]^{-w/v} \quad [9]$$

Where $G^*$=complex shear modulus, $G_g$=glassy modulus, $\omega_c$=crossover frequency, and both w and v are model parameters. w defines the rate at which the complex modulus curve reaches an upper and lower asymptote. v is equal to log(2)/R, where R is the rheological index. The rheological index is the difference between the glassy modulus and the modulus at the crossover frequency.

Figure 39:
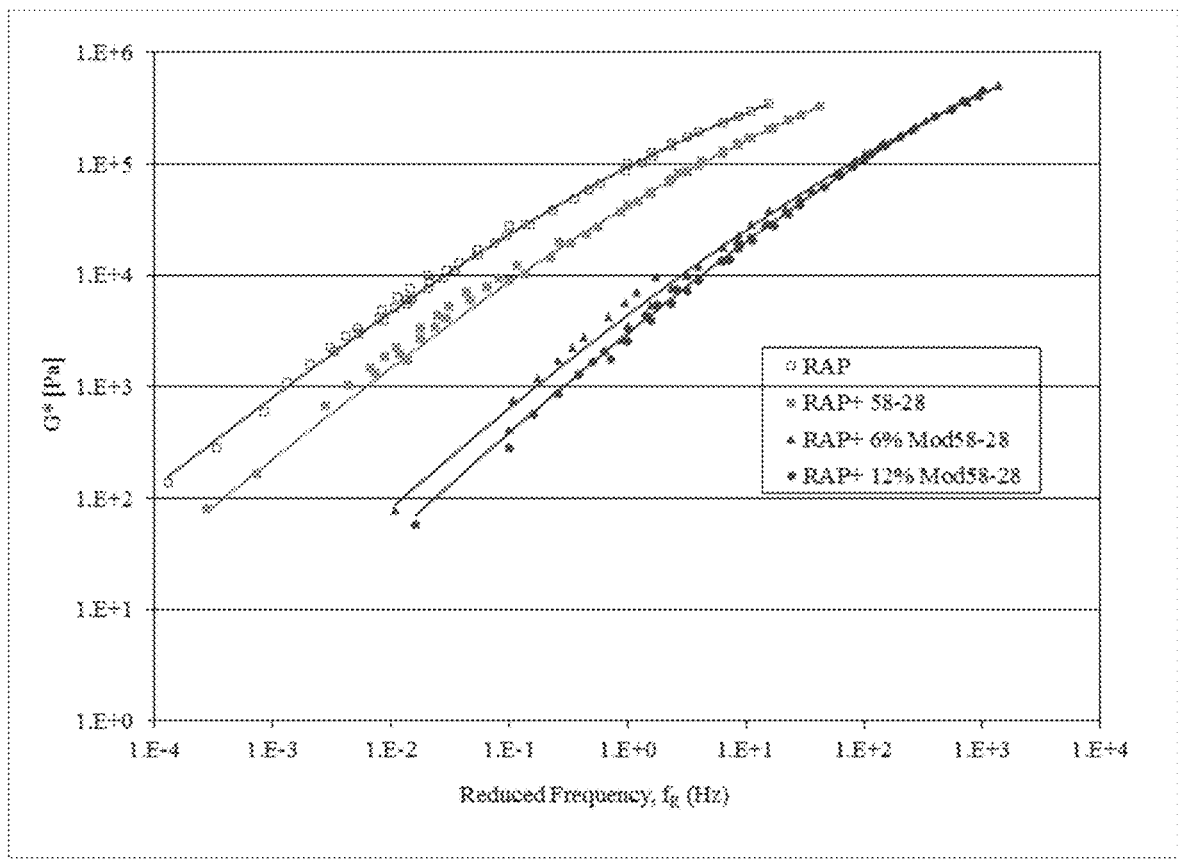
FIG. 39 shows complex shear modulus master curves for RTFO aged binders at 70° C.
Figure 40:
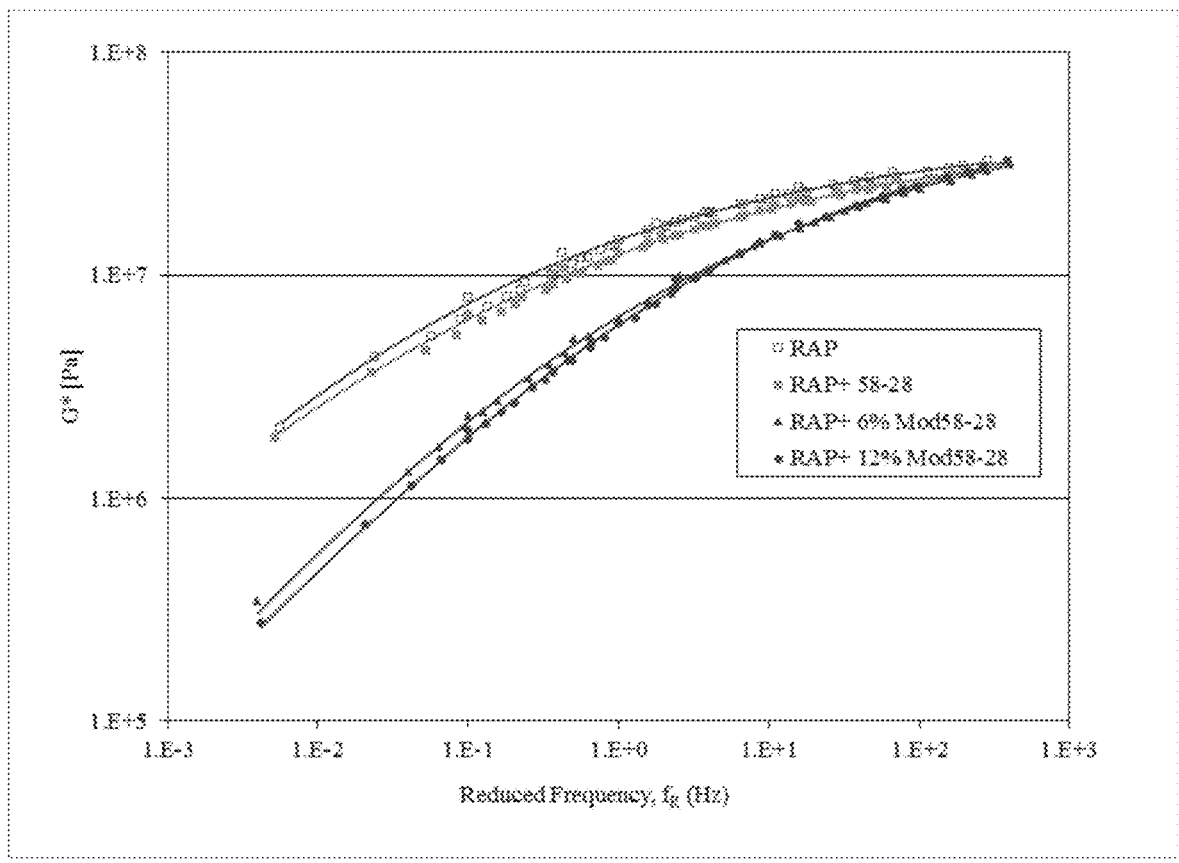
FIG. 40 depicts complex shear modulus master curves for RTFO+PAV aged binders at 22° C.

FIGS. 39 and 40 shows the complex shear modulus master curves for both the RTFO aged and the RTFO+PAV aged for all binders at a reference temperature of 70° C. and 22° C., respectively. It is evident that the soybean modification had a much more significant effect on reducing the RAP binder's complex shear modulus compared to the mere blending of the neat PG58-28 binder. This notable impact on the complex shear modulus, brought about by the soybean modification, was still evident after PAV aging. In comparison, the effect of the unmodified virgin binder PG58-28 was significantly diminished upon PAV aging. This result could potentially mean that the soybean modification resulted in a better aging resistance. With soybean modification, the reduction in the complex shear modulus of the RTFO+PAV aged RAP binder remained significant at low and intermediate frequencies. At very high frequencies denoting very low temperatures, the complex shear modulus of the soybean modified RAP binder was no longer significant from that of the RAP binder. This is typical of asphalt materials as the master curves tend to converge to an asymptote at very high frequencies.

The shape of the master curves, as described in part by the rheological index, R, can be used as an indication of aging. Upon aging, master curves show a more gradual transition from viscous to elastic behavior which results in a flatter shape. A study of both FIGS. 39 and 40, clearly shows that the master curves of all binders get flatter with PAV aging. FIG. 40 however show that the two soybean-modified RAP binders did not show as much flatness compared to the other two binders, namely pure RAP and RAP blended with PG58-28. This observation also supports the notion that the soybean modification improves the aging resistance of the binders.

Figure 41:
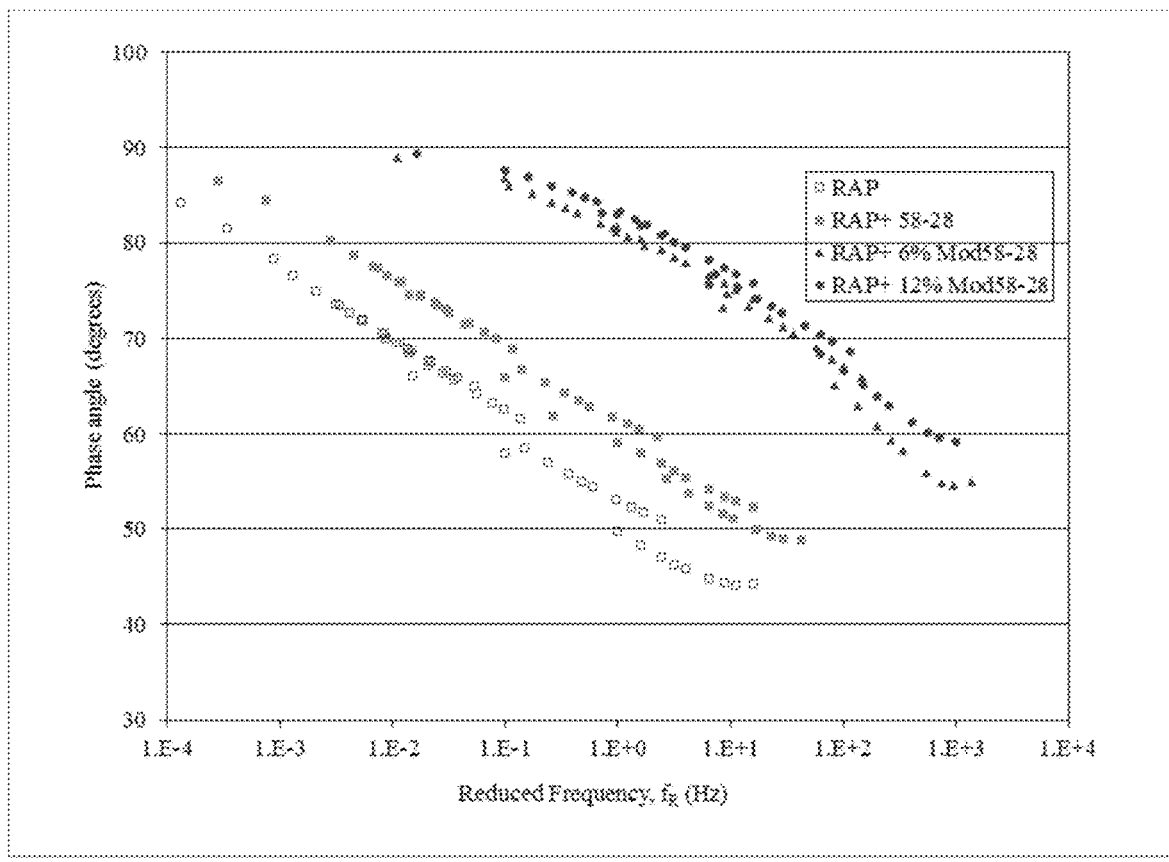
FIG. 41 illustrates phase angle master curves for RTFO-aged binders at 70° C.
Figure 42:
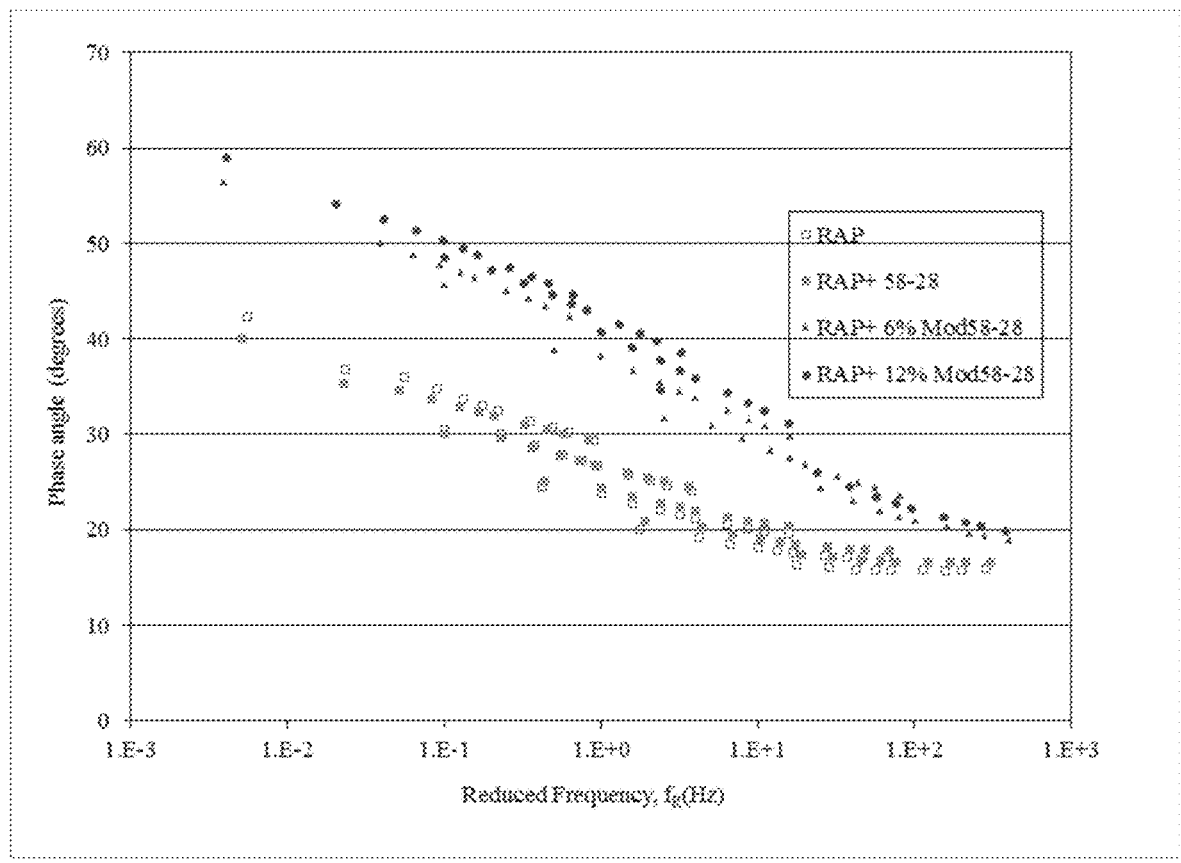
FIG. 42 shows phase angle master curves for RTFO+PAV aged binders at 22° C.

The shift factors, obtained from the fitting of the complex shear modulus master curves, were used to develop phase angle master curves as shown in FIGS. 41 and 42 for both RTFO and RTFO+PAV aged binders, respectively. The soybean modification resulted in an increase in the phase angle at all frequencies. This trend was seen for both RTFO and RTFO+PAV aged binders. An increase in the phase angle marks a more viscous behavior. A shift towards viscous behavior enhances stress relaxation and ultimately improves fatigue resistance.

The crossover frequency, defined as the frequency at a phase angle of 45°, marks the transition between viscous and elastic behavior. The behavior is predominantly viscous for frequencies below the crossover frequency whereas a change into a dominant elastic behavior is seen for frequencies above the crossover frequency. A study of both FIGS. 41 and 42 show that the crossover frequency undergoes many orders of magnitude increase due to soybean modification. The RAP binder initially shows a very low crossover frequency, which decreases even further with PAV aging. Such a low crossover frequency renders the behavior of RAP binder predominantly elastic. Addition of the unmodified PG58-28 slightly increases the crossover frequency of the blend. The use of the soybean modified PG58-28, however, brings about a considerable increase in the crossover frequency.

Example 23—Linear Amplitude Sweep Test

The LAS test is based on the principle of Viscoelastic Continuum Damage (VECD). VECD defines damage in terms of a damage parameter. This damage parameter quantifies the amount of damage relative to the undamaged properties. The undamaged properties are determined by applying a frequency sweep at a low strain rate of 0.1% prior to the application of the strain amplitude ramping procedure. A constant frequency of 10 Hz is applied with an increasing strain rate from 0.1% to 30%. Testing is done on RTFO+PAV aged binder using an 8-mm diameter and a 2-mm gap geometry. The LAS test is efficient in that the total duration of the test, including the initial frequency sweep, do not exceed 20 minutes. VECD analysis is used to transform the results into an estimate of the fatigue life at different constant strain amplitudes.

VECD is based on Schapery's work potential theory which establishes a relationship between damage and work performed as given by (Schapery, "Correspondence Principles and a Generalized Integral for Large Deformation and Fracture Analysis of Viscoelastic Media," *International Journal of Fracture* 25(3):195-223 (1984), which is hereby incorporated by reference by its entirety):

$$\frac{dD}{dt} = \left(\frac{dW}{dD}\right)^\alpha \quad [10]$$

where t is time, W is work performed, D is damage intensity, and α is a material constant related to the rate at which damage occurs.

To determine α, the following equation is used $$\alpha = 1 + \frac{1}{m} \quad [11]$$

where m is the slope of the log-log plot of storage modulus versus frequency. This plot is obtained using the initial frequency sweep.

The dissipated work (W) under strain-controlled conditions is expressed as:

$$W = \pi \gamma_o |G^*| \sin \delta \quad [12]$$

where γo is shear strain, G* is complex modulus, and δ is phase angle.

An expression is developed, using the above relationships, to calculate the damage intensity (D) as a function of time. The test results data is then used to determine the accumulation of damage intensity throughout the loading history.

A power law was suggested to fit a relationship between |G*|sin δ and the damage intensity, D, in the form of (Hintz et al., "Modification and Validation of Linear Amplitude Sweep Test for Binder Fatigue Specification," *Transportation Research Record: Journal of the Transportation Research Board* 2207:99-106 (2011), which is hereby incorporated by reference in its entirety):

$$|G^*|\sin \delta = C_o - C_1(D)^{C_2} \quad [13]$$

where $C_o$ is the value of |G*|sin δ during the 0.1% strain amplitude step, $C_1$ and $C_2$ are model coefficients.

Substituting Equation 13 into Equation 10 and integrating, an expression defining the number of cycles to failure (Nf) can be derived in the form of (Johnson, Estimating asphalt binder fatigue resistance using an accelerated test method, UNIVERSITY OF WISCONSIN-MADISON (2010), which is hereby incorporated by reference in its entirety):

$$N_f = A(\gamma_{max})^{-B} \quad [14]$$

where the coefficients A and B are defined as:

$$A = \frac{f(D_f)^k}{k(\pi f_D C_1 C_2)^\alpha} \quad [15]$$

$$B = 2\alpha$$

where k=1+(1−$C_2$)α, ID is the initial value of |G*| at 1% strain, f is the loading frequency of 10 Hz, and Df is the damage intensity at failure, defined as 35% reduction in Co.

Using Equation 14, an estimate of the number of cycles to failure can be obtained for a given strain rate, γmax.

In this work, the LAS test is conducted at three different temperatures, 25° C., 28° C., and 31° C. These temperatures covered the range of fatigue/intermediate critical temperatures for all binders, as given in Table 9.

Figure 43:
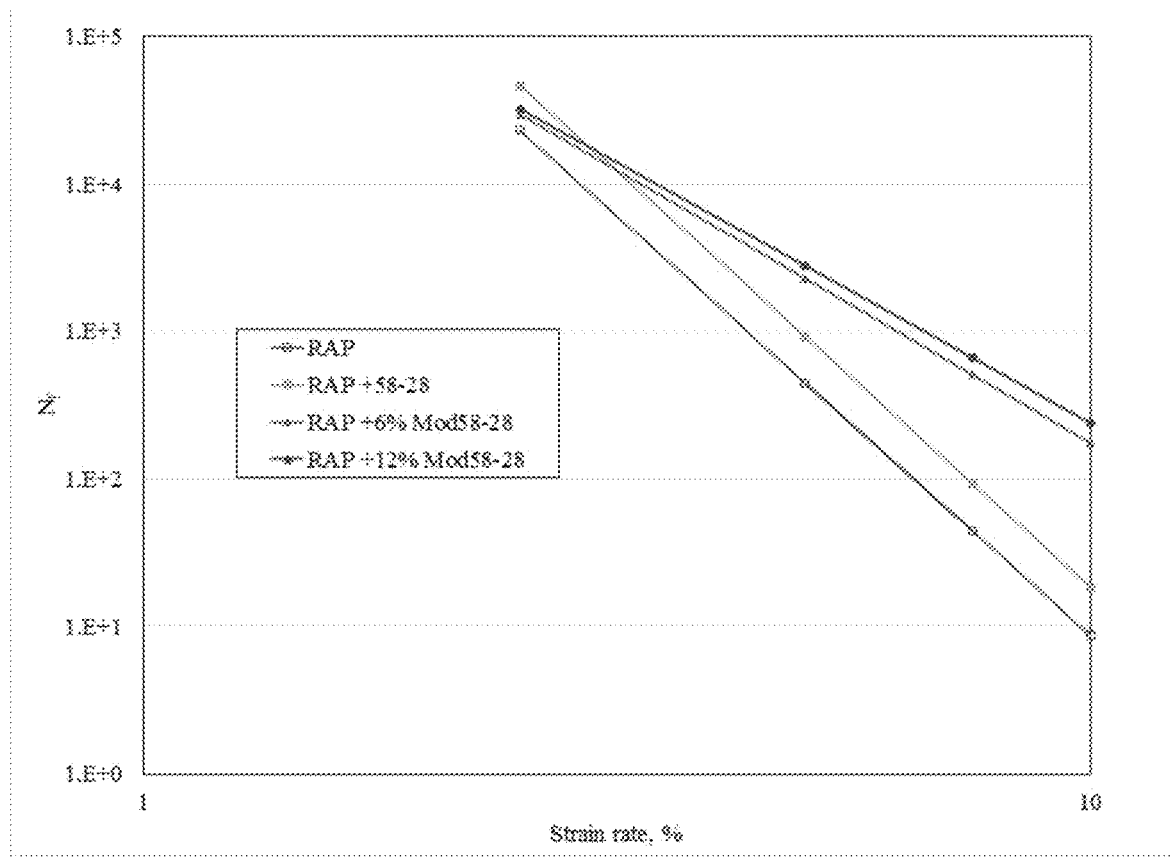
FIG. 43 shows cycles to failure at a test temperature of 31° C.
Figure 44:
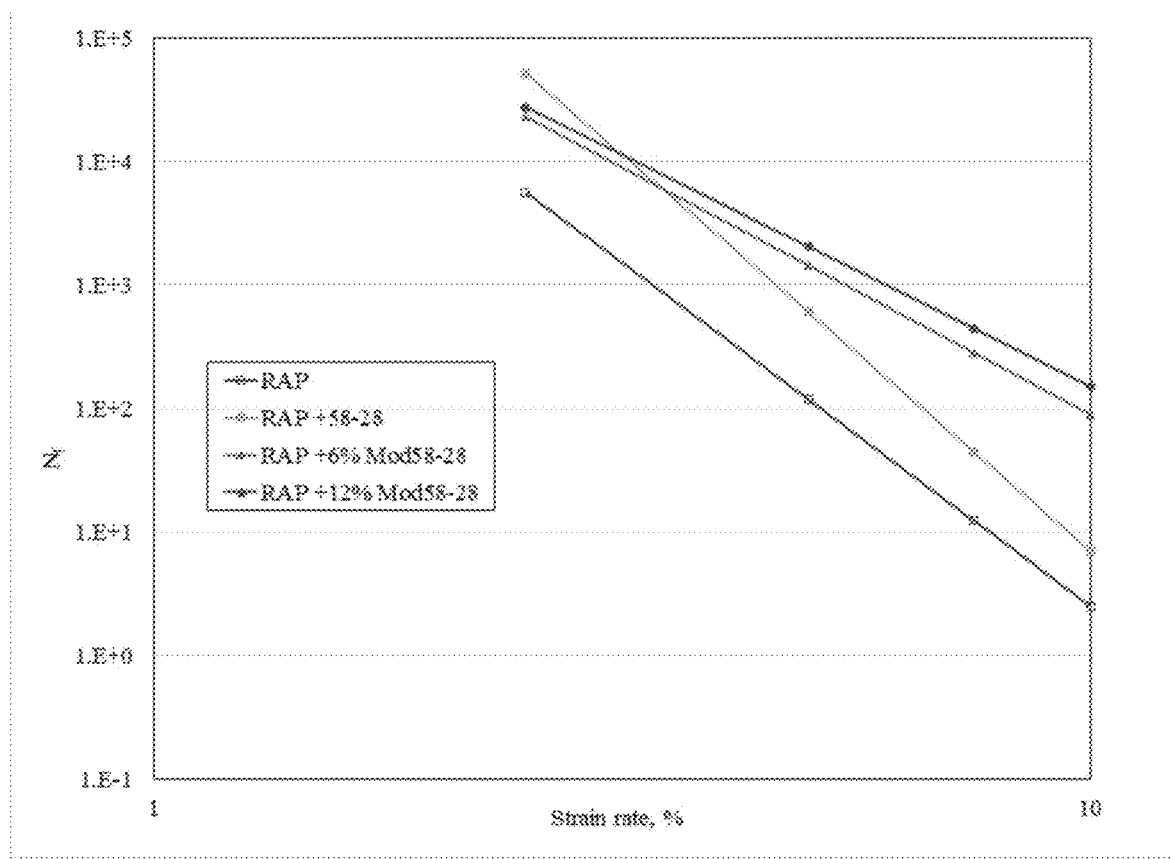
FIG. 44 shows cycles to failure at test temperature of 28° C.
Figure 45:
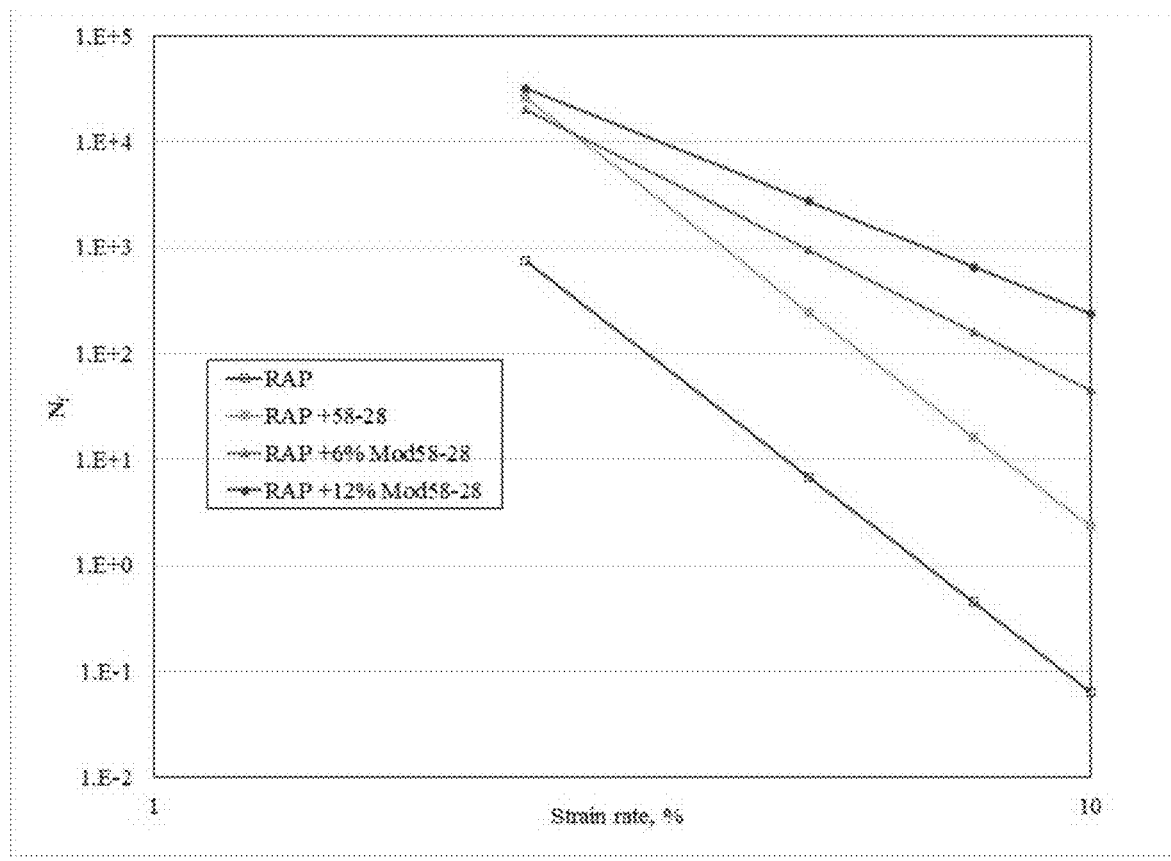
FIG. 45 shows cycles to failure at test temperature of 25° C.

A log-log plot of the number of cycles to failure versus strain rate gives a straight line with an A intercept and a slope equals to −B. Such plots are shown at the various test temperatures in FIGS. 43-45. An increase in the coefficient B, which depends solely on the parameter α, indicates a higher rate of deterioration at higher strain rates. As expected, the RAP binder with a steeper slope, thus larger B, showed considerable deterioration and loss of fatigue life with increasing strain rate. The RAP binder rejuvenated with the soybean-modified PG58-28 at both 6% and 12% dosage showed considerable improvement with increasing shear strain rates. These rejuvenated binders did not exhibit a drastic loss in fatigue resistance with increasing shear strain rates as observed in both the RAP binder and the RAP binder blended with the unmodified PG58-28. This trend was true at all test temperatures.

The effect of rejuvenation was more prominent at strain rates of 5% and above. At a strain rate of 2.5%, the difference between the RAP binder blended with PG58-28 and the rejuvenated RAP binders was not significant. In fact, the RAP binder blended with PG58-28 showed slightly better performance at low strain rates. A strain rate of 5% was found to correlate best with fatigue in mixtures as measured by the energy ratio test (Tran et al., "Effect of Rejuvenator on Performance Properties of HMA Mixtures With High RAP and RAS Contents," Auburn, Ala.: National Center for Asphalt Technology (2012), which is hereby incorporated by reference in its entirety). The energy ratio test involves three different tests namely resilient modulus, creep compliance, and indirect tensile strength. It was found that the dissipated creep strain energy at failure obtained from the energy ratio test correlated best with the cycles to failure from the linear amplitude sweep test at 5% strain rate (Tran et al., "Effect of Rejuvenator on Performance Properties of HMA Mixtures With High RAP and RAS Contents," Auburn, Ala.: National Center for Asphalt Technology (2012), which is hereby incorporated by reference in its entirety). Cracked sections in pavements studied under the long-term pavement performance (LPPT) program showed close correlation to 4% strain (Hintz et al., "Modification and Validation of Linear Amplitude Sweep Test for Binder Fatigue Specification," *Transportation Research Record: Journal of the Transportation Research Board* 2207:99-106 (2011), which is hereby incorporated by reference in its entirety). Hence a comparison based on 5% strain is more in line with field performance. A 5% binder strain corresponds to a value of 1000 microstrain in the pavement layer (Hintz et al., "Modification and Validation of Linear Amplitude Sweep Test for Binder Fatigue Specification," *Transportation Research Record: Journal of the Transportation Research Board* 2207:99-106 (2011), which is hereby incorporated by reference in its entirety).

Figure 46:
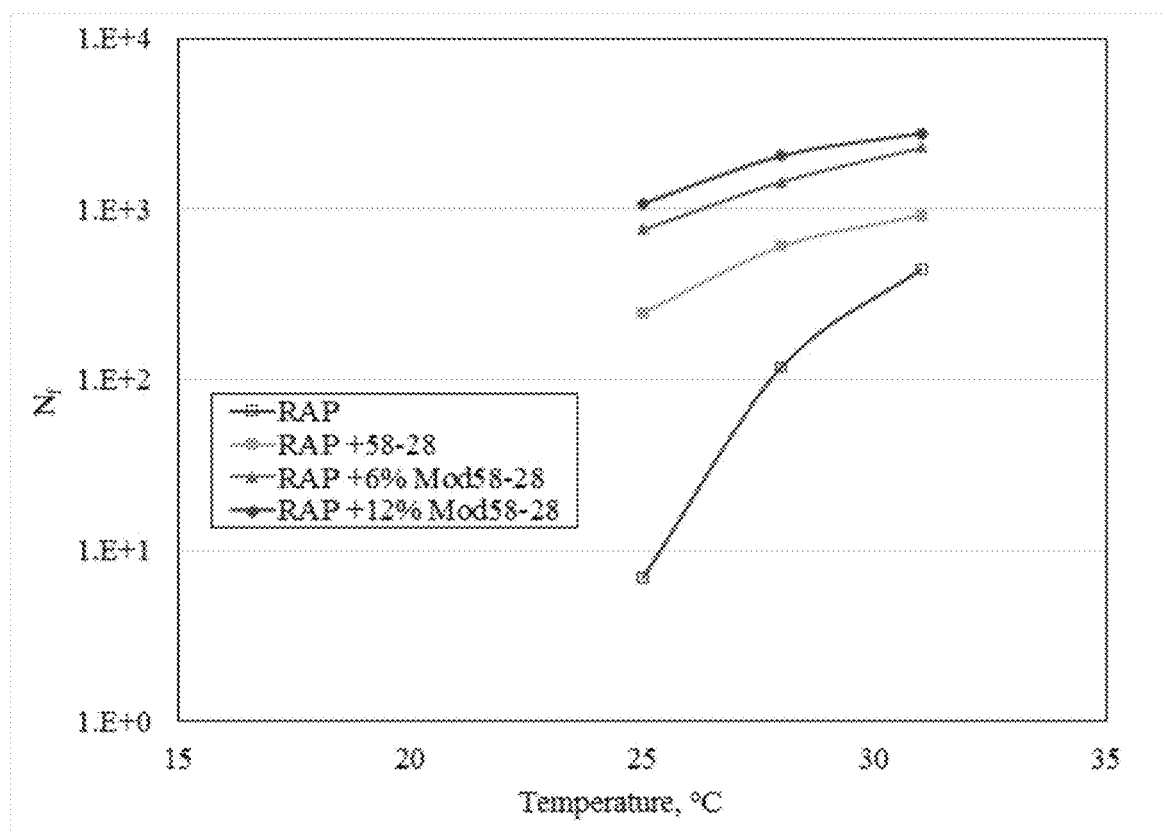
FIG. 46 depicts cycles to failure at a strain rate of 5%.

FIG. 46 shows a plot of the cycles to failure measured at 5% strain rate for all binders at three different test temperatures. The impact of rejuvenation on fatigue life was more pronounced at lower temperatures. It is evident that the improvement attained with the addition of the rejuvenator is more prominent with decreasing temperatures. As the temperature decreased from 31 to 25, the RAP binder showed considerable reduction in fatigue performance compared to the rejuvenated RAP binders. These results provide evidence of the improved fatigue resistance of the rejuvenated binders.

Example 24—Dynamic Modulus

Dynamic modulus (E*) testing measures the stiffness of asphalt mixtures over a wide range of frequencies and temperatures, which relates to different environmental conditions and traffic loading. The E* test was developed during NCHRP project 9-19 (Witczak et al., "NCHRP Report 465: Simple Performance Test for Superpave Mix Design," (2002), which is hereby incorporated by reference in its entirety) and is now considered a key input parameter in AASHTOWare Pavement ME Design (AASHTO, AASHTOWare Pavement ME Design (2016), which is hereby incorporated by reference in its entirety). The test proposed by Witczak (Witczak, "NCHRP Report 547: Simple Performance Tests: Summary of Recommended Methods and Database" (2005), which is hereby incorporated by reference in its entirety) applies a compressive haversine load at a frequency ranging from 25 to 0.01 Hz at different temperatures.

In this work, the tested specimens were prepared using RAP mixtures with the addition of virgin PG58-28 and soybean-modified PG58-28 at 6% and 12% dosage. Mixing and compaction were done at 140° C. Three specimens were prepared at each test mixture, making a total of nine specimens.

The sigmoidal model was used to fit the dynamic modulus test data to construct master curves for the asphalt mixtures. The sigmoidal model is expressed as, $$\log|E^*| = \delta + \frac{\alpha}{(1 + e^{\beta + \gamma(\log(t_r))})} \quad [16]$$

where $t_r$ is the reduced time of loading at the selected reference temperature, $\delta$ is the minimum value of E*, $\delta+\alpha$ is the maximum value of E*, and the parameters $\beta$ and $\gamma$ define the shape of the sigmoidal function.

Figure 47:
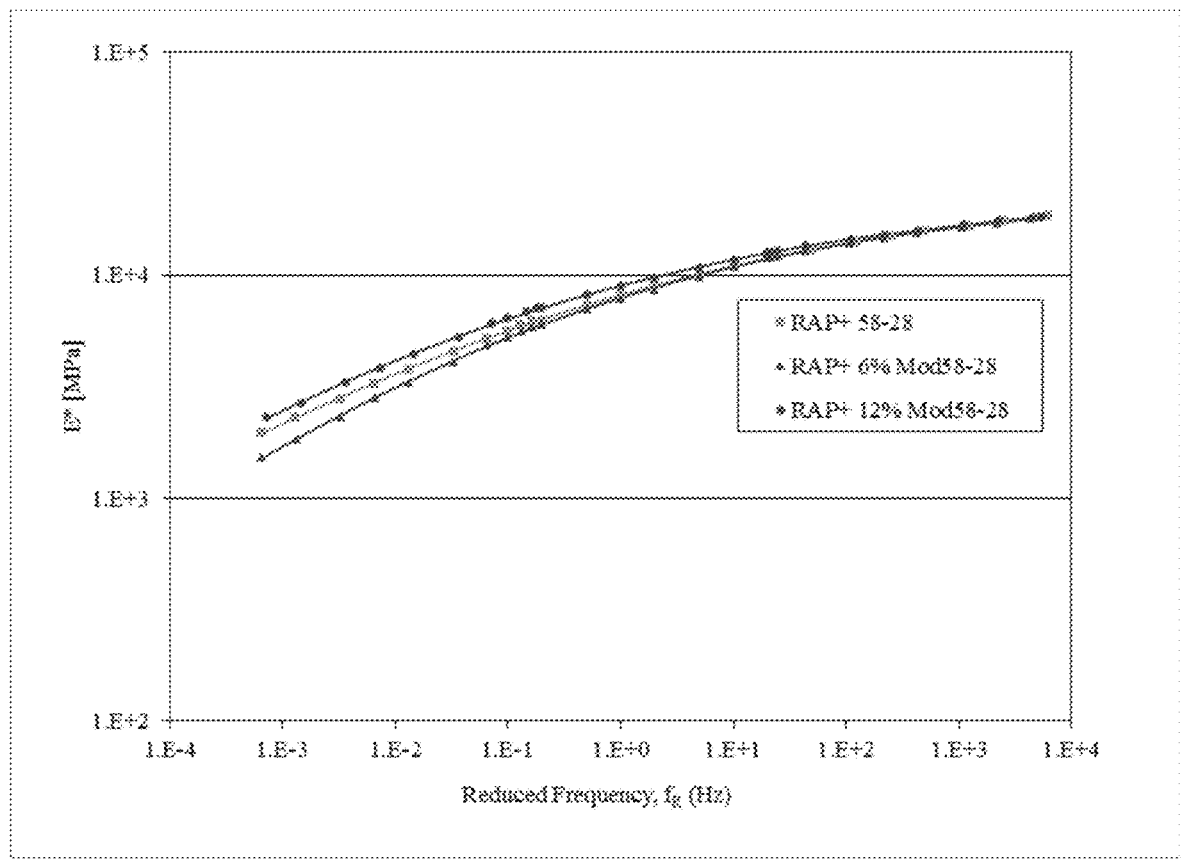
FIG. 47 depicts dynamic modulus master curves for asphalt mixtures.
Figure 48:
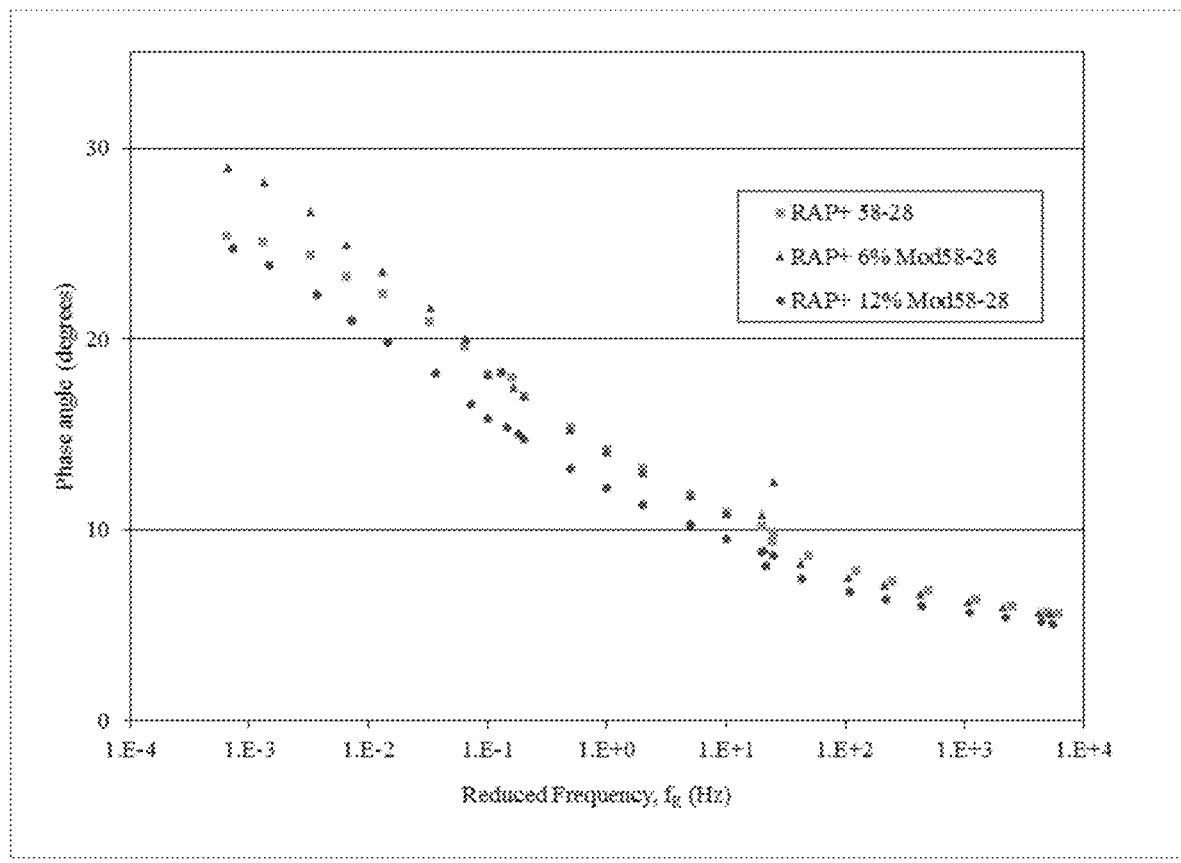
FIG. 48 shows phase angle master curves for asphalt mixtures.

The dynamic modulus master curves for all mixtures, at a reference temperature of 21° C., are shown in FIG. 47. The shift factors obtained from fitting the sigmoidal model were used to construct phase angle master curves as shown in FIG. 48. The differences between the dynamic modulus master curves did not follow a clear trend that matched with the binders' performance grade results. Hence it was not possible to assess the impact of the soybean rejuvenator on the dynamic modulus of the tested mixture. The dynamic modulus measures the stiffness of the asphalt mixture and is affected by the air content, aggregate gradation, asphalt content, in addition to the binder's viscosity. Accordingly, differences in the binder's viscosity may not be as obvious. All mixtures had an air void content of 4% so the dynamic modulus values should be expected to increase with low air voids (Yu et al., "An Investigation of Dynamic Modulus and Flow Number Properties of Asphalt Mixtures in Washington State, Report No. TNW 2 (2012), which is hereby incorporated by reference in its entirety). On the other hand, the RAP had a fine gradation which tend to decrease the dynamic modulus (Daniel et al., "Mechanistic and Volumetric Properties of Asphalt Mixtures With Recycled Asphalt Pavement," Transportation Research Record: Journal of the Transportation Research Board 543 (1929) 28-36 (2005), which is hereby incorporated by reference in its entirety). Another important factor is the degree of blending between the RAP binder and the virgin binder during actual mixing which determines the actual reduction in the total binder's stiffness. The dynamic modulus results include the effect of all the above factors and hence it was difficult to isolate the binder's effect. Moreover, a study on RAP mixtures conducted at the University of Minnesota revealed that the conditions of the dynamic modulus testing may affect the results of mixtures containing high RAP content (Li et al., "Effect of Reclaimed Asphalt Pavement (proportion and type) and Binder Grade on Asphalt Mixtures," *Transportation Research Record: Journal of the Transportation Research* Board 2051:90-97 (2008), which is hereby incorporated by reference in its entirety). The study suggested that microcracks could develop in the specimen when tested at low temperatures, due to the stiffness of the RAP binder.

These microcracks affect the specimen's performance at high temperature testing, leading to lower observed stiffness.

A more representative test to assess the impact of the soybean modification is the disk-shaped compact test (DCT). Unlike the dynamic modulus test, the DCT test measures fatigue cracking at higher loading capacity and a lower test temperature. Fatigue cracking is critical to mixtures prepared with RAP. The next section presents the results of the DCT test performed on both the control and modified mixtures.

Example 25—Disk-Shaped Compact Tension (DCT)

RAP mixtures with the addition of either a virgin PG58-28 or a 12% soybean-modified PG58-28 were prepared. For each of the two test mixtures, a total of five replicate specimens measuring 50 mm in thickness and 150 mm in diameter were prepared as per ASTM D7313. A notch 1.5-mm wide is cut along the diameter of the specimen. A flat surface is cut perpendicular to the notch as per the specimen dimensions specified in ASTM D7313. The specimens were conditioned at the desired test temperature of −6° C. in a refrigerator for 3 hours prior to testing. The instrument loading rods were inserted into dual openings cored into the specimen. The loading rods are used to pull the specimen apart at a rate of 1 mm/min. The crack mouth opening displacement (CMOD) is monitored using a clip gauge extensometer. Upon testing, a seating load of 0.1 kN was first applied to ensure the specimen is tightly held in place. The fracture energy constitutes the amount of work needed to crack a unit area. The work done is calculated by measuring the area under the load-displacement curve. The fractured area is taken as the product of the specimen thickness and the ligament length.

The DCT test results are shown in Table 10 below. The average fracture energy of the mixtures made with the soybean rejuvenated RAP binder was on average higher than that of the control mixtures. A t-test conducted on the data resulted in a p-value of 0.3. The large p-value is attributed to the high variability nature of the DCT testing, which is very sensitive to the notch size and specimen dimensions. The coefficient of variation in the results was similar for both types of mixtures. The average fracture energy of the control mixture did not pass the minimum threshold of 400 J/m$^2$ (Buttlar et al., "Comprehensive Database of Asphalt Concrete Fracture Energy and Links to Field Performance," 89th Annual Meeting of the Transportation Research Board, 502 Washington, D.C. (2010), which is hereby incorporated by reference in its entirety), whereas the mixtures rejuvenated with the soybean additive exceeded that minimum.

TABLE 10

DCT results for the tested mixtures

| Mixture type | Average fracture energy (J/m$^2$) | Coefficient of variation |
| --- | --- | --- |
| RAP + 58-28 | 377 | 0.17 |
| RAP + 12% Mod58-28 | 424 | 0.18 |

Discussion of Examples 20-25

In this study, a soybean-derived rejuvenator was used to modify a PG58-28 at a dosage of 6% and 12% by weight of binder. The soybean-modified binder was then blended with an extracted RAP binder at a ratio of 1 part modified PG58-28 to 5 parts RAP, resulting in an effective rejuvenator dosage of 1% and 2% by weight of the binder blend respectively. A control blend was prepared by mixing the neat PG58-28 with the RAP binder at the same ratio. The critical high and low temperatures of the RAP binder dropped significantly with the use of the soybean rejuvenator. The RAP binder changed from a PG106-10 to a PG76-16 using the 6% modified PG58-28 and to a PG76-22 with the 12% modified PG58-28. In comparison, the control blend, using the neat PG58-28, merely changed the RAP binder to a PG100-10. Hence, the neat binder acting alone had insignificant impact on the critical temperatures of the RAP binder. This means that the soybean rejuvenator is almost entirely responsible for any changes in the critical temperatures.

At intermediate temperatures, the linear amplitude sweep (LAS) test results showed a considerable improvement in the fatigue life of the PAV-aged binders upon adding the soybean-derived rejuvenator. This effect was higher for the lower test temperature of 25° C. compared to that of 31° C. Even though LAS results serve as a good indication of the fatigue life of asphalt mixtures, future work will include fatigue testing on rejuvenated RAP mixtures to verify the findings of LAS results.

The binder master curves showed a consistent decrease in stiffness and an increase in phase angle with the soybean-derived rejuvenator. Such increase remained significant following PAV aging of the binders. Hence, it can be concluded that the rejuvenation effect was sustained with PAV aging which attests to the durability of the rejuvenator. On the other hand, the PAV-aged control blend did not show significant differences from the PAV-aged RAP binder.

Dynamic modulus specimens were prepared using 100% RAP mixtures blended with a neat PG58-28, a 6% soybean-modified PG58-28 and a 12% soybean-modified PG58-28. Both the dynamic modulus and phase angle master curves did not reveal any differences between the various mixtures. It was not clear whether this result was due to incomplete blending between the RAP binder and the virgin binders. Another possible explanation would be that the dynamic modulus values represent a lot of contributions from various properties of the mixture, so the binder effect may not be clearly discerned.

Disk-shaped compact tension (DCT) specimens were prepared using 100% RAP mixtures blended with a neat PG58-28 and a 12% soybean-modified PG58-28. The specimens made with the soybean rejuvenated mixture showed a higher fracture energy compared to the other set of specimens.

Based on this study, the soybean-derived rejuvenator was proven successful in enhancing the fatigue and low temperature properties of the extracted RAP binders as well as 100% RAP mixtures. Future research will investigate ways to improve blending between the RAP binder and the rejuvenator during actual mixing to better enhance mixture properties.

Example 26—Properties of Asphalt Blends with Varying Temperature, Duration, and RPM To aid the dispersion of epoxidized benzyl soyate (EBS) in RAP, it was first blended with a softer virgin binder (e.g. PG 58-28) to produce an EBS-modified virgin binder, which was then added to the RAP. The virgin binder was used as a dispersion vehicle for the EBS in order to facilitate blending and to allow for proper diffusion into the RAP. Upon mixing with the RAP, the EBS-modified virgin binder should uniformly coat the RAP aggregates and the EBS should diffuse into the RAP binder. Blending of EBS with the virgin binder can be done via a shear blender for a period of 15 to 60 minutes under a controlled temperature and rpm. The temperature is dependent on the stiffness of the virgin binder where the selected temperature should be sufficient to render the binder flowable. The RAP mixture should be heated to a sufficiently high temperature without excessively aging it before it is mixed with the EBS-modified virgin binder.

Alternatively, direct application of EBS to the RAP aggregate can be done, but will require special attention to curing and mixing to ensure EBS is uniformly applied and distributed throughout the RAP mixture.

Samples from the PG58-28 and 6% EBS blend were obtained at 15 minute intervals during blending and tested with the DSR. The DSR results showed no difference between samples taken after 15 minutes, 30 minutes, 45 minutes, and 60 minutes of blending. A temperature of 110° C. and a speed of 2000 rpm for 45 minutes provided sufficient blending as revealed by the DSR results. For the RAP binder, blending was done at 160° C. and a speed of 2000 rpm for 45 minutes. The lower speed was used because the higher speed (rpm) created additional heat leading to an increase in temperature. The results of these tests are shown in Table 11.

TABLE 11

Properties of Asphalts Blended at Varying Temperatures, Durations, RPMs

| High Temperature of asphalt in the absence of the compound in formula 1 | Compound in Formula 1 | Duration | Temperature | rpm | High temperature of improved asphalt |
|---|---|---|---|---|---|
| 60° C. | 3% | 15-60 minutes | 110° C. | 2000-2500 rpm | 54° C. |
| 101° C. | 6% | 45 minutes | 170° C. | 2000 rpm | 85° C. |
| 88° C. | 6% | 45 minutes | 140° C. | 2000 rpm | 72° C. |

As a result, the temperature, blending speed (rpm) and duration can be adjusted based on the binder's stiffness and rejuvenator dosage in a way to avoid temperature fluctuations and undesirable aging.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:
1. An asphalt product comprising:
an asphalt binder and
a compound of formula (I):

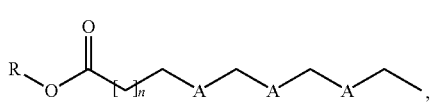

wherein:
each A is selected independently at each occurrence thereof from the group consisting of

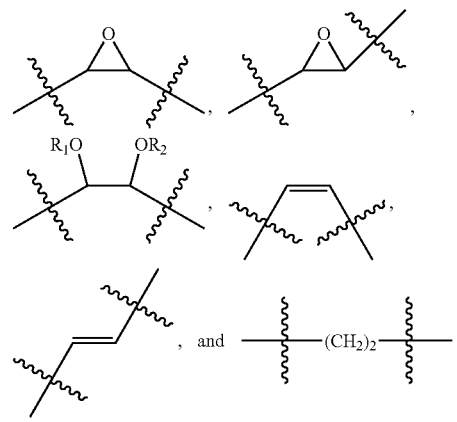

and
wherein at least one A is

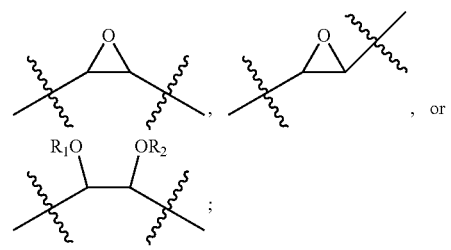

n=1-12;
each

represents the point of attachment to a —CH$_2$— group;
R is selected from the group consisting of C$_3$-C$_{23}$ alkyl and benzyl, wherein the C$_3$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl; and
a mineral aggregate.
2. An asphalt product comprising:
an asphalt binder and
a compound of formula (I):

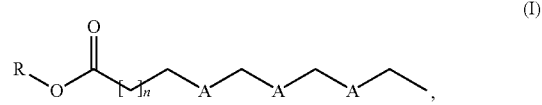

wherein:
each A is selected independently at each occurrence thereof from the group consisting of

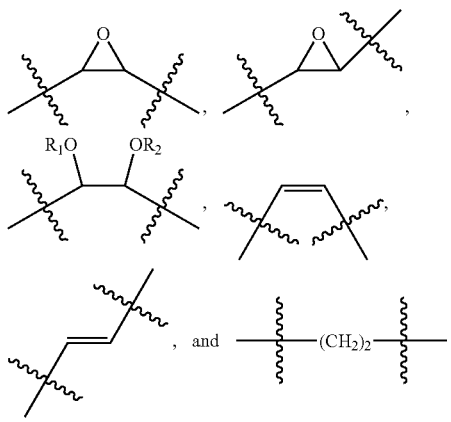

and
wherein at least one A is

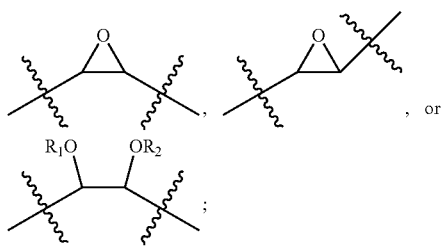

n=1-12;
each

represents the point of attachment to a —CH$_2$— group;
R is selected from the group consisting of C$_3$-C$_{23}$ alkyl and benzyl, wherein the C$_3$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl,
fiberglass, and
a mineral aggregate.

3. A recycled asphalt pavement aggregate, wherein the improvement comprises an asphalt product comprising:
an asphalt binder and
a compound of formula (I):

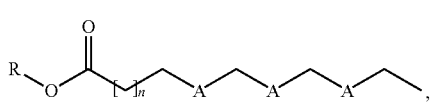
(I)

wherein:
each A is selected independently at each occurrence thereof from the group consisting of

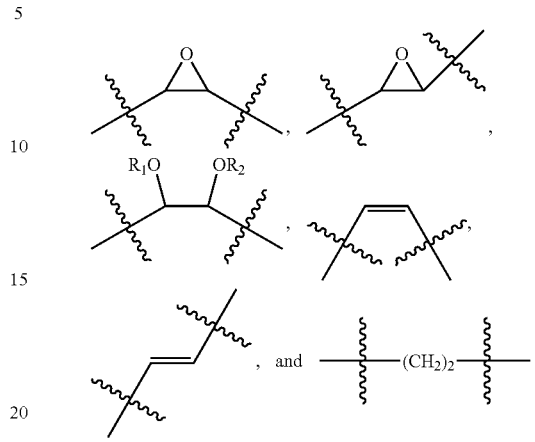

and
wherein at least one A is

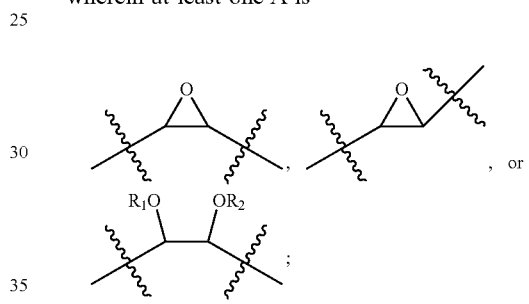

n=1-12;
each

represents the point of attachment to a —CH$_2$— group;
R is selected from the group consisting of C$_3$-C$_{23}$ alkyl and benzyl, wherein the C$_3$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl.

4. A method of making an asphalt material comprising the steps of:
(a) providing an improved asphalt product comprising:
an asphalt binder and
a compound of formula (I):

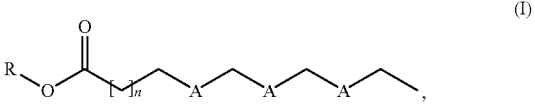
(I)

wherein:
each A is selected independently at each occurrence thereof from the group consisting of

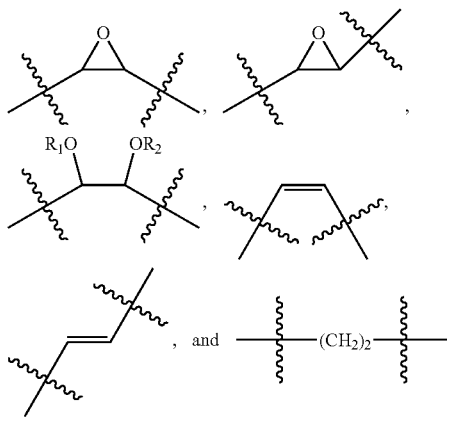

and
wherein at least one A is

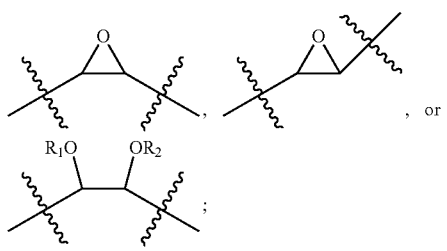

n=1-12;
each

represents the point of attachment to a —CH$_2$— group;
R is selected from the group consisting of C$_3$-C$_{23}$ alkyl and benzyl, wherein the C$_3$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl, mixed with the asphalt binder, wherein the improved asphalt product has a complex shear modulus reduction of between 67% to 96% compared to that produced when the improved asphalt material is prepared in the absence of the compound of formula (I);
(b) mixing the improved asphalt product with a mineral aggregate to coat the mineral aggregate and produce a heated paving material which has a dynamic modulus reduction compared to that produced when the improved asphalt material is prepared in the absence of the compound of formula (I);
(c) applying the heated paving material to a surface to be paved to form an applied paving material, and
(d) compacting the applied paving material, to a void fraction of less than 8% to form a paved surface.

5. The method of claim 4, wherein the compound of formula (I) is the compound of formulae (Ia)-(Ik):

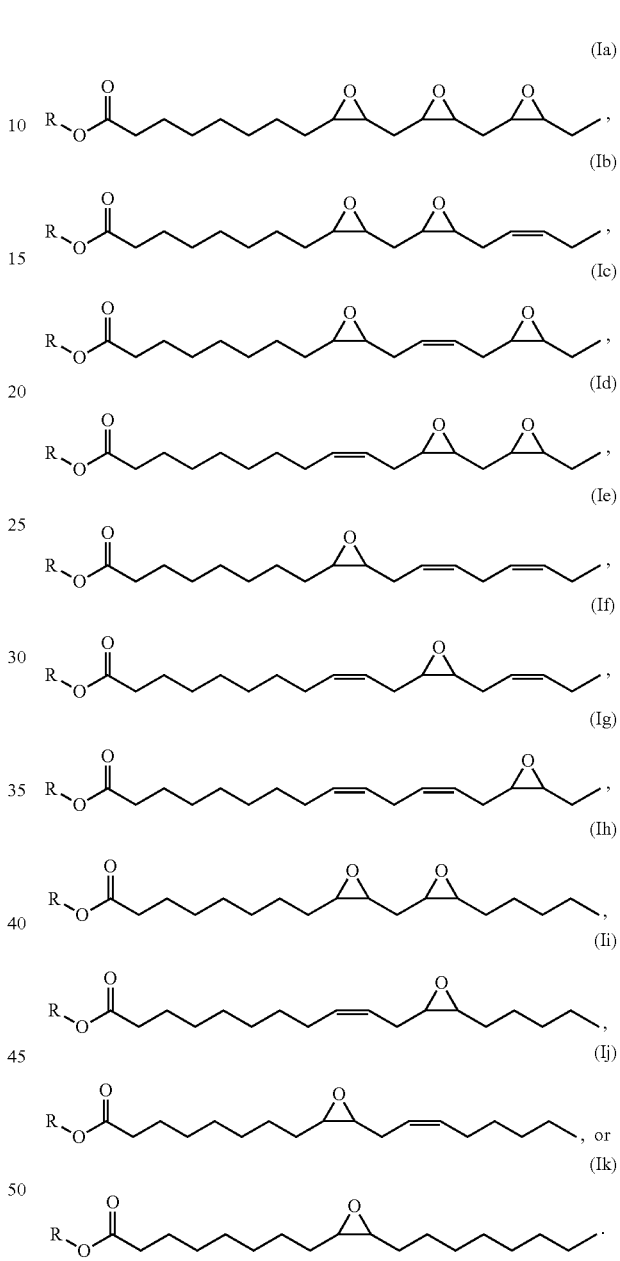

6. The method of claim 4, wherein the compound of formula (I) is selected from the group consisting of epoxidized benzyl soyate and epoxidized isoamyl soyate.

7. The method of claim 4, wherein the improved asphalt product produced in step (a) has a high temperature performance grade measured at a temperature between about −28° C. to 116° C., wherein the high temperature performance grade of the improved asphalt product is achieved at a temperature, which is reduced by 3° C. to 90° C. compared to that produced by an improved asphalt product prepared in the absence of the compound of formula (I).

8. The method of claim 4, wherein the improved asphalt product produced in step (a) has a low temperature performance grade measured at a temperature between about −16° C. to −40° C., wherein the low temperature performance grade of the improved asphalt product is achieved at a temperature, which is reduced by 3° C. to 60° C. compared to that produced by an improved asphalt product prepared in the absence of the compound of formula (I).

9. The method of claim 4, wherein the asphalt binder is selected from the group consisting of unaged asphalt binder, aged asphalt binder from recycled asphalt pavement, vacuum tower distillation bottom binder, aged asphalt binder from recycled asphalt shingles, de-asphalting bottoms, residuum oil supercritical extraction unit bottoms, and mixtures thereof.

10. The method of claim 4, wherein the mineral aggregate is selected from the group consisting of sand, gravel, limestone, quartzite, granite, crushed stone, recycled asphalt pavement (RAP), recycled asphalt shingles (RAS), and combinations thereof.

11. The asphalt material product of the method of claim 4.

12. The method of claim 4, wherein the mixing is carried out in a high speed shear mill at 100° C. to 150° C. and shear speeds at 250 RPM to 3000 RPM or at 0 to 5000 RPM.

13. The method of claim 4, wherein at a frequency range of 0.01 Hz to 100 Hz and at a temperature of 21° C., the dynamic modulus of the improved asphalt material with PG 58-28 ranges from 100 MPa to 7,000 MPa and the dynamic modulus for the improved asphalt material prepared in the absence of the compound of formula (I) with PG 58-28 ranges from 700 MPa to 13,000 MPa.

14. The method of claim 4, wherein at a frequency range of 0.01 Hz to 100 Hz and at a temperature of 21° C., the dynamic modulus of the improved asphalt material with PG 64-28 ranges from 135 MPa to 7,000 MPa and the dynamic modulus for the improved asphalt material prepared in the absence of the compound of formula (I) with PG 64-28 ranges from 950 MPa to 12,000 MPa.

15. The method of claim 4, wherein at a frequency range of 0.01 Hz to 100 Hz and at a temperature of 20° C., the complex shear modulus of the improved asphalt material with PG 58-28 ranges from 0.78 kPa to 10,700 kPa and the complex shear modulus for the improved asphalt prepared in the absence of the compound of formula (I) with PG 58-28 ranges from 19.3 kPa to 49,800 kPa.

16. The method of claim 4, wherein at a frequency range of 0.01 Hz to 100 Hz and at a temperature of 20° C., the complex shear modulus of the improved asphalt material with PG 64-28 ranges from 1.94 kPa to 11,000 kPa and the complex shear modulus for the improved asphalt prepared in the absence of the compound of formula (I) with PG 64-28 ranges from 19.3 kPa to 33,000 kPa.

17. The method of claim 10, wherein at a test temperature of −6° C., the fracture energy of the improved asphalt material with PG 58-28 and RAP is above 400 J/m$^2$ and the fracture energy for the improved asphalt material prepared in the absence of the compound of formula (I) with PG 58-28 and RAP is below 400 J/m$^2$.

18. The method of claim 10, wherein ΔTc of the improved asphalt product produced in step (a), wherein the asphalt binder is an aged asphalt binder from RAP and PG 58-28, ranges from −8° C. to 4° C., wherein ΔTc for the improved asphalt is increased by 0.1° C. to 10° C. compared to that produced by an improved asphalt product with aged asphalt binder from RAP and PG 58-28 prepared in the absence of the compound of formula (I).

19. The method of claim 10, wherein at a temperature range of 25° C. to 31° C. and a strain rate of 5%, the fatigue life of the improved asphalt product produced in step (a) with aged asphalt binder from RAP and PG 58-28 is increased by between 100 cycles to 9000 cycles compared to that produced by an improved asphalt product with aged asphalt binder from RAP and PG58-28 prepared in the absence of the compound of formula (I).

20. The method of claim 4, wherein the dynamic modulus reduction is between 42% to 86% compared to that produced when the improved asphalt material is prepared in the absence of the compound of formula (I).

21. The asphalt product of claim 1, wherein the mineral aggregate is selected from the group consisting of sand, gravel, limestone, quartzite, granite, crushed stone, recycled asphalt pavement (RAP), recycled asphalt shingles (RAS), and combinations thereof.

22. The asphalt product of claim 21, wherein the asphalt product is in the form of asphalt concrete.

23. The asphalt product of claim 1, wherein the asphalt product is in the form of an asphalt mixture.

24. The method of claim 12, wherein the compound of formula (I) is mixed in an amount of about 0.25% to 15.0% by weight of the binder and is blended with asphalt (PG 58-28 and PG 64-28).

25. The method of claim 24, wherein the compound of formula (I) is mixed in an amount of about 0.25% to 5.0% by weight of the binder and is blended with asphalt (PG 58-28 and PG 64-28).

26. The method of claim 25, wherein upon blending the compound of formula (I) in an amount of 0.75% weight of the binder with the asphalt, the performance grade changes to PG 40-34 and PG 46-34.

* * * * *